US011226597B2

(12) United States Patent
Sinha et al.

(10) Patent No.: US 11,226,597 B2
(45) Date of Patent: Jan. 18, 2022

(54) SYSTEMS AND METHODS FOR INTERACTION WITH A BUILDING MANAGEMENT SYSTEM

(71) Applicant: Johnson Controls Technology Company, Auburn Hills, MI (US)

(72) Inventors: Sudhi R. Sinha, Milwaukee, WI (US); Youngchoon Park, Brookfield, WI (US); Ada L. Ma, Kenmore, WA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 184 days.

(21) Appl. No.: 16/014,936

(22) Filed: Jun. 21, 2018

(65) Prior Publication Data

US 2018/0299840 A1  Oct. 18, 2018

Related U.S. Application Data

(63) Continuation-in-part of application No. 15/586,104, filed on May 3, 2017, which is a continuation of
(Continued)

(51) Int. Cl.
*G05B 21/00* (2006.01)
*G01M 1/38* (2006.01)
(Continued)

(52) U.S. Cl.
CPC ..... *G05B 13/0205* (2013.01); *G05B 13/0265* (2013.01); *G05B 13/048* (2013.01);
(Continued)

(58) Field of Classification Search
CPC ............ G05B 13/0205; G05B 13/0265; G05B 13/048; G05B 15/02; G05B 2219/2642; H04L 12/2803
See application file for complete search history.

(56) References Cited

U.S. PATENT DOCUMENTS 6,434,530 B1  8/2002  Sloane et al.
6,556,983 B1  4/2003  Altschuler et al.
(Continued)

FOREIGN PATENT DOCUMENTS

EP    3 324 306        5/2018
WO    WO 2005/008535   1/2005
WO    WO-2007/125108 A1  11/2007

OTHER PUBLICATIONS

EPO Examination Report for European Application No. EP 17727011.3, dated Nov. 21, 2019, 7 pages.
(Continued)

*Primary Examiner* — Zhipeng Wang
(74) *Attorney, Agent, or Firm* — Foley & Lardner LLP

(57) ABSTRACT

A method for interacting with a building management system (BMS) using intelligent software agents. The method includes receiving a user request from a multi-input device configured to accept vocal and textual inputs, and contextualizing the user request for a space and/or place and a corresponding user. The method further includes constructing a user skill level from the user request, and activating a customized BMS optimization process, the customized BMS optimization process determined by the intelligent software agents from the user skill level, the user request, and the space and/or place.

20 Claims, 28 Drawing Sheets

Related U.S. Application Data application No. 15/367,167, filed on Dec. 1, 2016, now Pat. No. 9,817,383.

(60) Provisional application No. 62/523,211, filed on Jun. 21, 2017, provisional application No. 62/360,935, filed on Jul. 11, 2016.

(51) Int. Cl.

| | | |
|---|---|---|
| *G05B 13/00* | (2006.01) | |
| *G05B 15/00* | (2006.01) | |
| *G05D 23/00* | (2006.01) | |
| *G05B 13/02* | (2006.01) | |
| *G05B 13/04* | (2006.01) | |
| *H04L 12/28* | (2006.01) | |
| *G05B 15/02* | (2006.01) | |

(52) U.S. Cl.
CPC .......... *G05B 15/02* (2013.01); *H04L 12/2803* (2013.01); *G05B 2219/2642* (2013.01)

(56) References Cited

U.S. PATENT DOCUMENTS

| | | |
|---|---|---|
| 6,980,978 B2 | 12/2005 | Charron et al. |
| 7,827,230 B2 | 11/2010 | McMahon et al. |
| 8,085,265 B2 | 12/2011 | Chen et al. |
| 8,285,744 B2 | 10/2012 | Dorgelo et al. |
| 8,489,668 B2 | 7/2013 | Huff et al. |
| 8,903,889 B2 | 12/2014 | Vijaykumar et al. |
| 9,094,385 B2 | 7/2015 | Akyol et al. |
| 9,170,702 B2 | 10/2015 | Hersche et al. |
| 9,263,032 B2 | 2/2016 | Meruva |
| 9,984,686 B1* | 5/2018 | Mutagi ............... H04L 12/2816 |
| 10,095,756 B2 | 10/2018 | Park et al. |
| 10,169,486 B2 | 1/2019 | Park et al. |
| 10,417,245 B2 | 9/2019 | Park et al. |
| 10,565,844 B2 | 2/2020 | Pourmohammad et al. |
| 10,573,168 B1 | 2/2020 | Razak et al. |
| 10,607,478 B1 | 3/2020 | Stewart et al. |
| 2004/0193420 A1 | 9/2004 | Kennewick et al. |
| 2007/0033005 A1 | 2/2007 | Cristo et al. |
| 2009/0057427 A1* | 3/2009 | Geadelmann ....... G06F 16/9535 236/51 |
| 2011/0055748 A1 | 3/2011 | Vacariuc |
| 2011/0071685 A1 | 3/2011 | Huneycutt et al. |
| 2011/0137853 A1 | 6/2011 | Mackay |
| 2012/0029656 A1 | 2/2012 | Colombo et al. |
| 2012/0062577 A1 | 3/2012 | Nixon |
| 2012/0166497 A1 | 6/2012 | Choi et al. |
| 2012/0194502 A1 | 8/2012 | Smith et al. |
| 2013/0055115 A1 | 2/2013 | Obitko et al. |
| 2013/0283172 A1 | 10/2013 | Cross et al. |
| 2013/0297078 A1 | 11/2013 | Kolavennu |
| 2013/0325997 A1 | 12/2013 | Higgins et al. |
| 2013/0345880 A1 | 12/2013 | Asmus |
| 2013/0346229 A1 | 12/2013 | Martin et al. |
| 2014/0122077 A1 | 5/2014 | Nishikawa et al. |
| 2014/0142895 A1 | 5/2014 | Sharma et al. |
| 2014/0189804 A1 | 7/2014 | Lehmann et al. |
| 2014/0330435 A1 | 11/2014 | Stoner et al. |
| 2015/0053779 A1* | 2/2015 | Adamek ................. G10L 15/22 236/1 C |
| 2015/0053781 A1* | 2/2015 | Nelson ..................... F24F 11/30 236/1 C |
| 2015/0113462 A1 | 4/2015 | Chen et al. |
| 2015/0120926 A1 | 4/2015 | Wells et al. |
| 2015/0241895 A1 | 8/2015 | Lu et al. |
| 2016/0006569 A1 | 1/2016 | Akyol et al. |
| 2016/0075016 A1 | 3/2016 | Laurent et al. |
| 2016/0148422 A1 | 5/2016 | Direkwut |
| 2016/0187896 A1 | 6/2016 | Jones et al. |
| 2016/0378080 A1* | 12/2016 | Uppala .................. G10L 15/22 700/275 |
| 2017/0038753 A1* | 2/2017 | Shah ...................... G05B 15/02 |
| 2017/0316061 A1 | 11/2017 | Hubauer et al. |
| 2017/0329867 A1 | 11/2017 | Lindsley |
| 2018/0315299 A1 | 11/2018 | Subramanian et al. |
| 2018/0315300 A1 | 11/2018 | Subramanian et al. |
| 2018/0341255 A1 | 11/2018 | Turney et al. |
| 2019/0017719 A1 | 1/2019 | Sinha et al. |
| 2019/0025771 A1 | 1/2019 | Park et al. |
| 2019/0042988 A1 | 2/2019 | Brown et al. |
| 2019/0095820 A1 | 3/2019 | Pourmohammad |
| 2019/0095821 A1 | 3/2019 | Pourmohammad |
| 2019/0096014 A1 | 3/2019 | Pourmohammad et al. |
| 2019/0096212 A1 | 3/2019 | Pourmohammad et al. |
| 2019/0096213 A1 | 3/2019 | Pourmohammad et al. |
| 2019/0096214 A1 | 3/2019 | Pourmohammad |
| 2019/0123931 A1 | 4/2019 | Schuster et al. |
| 2019/0129403 A1 | 5/2019 | Turney et al. |
| 2019/0138512 A1 | 5/2019 | Pourmohammad et al. |
| 2019/0158309 A1 | 5/2019 | Park et al. |
| 2019/0243352 A1 | 8/2019 | Horgan et al. |
| 2019/0243813 A1 | 8/2019 | Pourmohammad et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0347622 A1 | 11/2019 | Elbsat et al. |
| 2019/0355240 A1 | 11/2019 | Razak et al. |
| 2019/0361412 A1 | 11/2019 | Park et al. |
| 2019/0383510 A1 | 12/2019 | Murugesan et al. |
| 2019/0384239 A1 | 12/2019 | Murugesan et al. |
| 2019/0385070 A1 | 12/2019 | Lee et al. |
| 2020/0073342 A1 | 3/2020 | Lee et al. |
| 2020/0076196 A1 | 3/2020 | Lee et al. |
| 2020/0106633 A1 | 4/2020 | Park et al. |
| 2021/0056386 A1 | 2/2021 | Murugesan et al. |
| 2021/0056409 A1 | 2/2021 | Murugesan et al. |
| 2021/0056452 A1 | 2/2021 | Murugesan et al. |

OTHER PUBLICATIONS

Search Report and Written Opinion for International Application No. PCT/US2017/030916, dated Jul. 11, 2017, 16 pages.

International Search Report and Written Opinion on PCT/US2020/058381, dated Jan. 27, 2021, 30 pages.

U.S. Appl. No. 16/549,037, filed Aug. 23, 2019, Johnson Controls Technology Co.

U.S. Appl. No. 16/549,656, filed Aug. 23, 2019, Johnson Controls Technology Co.

U.S. Appl. No. 16/549,744, filed Aug. 23, 2019, Johnson Controls Technology Co.

* cited by examiner

SYSTEMS AND METHODS FOR INTERACTION WITH A BUILDING MANAGEMENT SYSTEM

CROSS-REFERENCE TO RELATED APPLICATIONS

This application is a continuation-in-part of U.S. patent application Ser. No. 15/586,104, filed May 3, 2017, which is a continuation of U.S. patent application Ser. No. 15/367,167 filed Dec. 1, 2016, which claims the benefit of and priority to U.S. Provisional Patent Application No. 62/360,935 filed Jul. 11, 2016, the entireties of which are incorporated by reference herein. This application further claims the benefit of and priority to U.S. Provisional Patent Application No. 62/523,211 filed Jun. 21, 2017, the entirety of which is incorporated by reference herein.

BACKGROUND

The present disclosure relates generally to building management systems. The present disclosure relates more particularly to systems and methods for providing automated control of a building management system using generated software agents.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

Currently, many building management systems provide control of an entire facility, building, or other environment. The building management system may control HVAC systems, water system, lights, air quality, security, and/or any other aspect of the facility within the purview of the building management system. These systems may require skilled persons to adjust, control, and otherwise operate the building management system. In large facilities or buildings, this management can be labor intensive. Moreover, in buildings where dynamic management of the building management system is required (i.e. buildings with multiple independent HVAC requirements), advanced planning may be required along with constant adjustment of individual systems within the building management system to adjust for the dynamic use of the building or facility. Further, users or occupants of the facility may have difficulty adjusting certain parameters such as temperature, lighting, window coverings, etc., due to the complex nature of the system. Thus, it would be advantageous to have a control system that can allow for easy control of the system using basic voice or natural language commands, as well as automatically adjust to dynamic use of a facility by monitoring multiple information pathways and extracting contextual information therefrom.

SUMMARY

One implementation of the present disclosure is a method for interacting with a building management system (BMS) using intelligent software agents. The method includes receiving a user request from a multi-input device configured to accept vocal and textual inputs, and contextualizing the user request for a space and/or place and a corresponding user. The method further includes constructing a user skill level from the user request, and activating a customized BMS optimization process, the customized BMS optimization process determined by the intelligent software agents from the user skill level, the user request, and the space and/or place.

In some embodiments, the method includes determining, based on the user request, at least one BMS device corresponding to the customized BMS optimization process. Further, in some embodiments, the method includes providing feedback to the corresponding user through a preferred interaction method, the feedback indicative of an output of the customized BMS optimization process.

In some embodiments, the preferred interaction method includes at least one of a visual output via the multi-input device, a text message, an email, and an audio output. Further, in some embodiments, the preferred interaction method includes a natural language response, customized based on the user skill level.

In some embodiments, the user request includes a natural language input. In some embodiments, the method further includes providing, via the intelligent software agents, at least one of a text string and a graphical response corresponding to the customized BMS optimization process.

Another implementation of the present disclosure is a system for interacting with a building management system (BMS) using intelligent software agents. The system includes a multi-input device configured to accept vocal and textual user requests, and a cognitive service configured to contextualize each user request for a space and/or place and a corresponding user, and construct a user skill level from each user request. The system further includes a plurality of intelligent software agents configured to receive each contextualized user request and the user skill level, and determine a corresponding customized BMS optimization process. Additionally, the system includes a BMS controller configured to activate the customized BMS optimization process via a plurality of corresponding BMS devices.

In some embodiments, the cognitive service is further configured to determine, based on each user request, the plurality of corresponding BMS devices. In some embodiments the plurality of intelligent software agents are further configured to communicate an outcome of the customized BMS optimization process to the corresponding user via a preferred interaction method.

In some embodiments, the preferred interaction method includes at least one of a visual output via the multi-input device, a text message, an email, and an audio output. Further, in some embodiments, the preferred interaction method includes a natural language response, customized by the plurality of intelligent software agents based on the user skill level.

In some embodiments, the cognitive service is configured to contextualize each user request, each user request including a natural language input via the multi-input device. In some embodiments, the cognitive service is configured to wirelessly communicate with the multi-input device and the BMS controller.

In some embodiments, the multi-input device includes a microphone, a display, and at least one of a touchscreen and keyboard. Further, in some embodiments, the display is configured to provide a graphical response indicative of an output of the customized BMS optimization process, the plurality of intelligent software agents configured to communicate the graphical response to the multi-input device.

Another implementation of the present disclosure is a system for interacting with a building management system (BMS) using intelligent software agents. The system includes a multi-input device configured to accept vocal and textual user requests, and a processor in communication with the multi-input device. The processor is configured to receive a user request, and contextualize the user request for a space via a cognitive service. The processor is further configured to construct a user skill level from the user request via the cognitive service, determine, via a plurality of intelligent software agents, a customized BMS optimization process for the space, and output the customized BMS optimization process. The system further includes a BMS controller configured to receive the customized BMS optimization process from the processor and activate the customized BMS optimization process via corresponding BMS devices.

In some embodiments, the processor is further configured to determine the corresponding BMS devices based on the user request. In some embodiments, the processor is further configured to communicate a result of the customized BMS optimization process to a user via a preferred interaction method. Further, in some embodiments, the preferred interaction method includes a preferred user device and a preferred result format.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 17-1, 17-2, 17-3 and 17-4 collectively show a flow chart illustrating a process for creating a new building within a BMS user interface.

DETAILED DESCRIPTION

Building Management System and HVAC System

Figure 1:
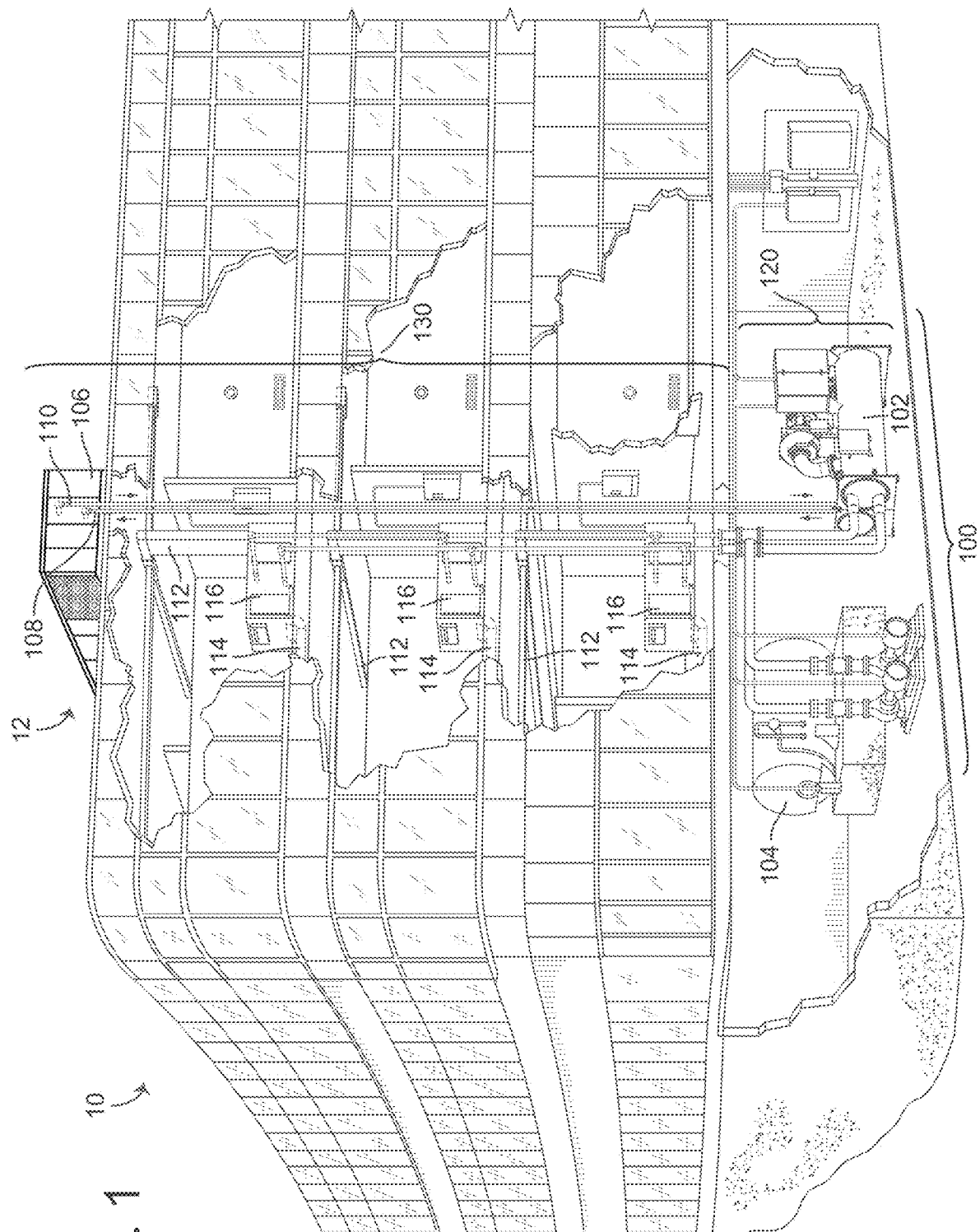
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination thereof. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
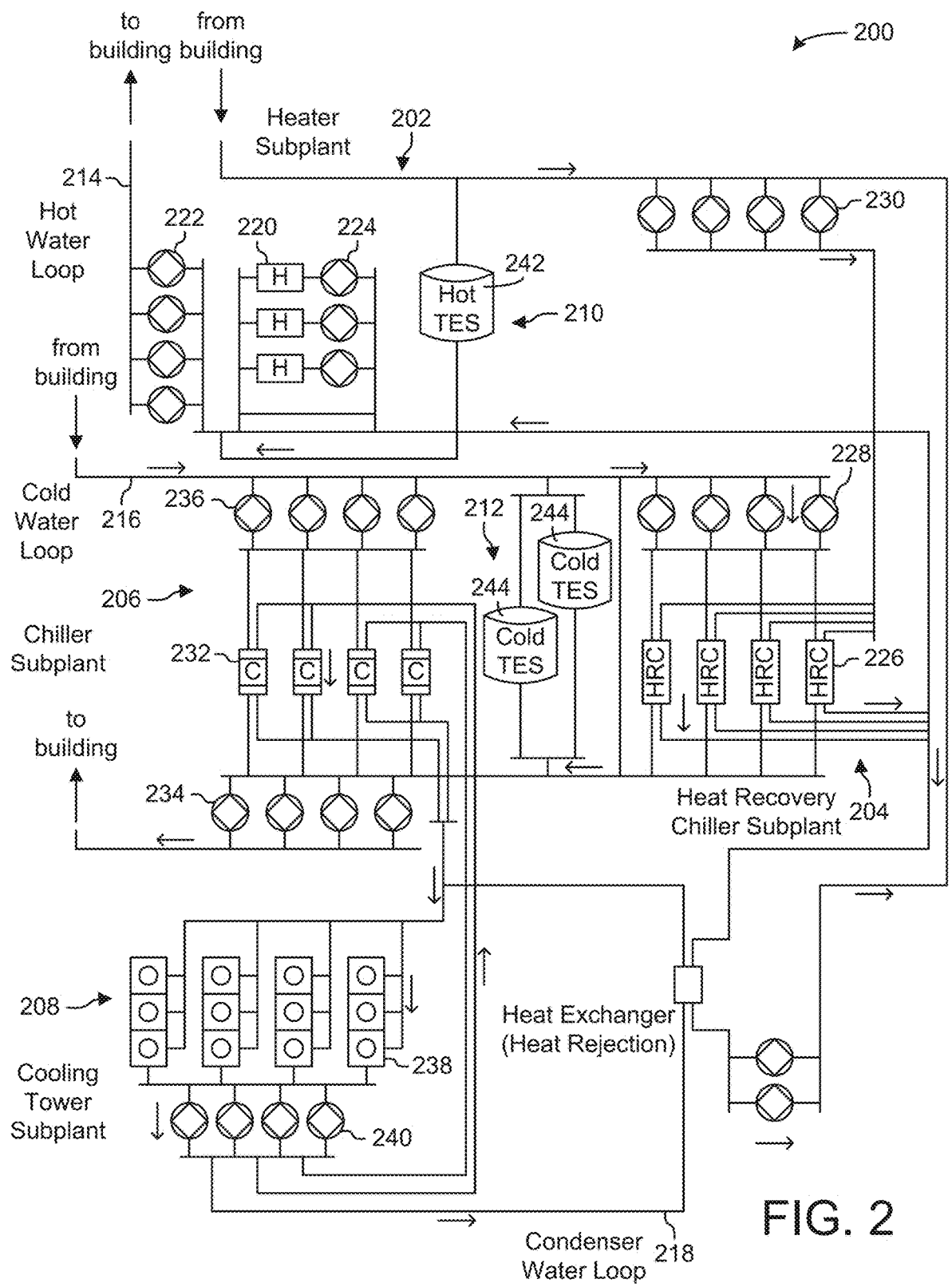
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
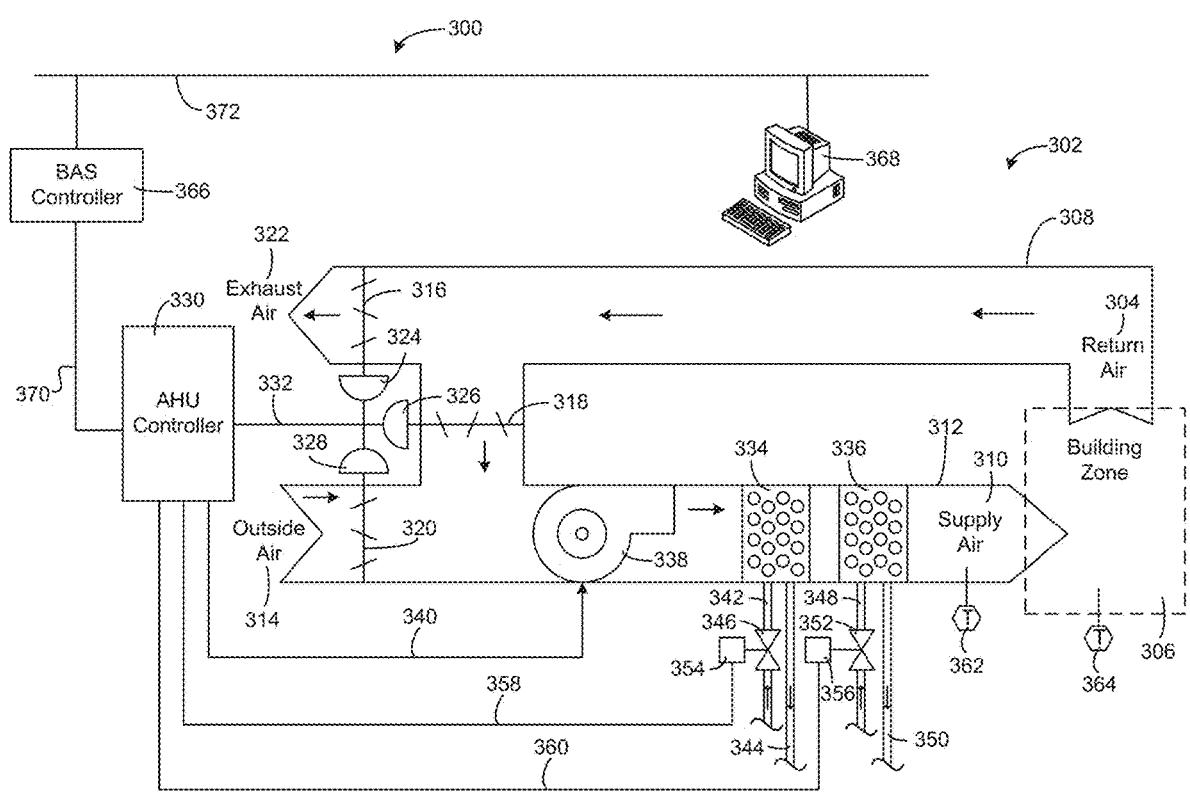
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
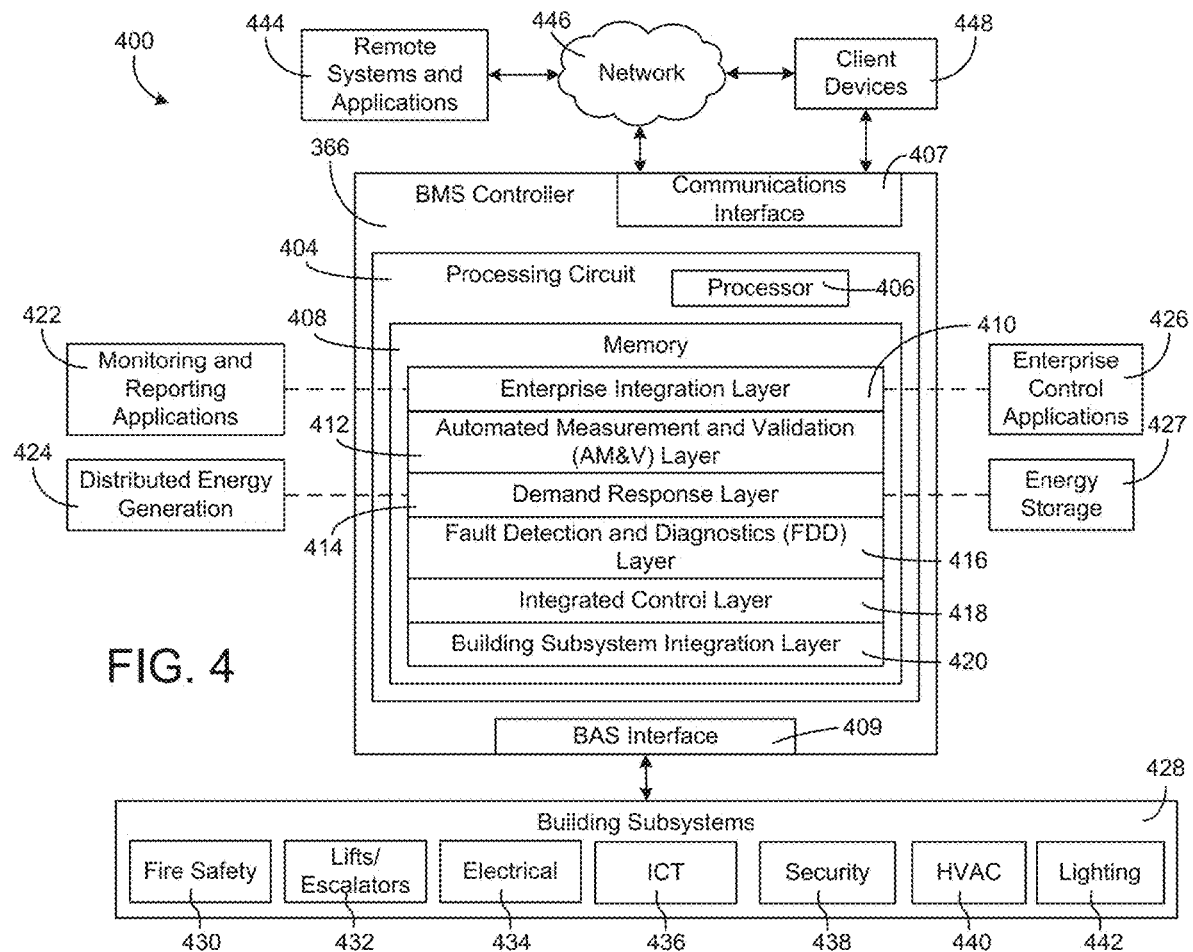
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both the communications interface 407 and the BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Adaptive Agent Based Control System

Figure 5:
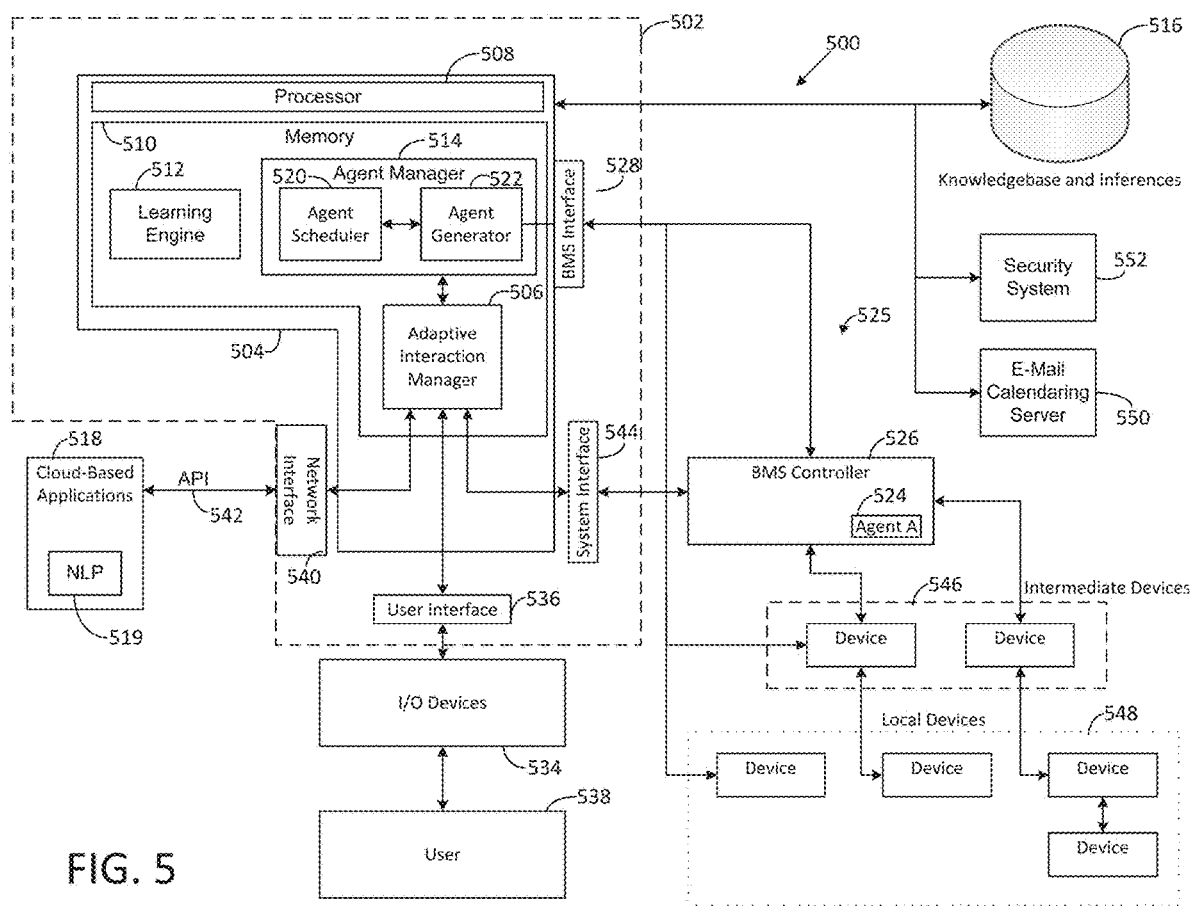
FIG. 5 is a block diagram illustrating an adaptive agent based control system, according to some embodiments.

Referring now to FIG. 5, a block diagram illustrating an adaptive agent based control system 500 is shown, according to one embodiment. The system 500 may be any of the BMS systems described above. Further, the system 500 may be a peer-to-peer (P2P) network, such as a Verisys system from Johnson Controls. The system 500 may include a controller 502. The controller 502 may be a dedicated controller within a BMS. In one embodiment, the controller 502 is a cloud based server (i.e. an internet based server). For example, the controller 502 may be physically located in one or more server farms and accessible via an internet connection. In some examples, the controller may be a standalone device in a peer-to-peer (P2P) network, such as a Verisys system from Johnson Controls. The controller 502 may include a processing circuit 504 including an adaptive interaction manager 506. The processing circuit 504 may include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in the memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 via the processing circuit 504 and may include computer code for executing (e.g., by the processor 508) one or more processes described herein. When the processor 508 executes instructions stored in the memory 510, the processor 508 generally configures the processing circuit 504 to complete such activities.

The memory 510 may include the adaptive interaction manager 506, a learning engine 512 and an agent manager 514. The learning engine 512 may be used to generate and access historical information, user feedback information, etc. In one embodiment, the learning engine 512 may access a database 516 via the processing circuit 504. The database 516 may include data relating to one or more BMS's, such as building layouts, system schematics, device information, control schemes, environmental ratings, historical data, etc. In one embodiment, the database 516 includes contextual information. The contextual information may include dictionaries, historical data, scripts, and/or other data for interpreting contextual information. The database 516 may further include a knowledgebase, which may include previous commands, user responses, generated outputs, device information, agent specific learning, etc. The database 516 may further include one or more inferences. The inferences may include contextual inferences, historical inferences, etc. In some embodiments, the learning engine 512 may provide the inferences to the database 516. The learning engine 512 may further update the inferences, as well as other data, of the database 516 over time. The learning engine 512 may further access data within the database 516 to aid in the generation of agents, as will be discussed below. The database 516 may further include one or more universal truths associated with the system 500. In one embodiment, the universal truths may be associated with one or more BMS controllers or devices within the system 500. In one embodiment, the universal truths may be arranged in a universal truth table, which may be populated with universal truths for a given system, such as system 500. Example universal truths may include a defined communication schemes between BMS devices and/or controllers.

The agent manager 514 is further shown to include an agent scheduler 520 and an agent generator 522. In some embodiments, the agent scheduler 520 maintains a record of all agents previously generated and active within the system 500. Further the agent scheduler 520 may also maintain real time data relating to which agents are currently active, and which agents are not currently active. The agent scheduler may further maintain real time data relating to which device within the system 500 a particular agent is currently associated with. For example, as shown in FIG. 5, agent 'A' 524 is associated with a BMS controller 526 within a BMS 525 of the system 500. The BMS 525 can be any combination of BMS devices as described above in regards to FIGS. 1-4. Further, the BMS 525 can be understood to be a residential system, such as a home controller. The BMS controller 526 may be any BMS controller, as described above in regards to FIGS. 1-4. Alternatively, the BMS controller 526 may be a dedicated BMS interface device, such as an Athens Smart Hub device from Johnson Controls. The agent scheduler 520 may therefore maintain a record of the agent 'A' 524 being associated with the BMS controller 526, as well as the current status of the agent 'A' 524.

The agent generator 522 may generate a number of agents, such as agent 'A' 524, for use in the system 500. The agents, as described herein, may be software applications that can run automated tasks (scripts). For example, the agents may be software applications that can read and/or write data to one or more devices of the system. In one embodiment, the agents may be able to generate their own software, and inject the software into one or more device it is associated with. The agents may further be capable of communicating with other agents, as will be described in more detail below, along with a more detailed description of the agents generally. The agent generator 522 may generate an agent based on information received from the adaptive interaction manager 506. In some embodiment, the agents are generated to perform a defined task. In other embodiments, the agents are generated to perform a defined set of tasks. In still further embodiments, the agents are generated having a desired goal, and allowed to determine how to meet the desired goal. In some examples, a generalized framework can be provided to a generated agent to provide constraints as to how the goal may be achieved. In further embodiments, the agent generator 522 may modify an existing agent. For example, the agent generator 522 may modify an existing agent to provide more functionality. In other examples, the agent generator 522 may update the agent with additional information related to the device the agent is associated with, such as a new firmware ("FW") update, or additional hardware (e.g. a new I/O board for a controller).

The agent generator 522 may communicate the generated agents to the BMS 525 via a BMS interface 528. The BMS interface 528 may be a serial interface, such as RS-232 or RS-485. In one embodiment, the BMS interface 528 is a universal asynchronous receiver/transmitter ("UART"). In other examples, the BMS interface 528 may be a wireless interface such as cellular, Wi-Fi, Zigbee, Bluetooth, RF, LoRa, etc. Additionally, the BMS interface 528 may include other wired interfaces such as USB, Firewire, Lightning Connectors, CAT5 (wired internet), etc. The agent generator 522 may further communicate the generated agents to the system 500 via an adaptive interaction manager interface 530. The adaptive interaction manager interface 506 may allow the agent generator 522, as well as the processing circuit 504 in general, to communicate with the adaptive interaction manager 506 via a corresponding processing circuit interface 532. Similar to above, the adaptive interaction manager interface 530 may be a serial interface, such as RS-232 or RS-485. In one embodiment, the adaptive interaction manager interface 530 is a UART interface. In still other examples, the adaptive interaction manager interface 530 may be a wireless interface such as cellular, Wi-Fi, Zigbee, Bluetooth, RF, LoRa, etc. Additionally, the adaptive interaction manager interface 530 may include other wired interfaces such as USB, Firewire, Lightning Connectors, CAT5 (wired internet), etc.

In some embodiments, the adaptive interaction manager 506 provides communication between one or more I/O devices 534, one or more cloud-based applications 518, the processing circuit 504 and one or more devices, such as the BMS controller 526. The adaptive interaction manager 506 is shown in include a user interface 536 for communicating with the one or more I/O devices 534. In one embodiment, the user interface 536 may be a wireless interface such as cellular (3G, 4G, LTE, CDMA, etc.), Wi-Fi, Zigbee, Bluetooth, RF, LoRa, etc. Additionally, the user interface 536 may include other wired interfaces such as USB, Firewire, Lightning Connectors, CAT5 (wired internet), UART, serial (RS-232, RS-485), etc. The I/O devices 534 may be any device capable of communicating to the adaptive interaction manager 506, as well as providing a device for a user 538 to interface with the system 500. Example I/O devices 534 may include personal computing devices such as smart phones (iPhone, Android phone, Windows phone), tablet computers (iPad, Android Tablet, Windows Surface, etc.), laptop computers, and/or desktop computers. Example I/O devices may further include a stand-alone device such as an Amazon Echo, or even a non-mobile device such as a voice capable thermostat, or other dedicated I/O devices.

The adaptive interaction manager 506 may communicate with the cloud-based applications 518 via a network interface 540. The network interface 540 may be an internet based interface, such as Wi-Fi, CAT5, cellular (3G, 4G, LTE, CDMA, etc.), etc. However, other interfaces, such as Zigbee, Bluetooth, RF, LoRa, etc., are also considered. In one embodiment, the adaptive interaction manager 506 may communicate with the cloud-based applications 518 via one or more APIs 542. In one embodiment, the APIs 542 are proprietary APIs for interfacing the adaptive interaction manager 506 with the cloud based applications 518. In one example, the APIs 542 can be web hosted APIs provided by a third party provider, such as Amazon Cloud Services, Google, Apple, Microsoft, etc. In some embodiments, the APIs 542 interface with a proprietary voice recognition application, such as a voice recognition application from Johnson Controls. In other examples, the APIs 542 can interface with gesture recognition APIs, such as those from Johnson Controls. Further examples of possible APIs 542 can include enterprise resource planning (ERP), or other enterprise management software APIs for interfacing with a company or facility enterprise system (e.g. SAP). Other possible APIs 542 may include e-mail and/or calendaring interface APIs, for interfacing with an e-mail/calendaring system such as Microsoft Outlook, Apple Mail, Google Gmail, Lotus Notes, etc.

In one embodiment, the APIs 542 interface with the cloud-based applications 518. The cloud based applications 518 may be supplied by third parties. For example, the cloud based applications 518 may include voice to text applications, such as Amazon Voice Services, Google Voice, Apple's Siri, or Microsoft's Cortana. The cloud based applications 518 may further include gesture recognition applications such as those used by Microsoft Kinect. Further, other cloud based applications 518 can include personal assistant applications such as Apple's Siri, and Microsoft's Cortana. By utilizing one or more cloud based applications on a remote server, the system 500 can leverage more sophisticated and powerful contextual data processing technology than would be applicable to install on an individual server, system, or device. For example, cloud based voice recognition applications can provide as high as 95% natural voice recognition accuracy. In other embodiments, the cloud-based applications 518 may include a natural language processor 519. The natural language processor 519 may be a voice to text application, such as those described above. In other embodiments, the natural language processor 519 may be used to processes natural language text into computer executable commands. For example, the natural language processor 519 may be able to analyze text provided to the system 500, such as via e-mail or text message, and process the natural language text into a format readable by the controller 502. While the natural language processor 519 is shown as part of the cloud-based applications 518, it is considered that the natural language processor 519 may be separate from the cloud based applications 518, and communicate directly with the adaptive interaction manager 506.

In further embodiments, the natural language processor 519 may be integrated into the controller 502.

The adaptive interaction manager 506 may further be in communication with one or more systems or devices associated with a facility or building. As shown in FIG. 5, example systems and devices can include a BMS controller 526. The adaptive interaction manager 506 may communicate with the system via a system interface 544. The system interface 544 may be a serial interface, such as RS-232 or RS-485. In one embodiment, the system interface 544 is a UART interface. In still other examples, the system interface 544 may be a wireless interface such as cellular, Wi-Fi, Zigbee, Bluetooth, RF, LoRa, etc. Additionally, the system interface 544 may include other wired interfaces such as USB, Firewire, Lightning Connectors, CAT5 (wired internet), etc. While FIG. 5 shows the adaptive interaction manager 506 communicating with a BMS controller 526 of the system 500, the adaptive interaction manager 506 may communicate with communicate with any device associated with the BMS 525. For example, the adaptive interaction manager 506 may be able to interface with the BMS controller 526, one or more intermediate devices 546, and/or one or more local device 548. Example intermediate devices may include device controllers, sub-system controllers, RTU's, AHU's,etc. Example local devices may include thermostats, valves, switches, actuators, etc. In one embodiment, system interface 544 may communicate with the BMS 525 via a network connection, such as a BACnet network connection. However, other networks, such as Ethernet, Local Area Network, etc., are also considered.

The adaptive interaction manager 506 may further interact with other systems associated with the BMS 525. Example system may include an e-mail calendaring server 550, a security system 552, etc. Via the BMS 525, the e-mail calendaring server 550, the security system 552, and/or other systems may all provide data to the adaptive interaction manager 506, which can process the information, as will be described in more detail below. In one embodiment, the e-mail calendaring server 550, the security system 552, and/or other systems may provide contextual data to the adaptive interaction manager 506. In one embodiment, the adaptive interaction manager 506, via the system interface 544, communicates with the one or more systems or devices using one or more network connections. For example, the network connections may include a wired connection to the internet. However, other network connections are contemplated such as wireless connections such as cellular, Wi-Fi, Zigbee, Bluetooth, RF, LoRa, etc. Additionally, other network connections such as serial connections (RS-485, RS-232, USB), or other connections such as Firewire, Lightning Connectors, etc. may be used.

The e-mail/calendaring server 550 may be a third party e-mail/calendaring server, such as a Microsoft Exchange server. In one embodiment, the e-mail/calendaring server 550 processes the calendars and schedules for the employees of a facility, as well as for physical areas of the facility. For example, the e-mail/calendaring server 550 may processes scheduling for conference/meeting rooms, as well as certain technology such as projectors, video conference equipment, etc. In one embodiment, the e-mail/calendaring server 550 provides information such as schedules to the adaptive interaction manager 506. Further, the e-mail/calendaring server 550 may allow access to e-mails by one or more cloud-based application 518 such as the personal assistant applications described above. The personal assistant applications may be able to extract contextual information from the data provided by the e-mail/calendaring server 550 and provide the contextual information to the adaptive interaction manager 506 via an API 542.

The security system 552 may include multiple elements associated with a facility or building security system. For example, the security system 552 can include multiple devices such as cameras, microphones, motion detectors, thermal sensors, access devices (RFID locks, biometric locks, etc.), entry logs, etc. In one embodiment, the security system 552 provides data to the adaptive interaction manager 506. The data may include occupancy data provided by the motion detectors and/or thermal sensors. Further, the data may include video and/or digital images provided by the cameras. In one embodiment, the digital images may be provided to the cloud-based application 518 for processing via the adaptive interaction manager 506. For example, the cloud-based application 518 may be a gesture recognition application, such as Microsoft Kinect.

Figure 6:
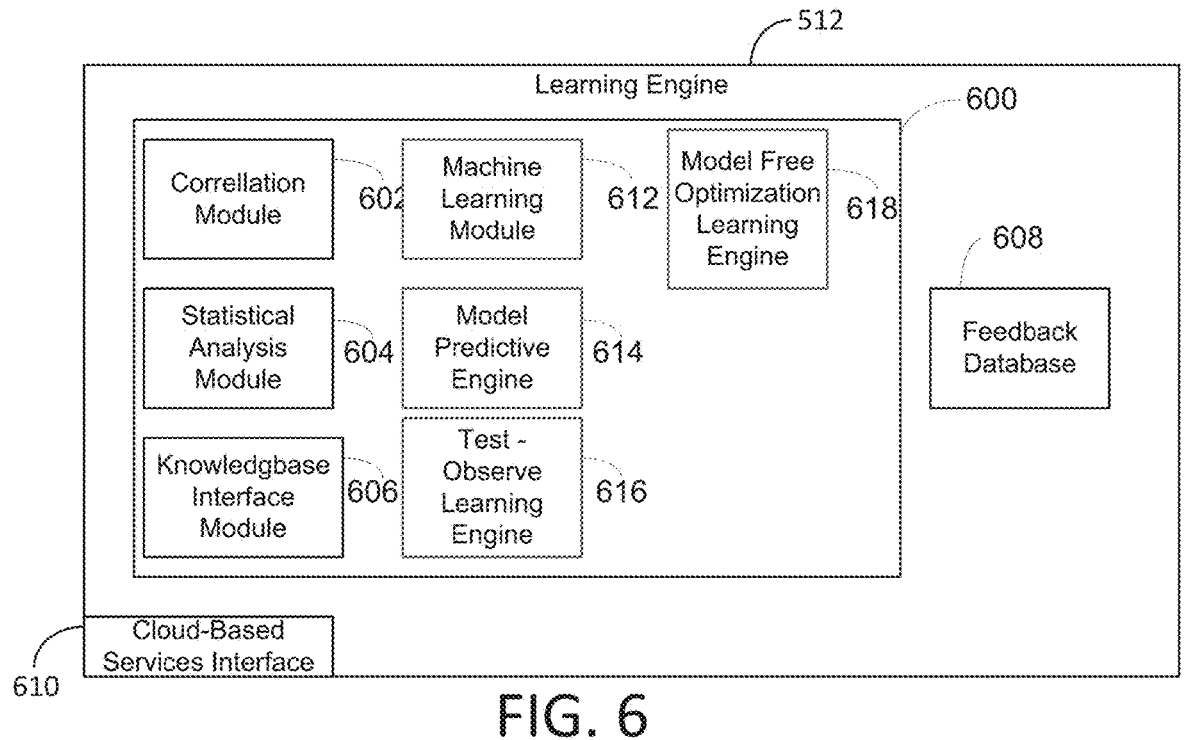
FIG. 6 is a block diagram illustrating a detailed view of the learning engine of FIG. 5, according to some embodiments.

Turning now to FIG. 6, a block diagram showing a detailed view of the learning engine 512 is shown, according to some embodiments. The learning engine may include a number of software modules 600. The software modules are shown to include a correlation module 602, a statistical analysis module 604, a knowledgebase interface module 606, a machine learning interface 612, a model predictive engine 614, a test-observe learning engine, and a model free optimization learning engine 618. The learning engine 512 may further include a feedback database 612 and a cloud-based services interface 614. The correlation module 602 may contain computer code executable by the processor 508 of the processing circuit 504 for correlating received data to generate correlated learning data. For example, the correlation module 602 may correlate an increase in temperature of a room at a certain time of day, with a request to lower the temperature in the room. The correlation module 602 may therefore generate correlated learning data that may anticipate the request to lower the temperature at the above time, and provide information to one or more agents (as discussed below), which will allow the agents to lower the temperature prior to the request to lower the temperature being provided to the BMS. The correlated learning data may be used by one or more agents associated with one or more BMS devices, controllers, or functions, as described above.

The statistical analysis module 604 may contain computer code executable by the processor 508 of the processing circuit 504 for providing statistical analysis of data received from the BMS. For example, the learning module may statistically analyze user actions, data trends, operating data, feedback data, etc., to generate statistical learning data. For example, the statistical analysis module 604 may analyze energy cost data over a period of time, and generate statistical learning data to anticipate when energy cost will be highest, which may be used to suggest energy conservation methods to a user via one or more agents. Further, where energy storage devices are present in the BMS, the statistical analysis module 604 may be used to predict when the best times for charging and discharging the energy storage devices may be, which may be pushed to one or more agents in the BMS.

The knowledgebase interface module 606 may provide access to the data stored in a knowledgebase, such as that stored in database 516, described above. This can allow the correlation module 602 and the statistical analysis module 604 to access data stored in one or more knowledgebases associated with the system 500 via the knowledgebase interface module 606. In some examples, the feedback database 612 may also be able to access one or more knowledgebases associated with the system 500. In some embodiments, one or more of the correlation module 602, the statistical analysis module 604, the machine learning module 612, the model predictive engine 614, the test-observe learning engine 616, and the model free optimization learning engine 618 may be able to write data to the one or more knowledgebases of the system 500 via the knowledgebase interface module 606. The cloud-based services interface 614 may allow the learning engine 512 to interface with one or more cloud applications, such as cloud-based application 518 of system 500.

The machine learning module 612 may provide a machine learning engine to perform machine learning based on data received from the BMS 500 and/or the database 516. For example, the machine learning module 612 may build a model from an existing set of data and analyze subsequently received data to generate data driven predictions or decisions. In one embodiment, the machine learning module 612 may generate algorithms that can learn from the available data, and that are not required to follow generally static program instructions. In one embodiment, the machine learning module 612 may perform machine learning tasks using a supervised learning system. In other embodiment, the machine learning module 612 may perform machine learning tasks using an unsupervised learning system or a reinforcement learning system. Further, the machine learning module 612 may utilize learning to learn, or developmental learning operations. In one embodiment, the machine learning module 612 may utilize learning algorithms, including, but not limited to: decision tree learning algorithms, association rule learning algorithms, artificial neural networks algorithms, deep learning algorithms, inductive logic programming algorithms, support vector machines algorithms, clustering algorithms, Bayesian network algorithms, reinforcement learning algorithms, representation learning algorithms, similarity and metric learning algorithms, sparse dictionary learning algorithms, and/or genetic algorithms. In some embodiments, the machine learning module 612 may provide generated machine learning algorithms to one or more software agents to generate self-learning software agents. The methods of generating and/or configuring software agents will be described in more detail below.

The model predictive engine 614 may generate model predictive control algorithms to be used by the controller 502. In one embodiment, the model predictive engine 614 may generate model predictive control algorithms based on internal dynamic models of the system, a history or past control moves, and an optimization cost function to calculate the optimum control moves. In one embodiment, the model predictive control algorithms may be nonlinear model predictive control algorithms. In other embodiments, the model predictive control algorithms may be robust model predictive control algorithms. The model predictive engine 614 may generate the predictive control algorithms and process data received by the controller 502. The model predictive engine 614 may then output the generated algorithms to one or more software agents. In other embodiments, the model predictive engine 614 may generate the model predictive control algorithms and subsequently output the algorithms to one or more software agents in the system 500. The methods of generating and/or configuring software agents will be described in more detail below.

The test-observe learning engine 616 may generate testing algorithms based on performing a given test and observing the results. For example, the test-observe learning engine 616 can vary multiple setpoints within system 500, and monitor the outputs to determine reactions of the system 500. In some embodiments, the reactions may be based on outputs of the system 500. In other embodiments, the reactions may be based on user feedback. For example, the user may respond that they did not like the outputs from a particular test generated by the test-observe learning engine 616, which may then store the user feedback as a result and modify future tests accordingly. In some embodiments, the test-observe learning engine 616 may generate one or more software agents to perform and monitor the tests. In some embodiments, the test-observe learning engine 616 may utilize existing software agents to perform and monitor the tests. In one example, the test-observe learning engine 616 may utilize one software agent to perform a given test, and utilize a second software to monitor the test. The methods of generating and/or configuring software agents will be described in more detail below.

The model free optimization learning engine 618 may generate one or more optimization models based on historical time series and/or real-time data of the system 500. The model free optimization learning engine 618 may utilize one or more model free methods to generate the optimization models. Example model free methods can include: generate-and-test, enumeration, table lookup, mindless copying, adaptation, and/or evolution. These method-free methods may allow the model free optimization learning engine 618 generate one or more optimization models without understanding the system 500 prior to being tasked with optimizing the system 500. In one embodiment, the model free optimization learning engine 618 may provide the one or more optimization models to one or more software agents within the system 500. In other embodiments, the model free optimization learning engine 618 may generate one or more software agents to execute the optimization models. In other embodiments, the model free optimization learning engine 618 may generate or utilize one or more software engines within the system 500 to execute one or more model free methods to develop an optimization model. The methods of generating and/or configuring software agents will be described in more detail below.

Figure 7:
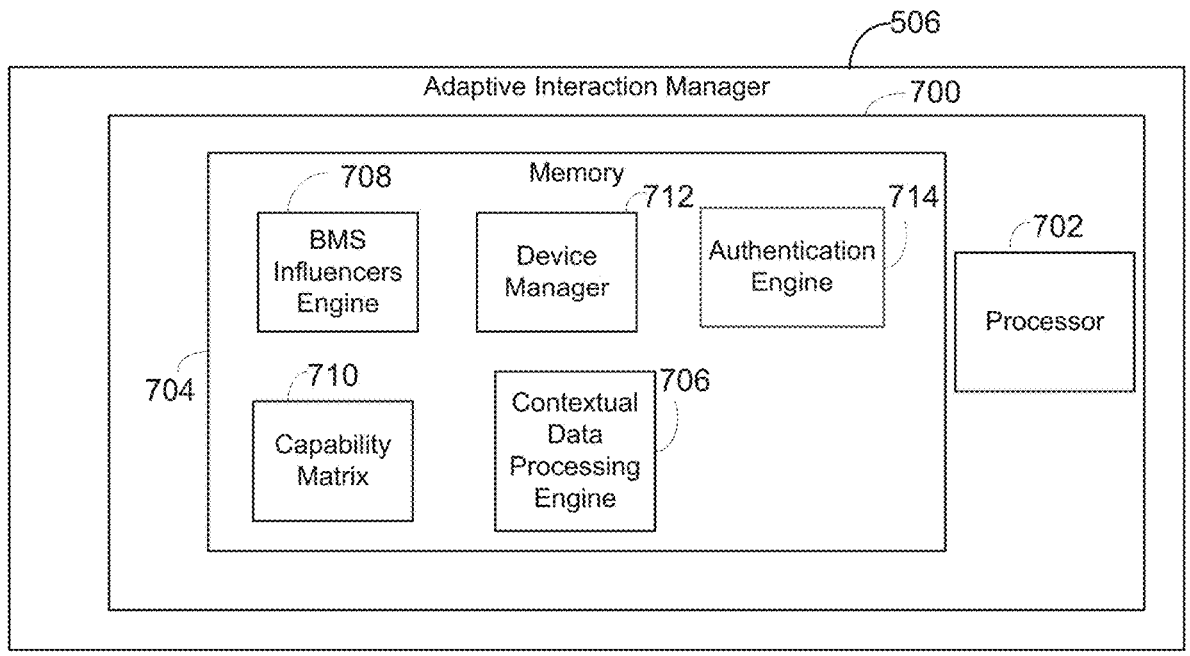
FIG. 7 is a block diagram illustrating a detailed view of the adaptive interaction manager of FIG. 5, according to some embodiments.

Turning now to FIG. 7, a block diagram showing a detailed view of the adaptive interaction manager 506 is shown, according to some embodiments. The adaptive interaction manager 506 includes a processing circuit 700. The processing circuit 700 includes a processor 702 and a memory 704. While the adaptive interaction manager 506 is shown to include a separate processing circuit 700, it is contemplated that the adaptive interaction manager 506 may use processing circuit 504, described above, in some examples. The processor 702 may be a general purpose or specific purpose processor, an application specific integrated circuit (ASIC), one or more field programmable gate arrays (FPGAs), a group of processing components, or other suitable processing components. The processor 702 is configured to execute computer code or instructions stored in the memory 704, or received from other computer readable media (e.g., CDROM, network storage, a remote server, etc.).

The memory 704 may include one or more devices (e.g., memory units, memory devices, storage devices, etc.) for storing data and/or computer code for completing and/or facilitating the various processes described in the present disclosure. The memory 704 may include random access memory (RAM), read-only memory (ROM), hard drive storage, temporary storage, non-volatile memory, flash memory, optical memory, or any other suitable memory for storing software objects and/or computer instructions. The memory 704 may include database components, object code components, script components, or any other type of information structure for supporting the various activities and information structures described in the present disclosure. The memory 704 may be communicably connected to the processor 702 via the processing circuit 700 and may include computer code for executing (e.g., by the processor 702) one or more processes described herein. When the processor 702 executes instructions stored in the memory 704, the processor 702 generally configures the processing circuit 700 to complete such activities.

The memory 704 may include a contextual data processing engine 706, a BMS influencers engine 708, a capability matrix 710, a device manager 712 and an authentication engine 714. The contextual data processing engine 706 may include one or more contextual data processes for processing provided contextual data. The contextual data processing engine 706 may further include multiple applications. For example, the contextual data processing engine 706 may include voice-to-text applications, gesture recognition applications, etc. While shown as a standalone module in the adaptive interaction manager 506, the contextual data processing engine 706 may be within one or more generated agents. The contextual data processing engine 706 may be used to allow adaptive interaction manager 506 to interface with a user to determine additional information regarding the operation of the agent. In one example, the contextual data processing engine 706 may receive a contextual input from a user 538 via the one or more I/O devices 534, such as "unit X is concerning. In some embodiments, the contextual data processing engine 706 may work with the one or more cloud-based applications 518 via the adaptive interaction manager 506. The contextual data processing engine 706 may then instruct the adaptive interaction manager 506 to respond with contextual based questions related to problems associated with unit X to obtain more information. For example, the task conditioning module may respond to the user 538, via an I/O device 534 with the questions "It seems you are having an issue with Unit X, what seems to be the problem." The user 538 may then follow up with additional information related to the specific issues related to Unit X. The contextual data processing engine 706 may also access relevant data to associated with Unit X to see if there are any issues. For example, the task con may access Unit X to determine if there are any alarms, or if any parameters are outside of an ideal range. In some examples, the contextual data processing engine 706 may review the historical data associated with one or more parameters of Unit X to determine if there are any abnormal variances. The contextual data processing engine 706 may use the provided data to provide a contextual guess as to what the user is concerned about, and communicate that to the agent manager 514 to have an agent return the requested information, as will be described in more detail below. The contextual data processing engine 706 may further be able to poll relevant data to determine what problem or issue with Unit X the user may be having. Example relevant data may include time series data, ontology data, etc.

Once the issue is determined by the contextual data processing engine 706, the contextual data processing engine 706 provide information to the agent manager 514 to instruct an agent to either try to correct the issue, or make suggestions to the user regarding how to address the determined issue. For example, if it is determined that the issue is that the humidity is too high in a room associated with Unit X, an agent may instruct the unit to adjust a damper to reduce the humidity. Alternatively, the agent may respond with instructions to the user 538 to recommend the user 538 adjust the damper, where the damper cannot be automatically controlled using the agent. In one embodiment, the user 538 is presented with the proposed solution and must give a command to proceed with the proposed solution before any actions are performed by the agent.

Further, the contextual data processing engine 706 may store the information associated with the provided contextual input (e.g. "unit X is concerning") to create a historical background associated with the contextual content of the contextual input. For example, the contextual data processing engine 706 may store how the term "concerning" was responded to in this instance. The historical background may be stored in a knowledgebase of the database 516. Further, the contextual data processing engine 706 may provide the historical background associated with the received contextual input to the database 702 for later access when the specific contextual content is provided by a user. For example, the contextual term "concerning" may be stored as relating to "excess humidity" in the database 702. In some instances, the contextual term may be linked to a specific device, location or user. For example, the contextual term "concerning" may be stored as relating to "excess humidity" when used either in context with Unit X, or when used by a specific user. This can allow the contextual data processing engine 706 to develop a more accurate library of contextual terms and linkages for improving accuracy of agents generated by the agent manager 718.

The BMS influencer engine 708 may be configured to receive data from one or more of the processing circuit 504, the BMS 525, one or more I/O devices 534 and/or cloud-based applications 518. The BMS influencer engine 708 may monitor and process data which may influence the operation of BMS 525. For example, BMS influencers may include weather data, device information, device and/or system schedules, energy usage, energy costs, building occupation schedules, etc. The BMS influencer engine 708 may provide the BMS influencers to the agent manager 514 and/or the learning engine 512 to assist in the maintenance and generation of agents in the system 500. In some embodiments, the agents, such as agent 'A' 524 may be able to access data within the BMS influencers engine 708 to modify their operation in light of the BMS influencers for the system 500.

The capability matrix 710 may keep a log of all existing agents generated in the system 500. In one embodiment, the capability matrix 710 includes all currently active agents, as well as all previously generated agents which are no longer active. The capability matrix 710 may further include the functionality associated with each agent listed in the capability matrix 710. The capability matrix 710 can provide information to the agent manager 514 for use in managing and generating agents, as required. By keeping a log of all agents and their functionality, the capabilities matrix may provide for a quick analysis by the agent manager 514 to determine if a new agent needs to be created, or if an existing or previously created agent could perform the required functions. Further, the agent manager 514 and/or the learning engine 512 may access the capabilities matrix 710 to determine if a previously generated agent may be modified to provide additional functionality, as required. For example, a previously generated agent may have generated a report on energy usage for a chiller. The agent manager 514 may be able to determine that a simply modification to the previously generated agent may allow for quickly generating a similar agent for generating reports on energy usage for a boiler. Further, the capabilities matrix 710 may include permissions and/or accesses associated with each of the agents. For example, the permissions and/or access of a given agent may be set based on the permission and/or access of the user who created the agent. In other embodiments, a user or supervisor can set the permission and/or access associated with each agent.

The device manager 712 may include a log of all of the devices in the BMS 525. In one embodiment, the device manager 712 may include the types of devices, as well as functionality, communication capability, current software and firmware versions, I/O, configurations, setpoints, profiles, etc. for each of the individual devices on the BMS. The device manager 712 may provide this information to the agent manager 514, which may further provide the information to the agent generator 522 to aid in the generation or modification of agents in the system 500. Finally, the parallel agent generation manager 716 may monitor and manage multiple agents, where multiple agents are necessary or useful in solving a particular problem. In some embodiments, multiple agents may be used in parallel to perform certain actions. For example, multiple agents may be used to address a problem by generating a hypothesis, and then subsequently testing the hypothesis. By using multiple agents, the workload can be spread out among multiple systems to allow for quicker analysis of data. In some examples, the parallel agents can use a divide and conquer technique to perform complex tasks more efficiently. For example, multiple agents can be generated to address a potentially faulty device. In one example, the agents are generated only as needed. Furthermore, the parallel agents can communicate with each other to build upon the information gathered/learned by an individual agents as discussed below, thereby allowing for more effective performance by the parallel agents in general.

The authentication engine 714 may be configured to provide encryption and authentication services to the adaptive interaction manager 506. In some embodiments, the authentication engine 714 is configured to user seed-key encryption methods to generating a dynamic key by encrypting a manifest with a crypto key and a seed. The authentication engine 714 may be configured to receive the dynamic key, decode the dynamic key, and generate the manifest. The authentication engine may then determine if the manifest stored on one or more of the BMS devices 526, 546, 548 in the system needs to be replaced or updated. In some embodiment, the manifest is a relationship between devices, groups, user, and/or entitlements (e.g., control actions, software licenses, etc.). In some embodiments, the authentication engine 714 may be configured to user one or more encryption methods to encrypt communications from the controller 502, such as to the cloud-based application 518, the knowledgebase 516, the I/O device 534, and/or the BMS devices 526, 546, 548. Example encryption methods can include Triple DES, RSA, Blowfish, Twofish, AES, private key encryption, public key encryption, seed-key encryption, a proprietary encryption method, and/or any other method that can be used to encrypt the communications to and from the controller 502.

Figure 8:
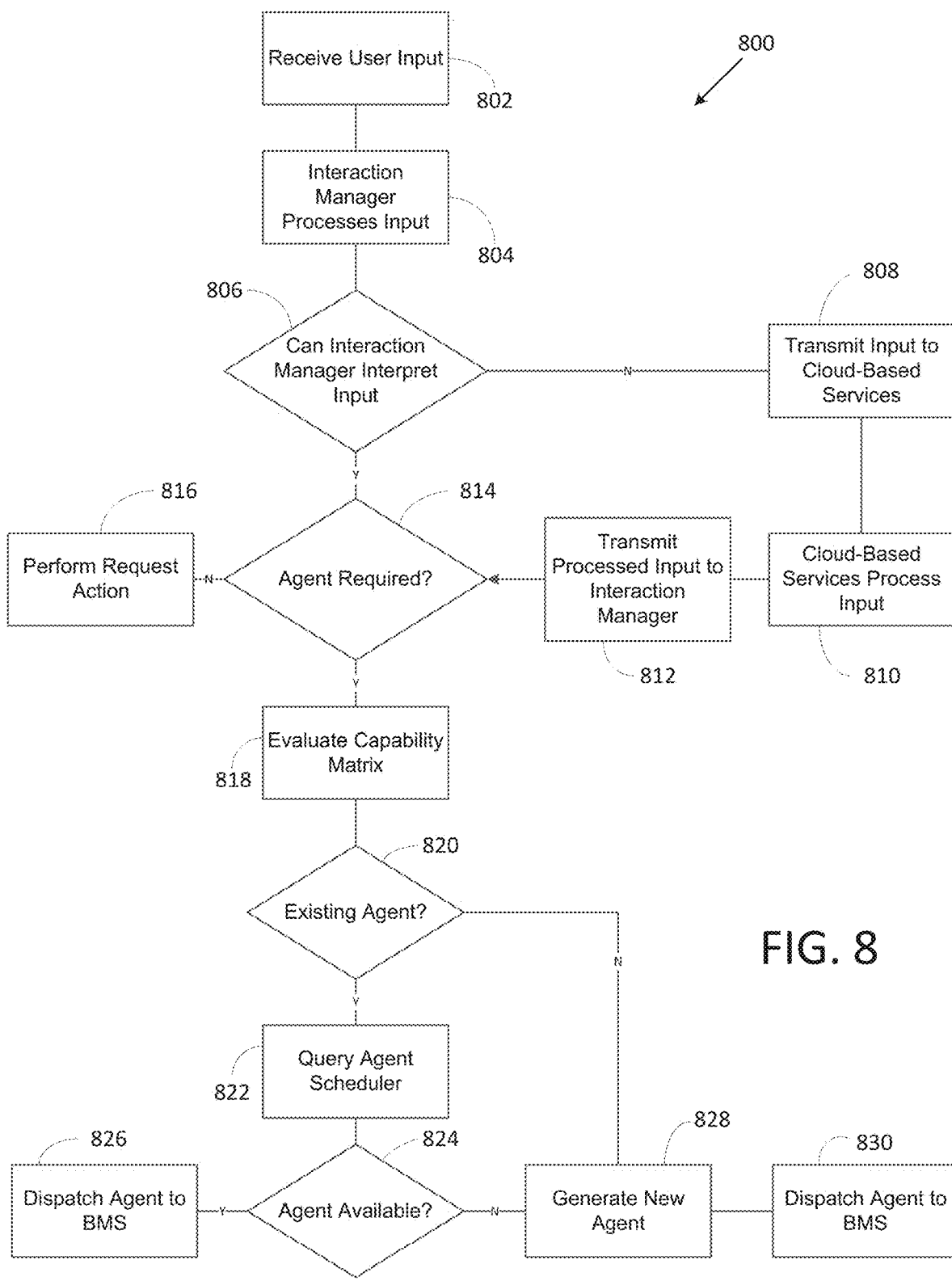
FIG. 8 is a flow chart illustrating a process for dispatching software agents in the system of FIG. 5, according to some embodiments.

Turning now to FIG. 8, a flow chart illustrating a process 800 for dispatching agents into system 500 is shown, according to some embodiments. At process block 802, a user input may be received. In one embodiment, the user input is received at the adaptive interaction manager 506 via the one or more I/O devices 534 described above in FIG. 5. Example user inputs can include voice commands, gesture commands, textual inputs (e.g. e-mail, text message, user interface), etc. At process block 804, the adaptive interaction manager 506 attempts to process the received input. In one example, the adaptive interaction manager 506 may use the contextual data processing engine 706 to process the received user input. For example, where the received user input is a voice command, the contextual data processing engine 706 may utilize a natural language processor to interpret the voice command. The contextual data processing engine 706 may further use contextual information gathered over time to help interpret the user input, as will be described in more detail below.

At process block 806, the adaptive interaction manager 506 determines if the user input can be interpreted. In some embodiments, the adaptive interaction manager 506 may not be able to interpret certain commands, such as gesture commands. Further, in some instances, the adaptive interaction manager 506 may not be able to process voice commands, instead relying on a cloud-based application 518 to perform the interpretation. If the adaptive interaction manager 506 cannot interpret the input, the user input is transmitted to one or more cloud based applications 518 at process block 808. The cloud-based applications 518 may be any of the cloud-based applications described above in regards to FIG. 5. At process block 810, the cloud-based applications 518 process the user input. At process block 812, the cloud-based applications 518 transmit the interpreted user input to the adaptive interaction manager 506, where the adaptive interaction manager 506 finishes processing the user input. In one embodiment, the adaptive interaction manager 506 processes the user input to determine what is being requested, and what response is required.

At process block 814, the adaptive interaction manager 506 determines if an agent is required to respond to the user input. If an agent is not required, the adaptive interaction manager 506 may perform the requested action at process block 816. Instances where an agent may not be required is where a simply data request from the BMS is requested, such as a request for a device parameter. In some instances the adaptive interaction manager 506 may be able to directly interface with the BMS via system interface 544. Other examples may include requests for information relating to the adaptive interaction manager 506 and/or the processing circuit 504 of controller 502. For example, if the user input requests a list of all active agents, the adaptive interaction manager 506 may access the agent scheduler 520 of the agent manager 514 to obtain the information, which can then be provided to a user via the I/O devices 534. If an agent is required, the adaptive interaction manager 506 may access the capability matrix 710 at process block 818. In one embodiment, the capability matrix 710 is analyzed to determine if an active agent can respond to the request.

If the adaptive interaction manager 506 determines that an active agent can respond to the request at process block 820, the adaptive interaction manager 506 can query the agent scheduler 520 at process block 822. In one embodiment, the adaptive interaction manager 506 sends a specific query to the agent scheduler 520 regarding the agent determined at process block 818 to be able to respond to the request. The agent scheduler 520 can determine if the agent is available to respond to the request at process block 824. If the agent is determined to be available at process block 824, the agent can be dispatched to the BMS at process block 826. Dispatching agents to the BMS will be described in more detail below. If the agent is not available, a new agent can be generated at process block 828. Additionally, if the adaptive interaction manager 506 determines that an active agent does not exist at process block 820, a new agent can be generated at process block 828.

In one embodiment, the adaptive interaction manager 506 interfaces with the agent generator 522 to generate the new agent at process block 828. In some examples, the adaptive interaction manager 506 may provide information from the capability matrix 710, the BMS influencer engine 708 and/or the device manager 712 to the agent generator 522. For example, the capability matrix 710 may provide information to the agent generator 522 regarding similar agents generated in the past with similar required functionality. Further, the BMS influencer engine 708 may provide information regarding the BMS 525 to the agent generator 522, such as current parameters, energy usage characteristics, schedules, etc. The information from the BMS influencer engine 708 may provide guidance to the agent generator 522, which can be used to further configure the agent as required to respond to the request. Finally, the device manager 712 can provide information regarding one or more devices of the BMS 525 to the agent generator to ensure that the generated agent is properly configured to work with the necessary devices within the BMS 525. At process block 830, the generated agent may be dispatched to the BMS 525.

Figure 9:
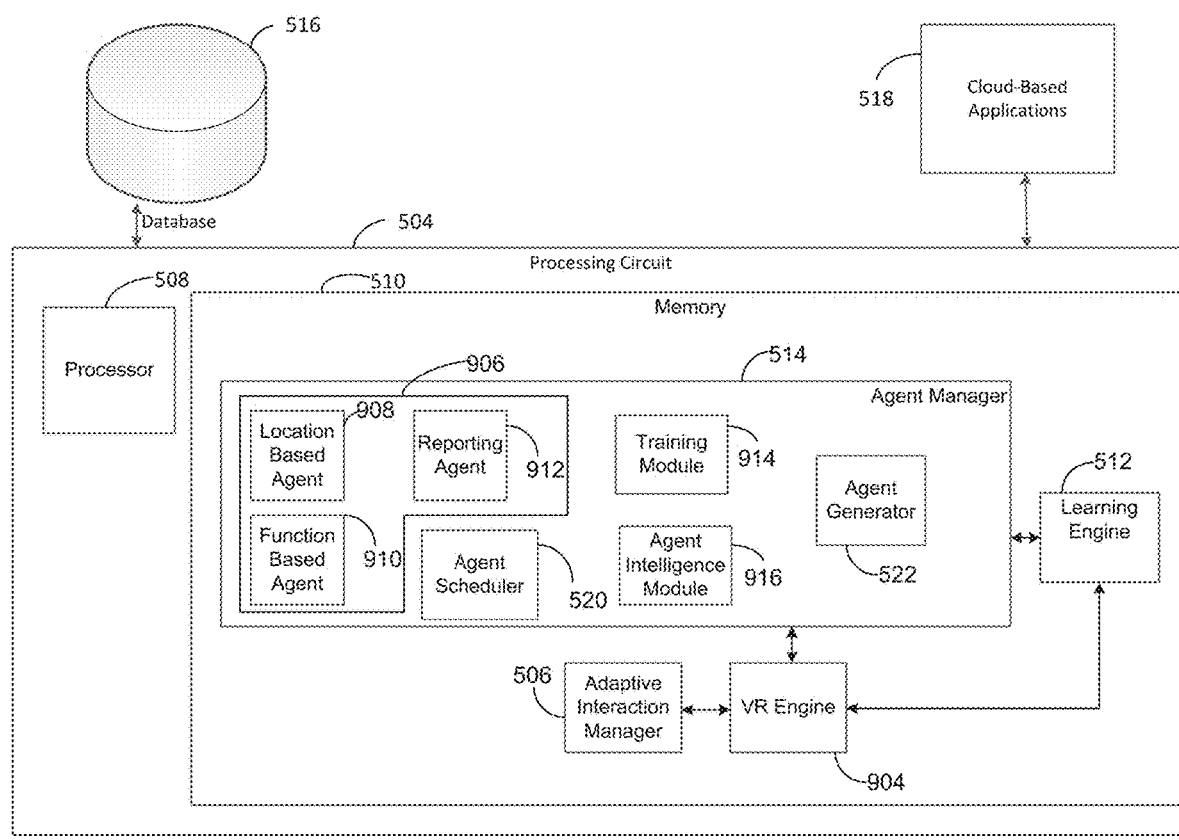
FIG. 9 is a block diagram schematic of the processing circuit of the controller of FIG. 5, according to some embodiments.

Referring now to FIG. 9 a block diagram schematic of the processing circuit 504 of the controller 502 is shown, according to one embodiment. As described above, the processing circuit may be in communication with the database 516, and one or more cloud-based applications 518. The database 516 may include data relating to one or more BMS's, such as building layouts, system schematics, device information, control schemes, environmental ratings, historical data, etc. In one embodiment, the database 516 includes contextual information accessible by the processing circuit. The contextual information may include dictionaries, historical data, scripts, and/or other data for interpreting contextual information. The one or more cloud-based applications 518 may be those described above. The one or more cloud-based applications 518 may further be able to communicate with the processing circuit 504 to provide data to or from other applications. In some embodiments, the processing circuit 504 may access the one or more cloud-based applications 518 directly. In other embodiments, the processing circuit 504 may access the one or more cloud-based applications 518 via the adaptive interaction manager 506.

The processing circuit 504 is shown to include the processor 508 and the memory 510, as described above. In one embodiment, the memory 510 includes the agent manager 514, the learning engine 512, the adaptive interaction manager 506, and a VR engine 904. In one embodiment, the VR engine 904 is used to process the information processed by the learning engine 512, the agent manager 514 and/or the cloud-based applications 518. For example, the VR engine 904 may be used to process voice-to-text information provided by the cloud-based applications 518. Further, the VR engine 904 may have the ability to communicate with one or more BMS devices or systems to read and/or write parameters via the BMS interface 528, as described above. Further, the VR engine 904 may be a virtual assistant engine which can process information provided via the applications. In some examples, the VR engine 904 may be a third party VR engine, such as Apple's Siri, Microsoft's Cortana, or Amazon's Alexa. The third party VR engines may be stored locally in the memory 510, or accessed via an internet connection. In some embodiment, the VR engine 904 processes information received from the adaptive interaction manager 506, via the adaptive interaction manager interface 530.

The memory 510 may further include the agent manager 514. While the agent manager 514 is shown to be within the memory 510, it is contemplated that the agent manager 514 may be a cloud-based agent manager 514 accessible by the processing circuit 504 or the adaptive interaction manager 506. In one embodiment, the agent manager 514 generates and manages one or more agents 906 using the agent generator 522, as will be described in more detail below. The agents 906 may be software applications that can run automated tasks (scripts). The agent generator 522 may generate the agents 906 based on information provided by the adaptive interaction manager 506. In one embodiment, the agents 906 generated by the agent generator 522 may be configured to perform simple or complex tasks within a BMS or other system. For example, the agents 906 may interact with portions of a BMS system, such as those described in FIGS. 1-4 above. In some examples, the generated agents 906 may be communicated directly to one or more devices within the BMS to perform the designated actions, as described in more detail below.

In one embodiment, a user defines the agents 906 to be generated by the agent generator 522 during an initial setup period of the controller 502. Alternatively, a user may dynamically define one or more agents 906 to be generated by the agent generator 522. The user may define the agents 906 by defining parameters and permissions associated with the agents 906, via one or more I/O devices 534. For example, where the agent 906 is to interact with a BMS device, a user may define information related to the BMS to the agents 906, such as parameters associated with one or more BMS devices, BMS device data, network data, general BMS data (building layout, control scheme, BMS equipment), schedules, etc. Alternatively, other information such as facility calendars, e-mail access (maintenance accounts, authorized personnel accounts, etc.) may also be set for an agent. Further, permissions such as controllable set-points, ranges within which the agent can modify certain parameters, scheduling changes, etc., may also be defined with the agents 906. The permissions may be based on the user defining the agents 906. Alternatively, the user, with the proper permission, may set the permissions for other users who may interface with the agents 906.

In one embodiment, the user can define the agents 906 via the one or more I/O devices 534, as described above. Alternatively, the user may be able to define the agents using a voice or gesture command. In one embodiment, the agent manager 514 is able to dynamically define and generate agents 906 based on commands or requests received from a user. For example, the agent manager 514 may access the learning engine 512 to dynamically define and generate agents 906, which will be discussed in more detail below. The agent manager 514 may further be able to generate agents based on contextual data received from a user, such as that described above. For example, where a user states that "it is hot in here," an agent 906 may be generated by the agent manager 514 to determine the temperature at the location of the user, and potentially interface with the user to reduce a temperature of an area of a facility. Further, permissions may be dynamically created by the agent manager 514. For example, the agent manager 514, receiving a request to set up an agent 906 from a user, may identify the user and then access the database 516 (or other connected database) to determine the permission levels associated with that user. Additionally, permissions may be based on certain locations or areas within a facility. The permissions may determine which parameters are available for the generated agent 906 to read and/or write.

In one embodiment, the agent manager 514 may generate a location based agent 908. The location based agent 908 may have defined parameters and permissions associated with a given location with a BMS and/or facility. For example, the executive suite may require additional permissions than a normal conference room. In one embodiment, the location is based on the location of the user defining the agent 908 (e.g. "lower the temperature in this room"); however, the location may also be based on the location of the system or device that the user is attempting to monitor/control (e.g. "lower the temperature in room XYZ"). In one embodiment, the location is established by determining a location of a fixed position user interface, such as I/O devices 534 described in FIG. 5, above. For example, where the I/O device 534 is a smart thermostat, the agent manager 514 may access the database 702 to determine a location associated with the user interface. In other examples, the I/O device 534 may provide its location to the agent manager 514 directly when communicating with the adaptive interaction manager 506. In other examples, the I/O device 534 may not have a fixed location, such as where the I/O device 534 is located on a mobile device. In one embodiment, the I/O device 534 provides location information regarding the location of the I/O device 534 to the adaptive interaction manager 506. For example, the I/O device 534 may provide GPS data, altimeter data, Wi-Fi data, etc. to the adaptive interaction manager. In one embodiment, the agent manager 514 compares the location data with building and/or facility layout data in the database 516 to determine a location of the I/O device 534 in relation to a BMS and/or building/facility.

In a further embodiment, the agent manager 514 may generate a function-based agent 910. The function based agent 910 may have defined parameters and permissions associated with a given function or series of functions associated with a BMS. For example, the agent manager 514 may generate a functional-based agent 910 such as an "energy management agent." The energy management agent may be defined to monitor and/or evaluate energy related data associated with a BMS. For example, the energy management agent may monitor and evaluate energy related data such as kWh, peak demand, etc. Other functional-based agents 910 may include chiller management agents, HVAC management agents, lighting management agents, etc. In some embodiments, the function based agents 910 are configured by the agent manager 514 to generate context specific reports for related functions. In some examples, the function-based agents 910 may evaluate the user, type of available data, location, etc. and generate dynamic reports. In other examples, the user can define what parameters/data is requested in the reports. In still further examples, a user may be able to modify the dynamically generated reports over time by indicating which data is and is not required and/or desired by the user. Further, the user can provide feedback to the function-based agent 910 to provide additional guidance related to the frequency with which the reports should be generated (i.e. daily, weekly, monthly, etc.). While the function-based agent 910 or the location based agent 908 may generate reports, a report generating agent 912 may also be generated to produce reports. In one embodiment, the report generating agent 912 may be able to generate reports across multiple locations and/or functions.

The above described agents are exemplary only, and it is contemplated that other agent types may be generated to provide any functionality within the capability of the system 500. Further, it should be known that one or more of the location based agent 908, the function based agent 910 and the reporting agent 912 may be combined into a single agent generated by the agent generator 522. For example, a BMS-need agent may be generated. The BMS need agent may be an autonomous agent that can evaluate current needs of the BMS 525, and perform tasks independently to address the needs. Further, a BMS sequence optimizer agent may be generated. The BMS sequence optimizer agent may be utilized to evaluate the sequence of operations within the BMS 525. The BMS sequence optimizer agent may then perform optimization functions to the sequences of the BMS 525 to increase the operating efficiency of the BMS 525.

The agent manager 514 may further include a training module 914, and an agent intelligence module 916. The training module 914 is an exemplary module that may be within the agent manager 514. The training module 914 can be used to train one or more of the agents generated by the agent manager 514. The training module 914 may define boundaries and expectations associated with agents generated by the agent generator 522. While the training module 914 is shown as a standalone module in the agent manager 514, the training module 914 may be incorporated into one or more generated agents. In one example, the training module 914 may define what parameters for a given BMS devices may or may not be adjusted. The training module 914 may also define value ranges within which parameters associated with BMS devices may be adjusted. In other examples, the training module 914 may train the agents by defining other conditions required to modify or access certain parameters. For example, parameters associated with certain BMS devices may only be accessible during certain times, by certain users, etc. In one embodiment, the training module 914 may be in communication with the database 516 to access information about the BMS and associated devices, such as schedules, permissions, rules, connected systems, etc.

In some embodiments, the adaptive interaction manager 506 can provide information to the training module 914 to further train the agents generated by the agent manager 514. For example, user data may be presented to the adaptive interaction manager 506 via the I/O devices 534 indicating when the user would like certain functions to be performed by one or more of the generated agents. This information can be processed by the adaptive interaction manager 506 and passed to the training module 914 via the processing circuit 504. For example, the user may want reports generated at a certain time each day, and that the reports contain information gathered over a user defined time period. Further, the user may define what information is desired to be in the report. In other examples, user data may instruct the training module 914 to "train" the agents to perform certain tasks such as optimization of energy usage during certain times or in certain locations.

The training module 914 may further allow for user specified outcomes and objectives to be used to further train generated agents 906. By allowing for user specified outcomes and objectives to be used, the agents can constantly evolve to provide more accurate feedback. Examples of user specified outcomes and objectives training can include feedback after mistakes or incorrect outputs are generated by an agent 906. In one example, an agent 906 may suggest and perform a particular function, and subsequently provide a report to a user indicating the outcome associated with the performed action. The user then may be asked if the agent 906 should continue to perform the particular function in the future. This information may be stored in an agent 906, as well as the training module 722. This can allow the training module 722, and the agent manager 514 in general, to learn what is likely to be acceptable by the user. Further, this information can be provided to the learning engine 512, which may process the feedback to help learn from previously generated agents. For example, a function-based agent 910, such as an energy management agent, may suggest running chillers in parallel to decrease the time to regulate temperature in a portion of a facility when there are sudden temperature swings (e.g. when a large group of people enter a room to attend a meeting). However, if the cost is too high to run parallel chillers, a user may instruct the agent 910 to stop running the chillers in parallel. This information is gathered by the training module 914 and provided to the learning engine, which may update a knowledgebase. In some embodiments, the training module 722 may store the information in the database 516. Over time, the training module 722 may collect enough information to learn what are acceptable costs for certain gained efficiencies and can instruct the agent 906 to perform its tasks accordingly. In still further examples, the training module 914 may include cost restrictions associated with agent functions. For example, some actions may not be allowed where it is determined that the associated cost would exceed a given value. In other examples, the cost restrictions may be associated with the user presenting the request. In that instance, a supervisor, or person with authority to approve the cost may be contacted, and allow to approve/disapprove the change. For example, a text message could be generated and transmitted to a mobile device associated with the authorized person who can reply to the text message to approve or deny the cost, via the adaptive interaction manager 506. Other communication methods such as e-mail, push notifications, etc., are further contemplated.

In other examples, a user may be presented with a list of possible actions that an agent can perform in certain situations, allowing a user to select which particular action should be performed. In one embodiment, the possible actions are presented to the user via a user interface, such as those described above. Further, the training module 914 may store the user selections (e.g. in the database 516) and learn over time how a user generally proceeds, and take the actions without consulting the user in each occurrence.

In a further embodiment, the training module 914 may provide an agent 906 with new rules via the agent manager 514. For example, a user 538 may be presented with a question of "would you like an alert if this (a given situation) happens again" via an I/O device 534. If the user responds in the affirmative, the training module 914 may create a rule within the associated agent 906 to generate an alert to be provided to the user 538 when the condition occurs in the future. Further, the user may be prompted if they "would like a monthly report showing data for Unit X?" Again, if the user responds in the affirmative, the training module 914 may create a rule within the associated agent 96 to generate a monthly report showing data for unit X. Alternatively, the training module 914 may instruct the agent generator 522 to generate a reporting agent associated with unit X, and provide parameters around what should be included in the report. Further, the above alert rules and reports may be modified over time as more information becomes available. For example, more rules may be added, such as providing for alerts regarding changes to preventative maintenance (PM) schedules, and/or assignments of maintenance persons.

The agent manager 514 may further include an agent intelligence module 916. The agent intelligence module 916 may evaluate a request by a user 538 to attempt to provide intelligence around the generated agent 906. For example, the agent intelligence module 916 may determine what the user's 538 purpose is in generating the request. For example, the agent intelligence module 916 may analyze if the purpose is to generate a report, optimize a system, perform simple or complex controls, etc. This may be used by the agent generator 522 in determining what parameters, attributes, etc., should be placed on a generated agent. Further, the agent intelligence module 916 may determine what a user 538 wants. For example, does the user 538 want a basic or isolated data point, or does the user 538 want data to be provided over time. Further, the agent intelligence module 916 may determine what reports, sequences, or other data the user cares about. In some instances, the agent intelligence module 916 may access the database or the learning engine 512 to see what a particular user has requested in the past. Further, the agent intelligence module 916 may access the database 516 to determine what types of data, reports, etc. a user has requested or accessed over time. This information can be provided to the agent generator 522 to help customize agents to be a particular user's 538 specifications.

Figure 10:
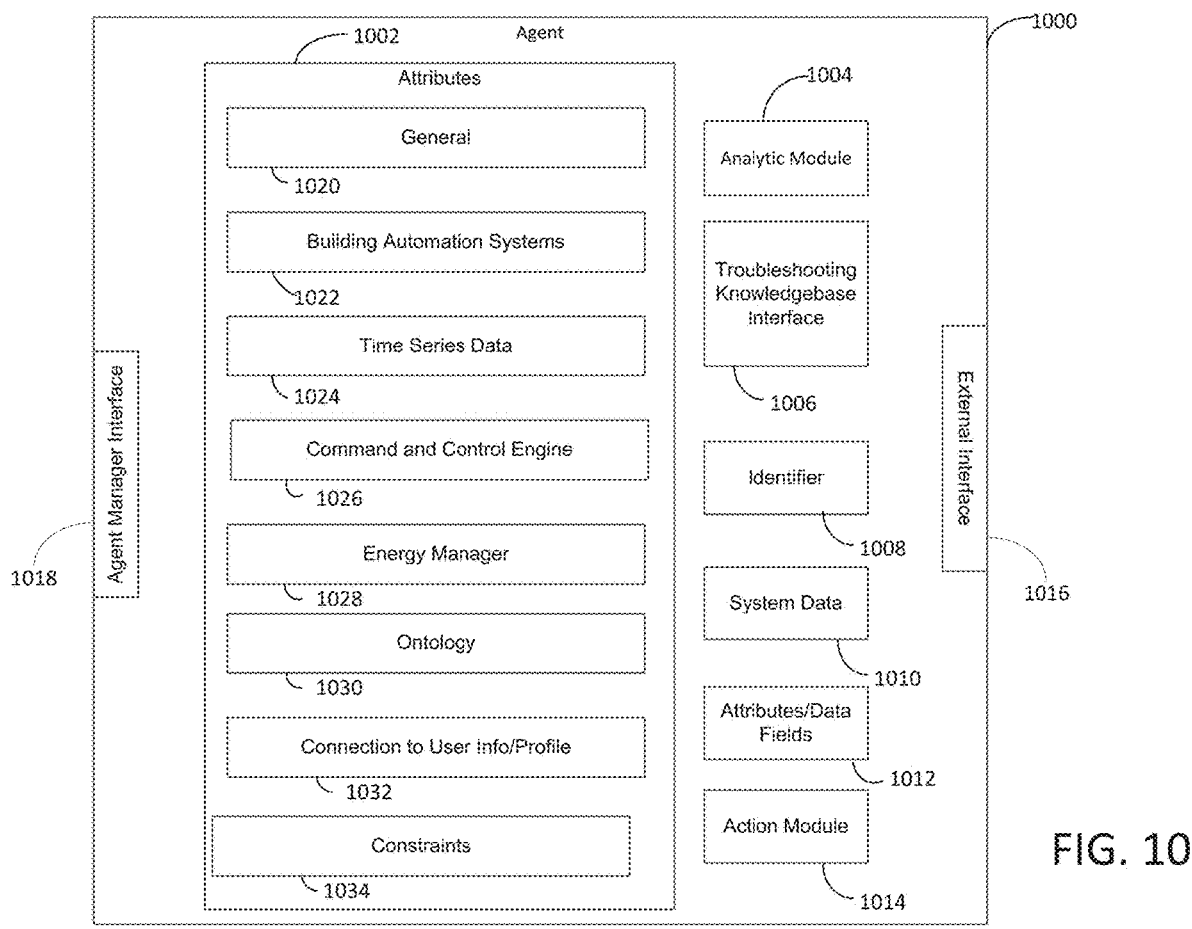
FIG. 10 is a block diagram illustrating a generated agent, according to some embodiments.

Turning now to FIG. 10, a block diagram of a generated agent 1000 is shown, according to one embodiment. The agent 1000 may include a number of attributes 1002, an analytic module 1004, a troubleshooting knowledgebase interface 1006, an identifier module 1008, a system data module 1010, an attributes/data field module, and an action module 1014. The agent 1000 may further include an external interface 1016 and an agent manager interface 1018. The attributes 1002 may be a number of connections and/or functions available to the agent 1000. As shown in FIG. 10, the agent 1000 may include a general attribute 1020, a building automation systems (BAS) attribute 1022, a time series data attribute 1024, a command and control engine attribute 1026, an energy manager attribute 1028, an ontology attribute 1030, a user info/profile attribute 1032, and a constraints attribute 1034. The attributes 1002 may be used, in conjunction with the other elements of the agent 1000 described above, by the agents to perform their designated operations. For example, the attributes 1002 can include rules, permissions, historical data, etc. which can be used to perform designated tasks by the agent 1000. In one example the attributes 1002 are located within the agent 1000. In one embodiment, the attributes 1002 simply provide for data access to the information associated with the attributes 1002. The information associated with the attributes 1002 may be gathered and provided by a central processing server, such as those described above.

The general attribute 1020 may include information such as schedules (i.e. operating schedules, PM schedules, occupancy schedules, etc.), environmental conditions (e.g. temperature, humidity, weather, etc.) time, date, or other relevant general information. In one embodiment, the general attributes 1020 are connected to external sensors, services, or databases. In one embodiment, the general attributes 1020 may be provided by a controller, such as controller 502 described above. The controller 502 may have access to various services which can provided the general attributes 1020 to the agent 1000. Alternatively, the agent 1000 may have access to the same sensors and services that the controller 500 may have. For example, the agent 1000 may be able to access weather information by communicating with one or more environmental sensors in a BMS. In other examples, the agent 1000 may have access to the internet and can access weather information from known weather websites relevant to the location of the BMS, (e.g. Yahoo Weather, Weatherbug, etc.). Alternatively, BMS influencers such as weather, and access to the internet of other cloud-based applications may be provided by the adaptive interaction manager 506, as described above.

The BAS attributes 1022 may include or have access to general building information such as layouts. The BAS attributes 1022 may further include or have access to information relating a BMS associated with the building, including control schemes, device information, etc. Further, the BAS attribute 1022 may have access to scheduling information relating to certain assets for the building. For example, the BAS attribute 1022 may have access to schedules for one or more conference rooms associated with the building. Additional schedules, such as building occupancy schedules may also be accessed by the BAS attributes 1022. The time series data attribute 1024 may provide access to long term data records related to multiple functions associated with a building. In one embodiment, the time series data may be stored on a database, such as database 516 above, and accessed by the time series data attribute 1024. The time series data attribute 1024 may be accessed by a training module or a task-conditioning module, such as those described above, to allow the agent 1000 to make decisions based on long term historical data. The command and control engine attribute 1026 may include the necessary data, including permissions, to allow the agent 1000 to perform control actions in addition to only monitoring actions.

The energy manager attribute 1028 may include an enterprise optimization system (EOS). The EOS may allow for direct communication with a utility provider such as a water company, a power company, water treatment plant, etc. to allow the agent 1000 to determine parameters such as utility rates, peak demand times, potential brown outs, etc. The energy manager attribute 1028 may further allow for communication with distributed energy storage (DES) systems. The connections associated with the energy manager attribute 1028 allow the agent 1000 to manage energy usage for a facility, building, or even an individual room within a building. The ontology attribute 1030 may provide a hierarchical listing of all the items within a given facility or building. Items may include one or more BMS devices (controllers, HVAC equipment, AHUs, VAVs, etc.), lighting, A/V resources, rooms, utilities, etc. In one embodiment, the ontology attribute 1030 provides spatial locations and configurations of BMS devices within a building or facility. The ontology attribute 1030 may further provide attributes between one or more BMS devices and an area of the building or facility. For example, the ontology attribute 1030 may provide information such as "damper BX1F affects area XYZ of building Q." In one embodiment, the ontology attribute 1030 may have access to the database 516, which may contain ontology data relating to a BMS, such as BMS 525.

The connection user info/profile attribute 1032 may include permissions associated with individual users. The connection user info/profile attribute 1032 may further include other information about the user, such as workspace location, work schedule, direct reports, supervisor, listed skills, maintenance responsibilities, etc. The above attributes examples are exemplary only, and it is contemplated that more attributes or fewer attributes may be used in the agent 1000, as required. Finally, the constraints attribute 1034 may include constraints applied to the agent. In one embodiment, the constraints can be implemented by the agent generator 522 during generation of the agent 1000. In some embodiments, the constraints are system based. For example, the constraint attributes 1034 may include BMS related constraints such as fault tolerances, communication capabilities, etc. Example communication capability restrictions may include constraints based on system communication types (mesh, P2P, hierarchical, etc.). Further communication capability constraints may include baud rates, latency, bandwidth, etc. The constraint attributes 1034 may further include information system constrains such as system storage capacity, system and/or device processing capability, timing and synchronization of data to the system, etc.

The analytic module 1004 may be a computational module capable of analyzing data received via the agent manager interface 1018, or from the system via the external interface 1016. While FIG. 10 shows only a single analytic module 1004, it is contemplated that multiple analytic modules 1004 may be located within a single agent 1000. In some embodiment, an analytic module 1004 can be created for each type of data received by the agent 1000. In other embodiments, an analytic module 1004 may be created for each function or analysis function assigned to the agent. In some embodiments, the agent 1000 may generate analytic modules 1004 dynamically to better analyze data, or perform functions based on dynamically changing inputs. For example, the agent may detect a fault or other abnormal data pertaining to a BMS device. The agent 1000 may then create an new analytic module 1004 to receive the data and provide additional analysis.

The troubleshooting knowledgebase 1006 may provide a connection to a troubleshooting knowledgebase stored on a database, such as database 516. The troubleshooting knowledgebase interface 1006 may allow the agent 1000 to access data and information provided over time by multiple agents, as well as by user such as service personnel, administrators, smart devices, etc. For example, the agent 1000 may access one or more knowledgebases via the troubleshooting knowledgebase interface 1006 to obtain historical data regarding maintenance for a given device or system. The troubleshooting knowledgebase interface 1006 may therefore provide agents with historical maintenance data as well as previous solutions presented by the problems. In one embodiment, the agent 1000 may use one or more analytic modules 1004 to analyze data received by troubleshooting knowledgebase interface 1006 to help provide more helpful information to a user. For example, the agent 1000 may perform a statistical analysis on the historical data received via the troubleshooting knowledgebase interface 1006, such as a Monte Carlo analysis. This may be used to provide probabilities regarding possible problems and solutions with a given BMS device or system. The troubleshooting knowledgebase interface 1006 may allow the agent 1000 to analyze the historical data to perform problem categorization. Problem categorization may allow the agent 1000 to analyze similar historical problems similar to the current problem and provide data and/or suggestions to a user.

In some embodiments, multiple agents may be used in parallel to perform certain actions. For example, multiple Agents may be used to address a problem by generating a hypothesis, and then subsequently testing the hypothesis. By using multiple Agents, the workload can be spread out among multiple systems to allow for quicker analysis of data. In some examples, the parallel Agents can use a divide and conquer technique to perform complex tasks more efficiently. For example, multiple Agents can be generated to address a potentially faulty device. In one example, the Agents are generated only as needed. Furthermore, the parallel agents can communicate with each other to build upon the information gathered/learned by an individual agent, thereby allowing for more effective performance by the parallel agents as a whole.

The identifier module 1008 may include identification data related to the generated agent 1000. In one embodiment, the identifier module 1008 can include a name and/or an address for the agent 1000 within the system. In some embodiments, the agent 1000 can generate its own address to allow for integration into an ad hoc network. In some embodiments, the identifier module 1008 may include other identification data of the agent 1000, such as assigned functionality, associated devices, communication protocol, size (e.g. kb, Mb, etc.), etc. In some embodiments, the data contained within the identifier module 1008 may allow other agents in the system 500 to identify each other. This can be advantageous where multiple agents are present in a system, and or parallel agent architectures are implemented.

The system data module 1010 may include information regarding the devices in the system 500. Further, the system data module 1010 may include information such as communication protocols used between devices, the communication architecture (mesh, P2P, hierarchical), available communication ports, etc. The system data module 1010 may further provide communication data such as required handshaking for communication between devices, and or in-kind communications. The system data may further include information relating to other active agents.

The attributes/data fields module 1012 may include attributes of the agent 1000. In some embodiments, the attributes can be those attributes provided by the agent generator 522 during the generation of the agent 1000. In other embodiments, the attributes can be learned attributes. In some embodiments, the agent 1000 can be configured to learn attributes over time. Example learned attributes may include report formats, data values, etc. The attributes/data fields module 1012 may further include values received via the external interface 1016 from the system, or via the agent manager interface 1018. In some embodiments, the values are sensed values, such as those provided by various sensing devices within a system. For example, voltage sensors, current sensors, temperature sensors, pressure sensors, etc., may all provide sensed values to the agent 1000. The values may also be inferred values. In one example, the analytic module 1004 may analyze one or more measured values provided by the attributes/data fields module 1012 and infer one or more values associated with the measured values, and store the inferred value in the attributes/data fields module 1012. For example, the analytic module 1004 may receive a measured current flow value (Amps) associated with a coil of an actuator from the attributes/data fields module 1012. The analytic module 1004 may then infer a temperature of the actuator, and provide that inferred data to the attributes/data fields module 1012.

Finally, the agent may include an action module 1014. The action module 1014 may generate outputs that can be output via the external interface 1016 and/or the agent manager interface 1018. For example, the action module 1014 may output a changed setpoint to a device in the BMS via the external interface 1016. In one embodiment, the action module 1014 may change the setpoint based on data provided by the analytic module 1004, the troubleshooting knowledgebase interface 1006 and/or one or more of the attributes 1002. In other embodiments, the action module may output data to a user via the agent manager interface 1018. For example, the action module 1014 may generate a report to be provided to a user, which can be communicated to the adaptive interaction manager 506 via the agent manager interface 1018. The adaptive interaction manager 506 may then output the report to a user via one or more of the I/O devices 534. In one embodiment, the agent manager interface 1018 may provide direct communication to the agent manager 514. In other embodiments, the agent manager interface 1018 may communicate with the agent manager 514 via a communication link to the adaptive interaction manager 506. The above modules and attributes shown within agent 1000 are exemplary only, and it is considered that more modules/attributes and/or less modules/attributes may be present in an agent.

Figure 11:
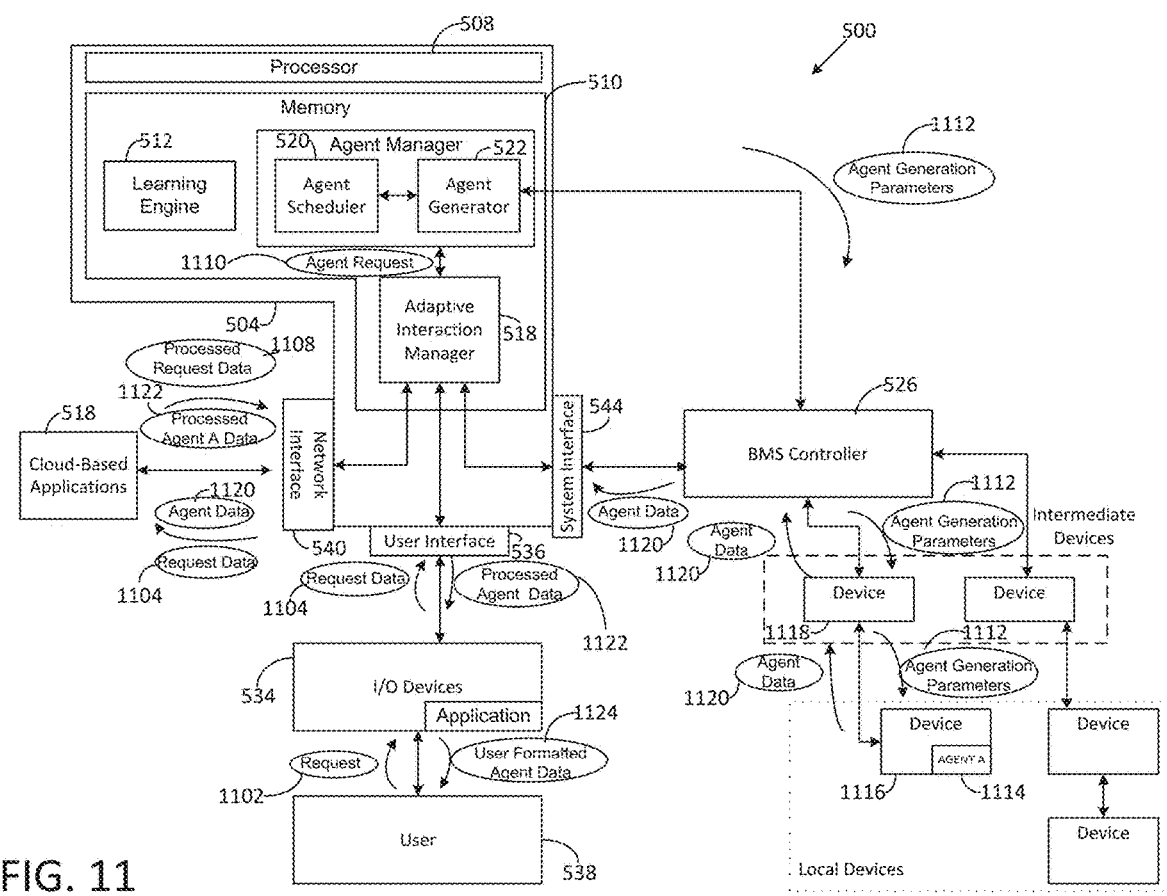
FIG. 11 is a block diagram illustrating a new agent generation data flow within the system of FIG. 5, according to some embodiments.

Turning now to FIG. 11, a block diagram illustrating a new agent generation and dispatch data flow within system 500 is shown, according to some embodiments. The user 538 may generate a request for information 1102 from the BMS 525 which is input into the system 500 via the one or more I/O devices 534. The request 1102 may be a request; however, explicit commands and or implicit requests or commands are also contemplated. Further, the request 1102 may be a spoken request, a gesture based request, a textual request, etc. An example request 1102 may be a question such as, "what is the outlet temperature on Chiller XYZ," which may be used to request temperature information about Chiller XYZ. In other examples, the user may issue a command, such as "turn off fan ABC." Other data requests examples can include "tell me about zone X," "tell me about a building configuration," "when was service last performed on Chiller XYZ." In some embodiment, the request 1102 can be in the form of one or more contextual questions. Example contextual questions can include: "it seems hot in here, is there anything wrong;" "when did the temperature go over 75° in here;" "are there any hot spots on this floor;" "is the room always warm at this time of day;" or "is there anything wrong with AHU Q." These example requests 1102 are for illustrative purposes only. It is contemplated that other contextual questions may be used as well. Other example commands can include: "set analog output 5 to 50%;" "adjust the damper to 30%;" "start auto-calibration;" "start trending discharge air temperature for VAV 20." However, additional commands are contemplated.

The I/O device 534 may then receive or capture the request 1102, and output request data 1104 to the adaptive interaction manager 506. The I/O device 534 may capture the spoken word or phrase using an internal microphone. For example, where the I/O device 534 is a smart phone, the user 538 may be able to speak the command directly into the smart phone via an application 1106. The application may be a 3$^{rd}$ party application such as Siri, or Google Voice. Alternatively, the application may be a proprietary application, such as a remote voice command application from Johnson Controls. Furthermore, other I/O devices 534 which can receive and/or capture voice inputs are also considered, such as those described above. In one embodiment, the application 1106 within the I/O device 534 can be activated by the user 538 selecting the application 1106 via a user interface of the I/O device 534. Alternatively, the application 1106 may utilize a "passive listening" functionality within the mobile device, which can allow the user 538 to activate the application via a voice command (e.g. "Alexa" or "Hey Metasys."). The application 1106 may then save the spoken word or phrase to a memory of the I/O device 534 as an audio file. The application 1106 may save the spoken word or phrase in multiple format types, such as MPEG-1 Audio Layer 3 (.mp3), waveform audio (.wav), Ogg Vorbis (.ogg), windows media audio (.wma), or any other format type required for use with the application 1106. The I/O device 534 may then provide the request data 1104 to the adaptive interaction manager 506. In some embodiments, the request data 1104 may include additional data provided by the I/O device 534, such as location information, or user information.

However, other means of providing the request data 1104 to the adaptive interaction manager are considered. For example, a user may be able to send an e-mail or text message to the adaptive interaction manager 506 via the I/O devices 534 to request actions, which may then be processed by the adaptive interaction manager 506, or one or more of the cloud based applications 518. For example, a user may send an e-mail to Agent_manager@xyzcorp.com requesting that the "energy be conserved when room ABC is not occupied," which is then interpreted by one or more of the cloud-based applications 518 and/or the adaptive interaction manager 506. The adaptive interaction manager may then interpret the request and provide the processed request data to the agent manager, requesting an agent to reduce energy usage for room ABC when it appears that room is not occupied. The agent manager 514 may then access parameters such as occupancy sensors or schedules to determine when a room is or isn't occupied, and adjust the energy usage accordingly. This can allow for a user to effect the generation and/or training of agents using simple instructions, thus allowing the agents to be used as virtual "employees."

The adaptive interaction manager 506 may receive the request data 1104 and process the request data 1104 accordingly. In some embodiments, the contextual data processing engine 706 of the adaptive interaction manager 506 may process the request data 1104. In some embodiments, the adaptive interaction manager 506, via the contextual data processing engine 706 may attempt to interpret the received request data 1104. For example, where the request 1102 is an audio file of a spoken request, the contextual data processing engine 706 may interpret the audio file and determine what the request 1102 is requesting. In some embodiments, the adaptive interaction manager 506 may not be able to interpret the request, such as where the request is a voice request, or a gesture request. The adaptive interaction manager 506 may then transmit the request data 1104 to the one or more cloud-based applications 518. The one or more cloud based applications 518 may then interpret the request data 1104. For example, Amazon Voice Services, Microsoft Cortana, Google Voice, or other voice-to-text cloud based application 518 may be utilized when the request data 1104 is an audio file of a spoken request. The cloud-based applications 518 may then interpret the request data 1104 and return the data to the adaptive interaction manager as processed request data 1108. In one example, the processed request data 1108 can be a text file (.txt) or in other textual formats for use by the contextual data processing engine 706 of the adaptive interaction manager. However, in other embodiments, the processed request data 1108 can be in whatever format is desired by the adaptive interaction manager 506.

In some examples, neither the adaptive interaction manager 506, or the one or more cloud-based application 518 will be able to interpret the request data 1104. Where the adaptive interaction manager 506 and/or the one or more cloud-based application 518 are unable to interpret the request data 1104, the adaptive interaction manager 506 may then provide a notification to the user 538 via the one or more I/O devices 534 to instruct the user 538 that the command or request could not be interpreted. In one embodiment, the adaptive interaction manager 506 provides the notification to the I/O device 534 for display on a user interface. Alternatively, the adaptive interaction manager 506 may provide an audio message informing the user 538 that the command or request could not be interpreted via the I/O device 534. In some examples the adaptive interaction manager 506 may have the one or more cloud-based applications 518 prepare the audio message, as described in more detail below. In some embodiments, the adaptive interaction manager 506 may request additional information from the user. For example, the adaptive interaction manager 506 may provide prompting questions to the user 538, via the I/O devices 534. Example prompting questions may ask if the user 538 meant something in particular (e.g. "did you mean set fan ABC to an off condition?"), or may provide the user 538 with a list of options based on the received request data 1104 (e.g., here are a list of parameters associated with Chiller XYZ, would you like to monitor one?"). Further, other methods of providing additional clarification to the adaptive interaction manager 506 are contemplated. In one embodiment, a user 538 may request help using the system 500. For example, the user may state the word "help." The adaptive interaction manager 506, receiving the request data 1104, may then access the database 516 to connect to documentation explaining the system 500. In one example, the documentation may include tool tips for explaining what specific features of the system 500 are. The documentation may be provided to the user via the I/O devices 534.

In one embodiment, the adaptive interaction manager 506 evaluates the processed request data 1108, to determine what is required to process the request 1102. For example, for the above spoken phrase example of "what is the outlet temperature of Chiller XYZ," the adaptive interaction manager 506 can first determine that the inquiry is about Chiller XYZ. adaptive interaction manager 506 may first determines if Chiller XYZ is a valid component in the BMS 525. The adaptive interaction manager 506 may then evaluate the parameters associated with Chiller XYZ to see what parameters are monitored. In one example, the adaptive interaction manager 506 may specifically look for "outlet temperature" in the list of available parameters. In other embodiments, the contextual data processing engine 706 of the adaptive interaction manager 506 first evaluates the processed request data 1108, and determines if the processed request data 1108 contains a valid command or request for the associated BMS 525. For example, the contextual data processing engine 706 may access the database 516 to determine if Chiller XYZ is a part of the BMS 525. The contextual data processing engine 706 may then evaluate the parameters associated with Chiller XYZ to see what parameters are monitored.

Having interpreted the request data 1104, the adaptive interaction manager 506 may then determine if an agent is required to fulfill the request, as described in regards to process block 814 of FIG. 8, above. For example, the adaptive interaction manager 506 may evaluate what is required by the request data 1104 and subsequently query the capability matrix 710 to determine if an existing agent can handle the request 1102. The adaptive interaction manager 506 may further query the agent scheduler 520 to determine if one or more agents with the required capabilities are available to complete the request 1102. If the adaptive interaction manager 506 determines that an agent does not currently exist that may process the request 1102, the adaptive interaction manager 506 may transmit an agent request 1110 to the processing circuit 504. The processing circuit 504 may pass the agent request to the agent manager 514 which can further instruct the agent generator 522 to generate an agent. In one embodiment, the agent generator 522 generates the agent in the form of a number of agent parameters, such as agent "A" parameters 1112. The agent parameters 1112 may include all the information required to generate the agent, including location to be installed (i.e. which device to host the agent), I/O requirements, communication parameters, attributes, etc. In some embodiments, the agent parameters 1112 may further include all the code necessary to generate the agent on one or more devices of the BMS 525. In this example, it is determined that the agent, Agent A 1114, is to be to be installed on local device 1116.

As shown in FIG. 11, there is no direct connection between the agent generator 522 and the local device 1116. Accordingly, the processing circuit 504 may transmit the agent generation parameters 1112 to the local device 1116 via the BMS controller 526 and intermediate device 1118. In some embodiments, the agent generation parameters 1112 may include instructions to the BMS controller 526 and the intermediate device 1118 to pass the agent generation parameters 1112 to the local device 1116 for installation. In other embodiments, the adaptive interaction manager 506 may instruct the BMS controller 526 to pass the agent generation parameters 1112 to the local device 1116 via the intermediate device 1118. In still further embodiments, the agent generation parameters 1112 may be a fully functional agent, which, upon being received by the BMS controller 526, can further propagate itself to the local device 1116 via the intermediate device 1118. For example, agent generation parameters 1112 may include system data 1010, which allows the agent to map a path to the required local device 1116.

Once the agent generation parameters 1112 have been received at local device 1116, Agent A 1114 can install itself onto local device 1116. In some embodiments, the agent parameters are installed on a memory of the local device 1116, and an executable program file is executed using a processing device of the local device, thereby generating the Agent A 1114 within the local device 1116. Once installed, Agent A 1114 may begin operations per its designed functionality set by the agent generator 522. The Agent A 1114 may then generate agent data 1120. The agent data 1120 may include information required to complete the request 1102. The agent data 1120 may be transmitted to the adaptive interaction manager 506 via the intermediate device 1118 and the BMS controller 526. It is contemplated that in some embodiments, the BMS architecture may allow the agent data 1120 to be transmitted directly to the adaptive interaction manager 506.

The adaptive interaction manager 506, receiving the agent data 1120 may process the data for transmission to the user 538 via the I/O devices 534. In one embodiment, the adaptive interaction manager 506 may convert the data into a readable text format for viewing by the user 538. In other embodiments, the adaptive interaction manager 506 may convert the data into an audio file for providing audio playback of the agent data 1120 to the user 538. In further embodiments, the adaptive interaction manager 506 may transmit the agent data 1120 to the one or more cloud-based applications 518 for processing. For example, the cloud-based applications 518 may be able to convert the agent data 1120 into natural language, audio files, and/or graphical data (e.g. charts, graphs, formatted tables, etc.). The cloud-based applications 518 may process the agent data 1120 and return processed agent data 1122 to the adaptive interaction manager 506. The adaptive interaction manager 506 may then provide the processed agent data 1122 to the I/O device 534. The I/O device 534 may then format the processed agent data 1122 into user formatted agent data 1124, and present the user formatted agent data 1124 to the user 538. Example user formatted agent data 1124 may include audibly presenting the processed agent data 1122 to the user 538. Other example user formatted agent data 1124 may include presenting a textual or graphical representation of the agent data 1120 to the user 538.

Figure 12:
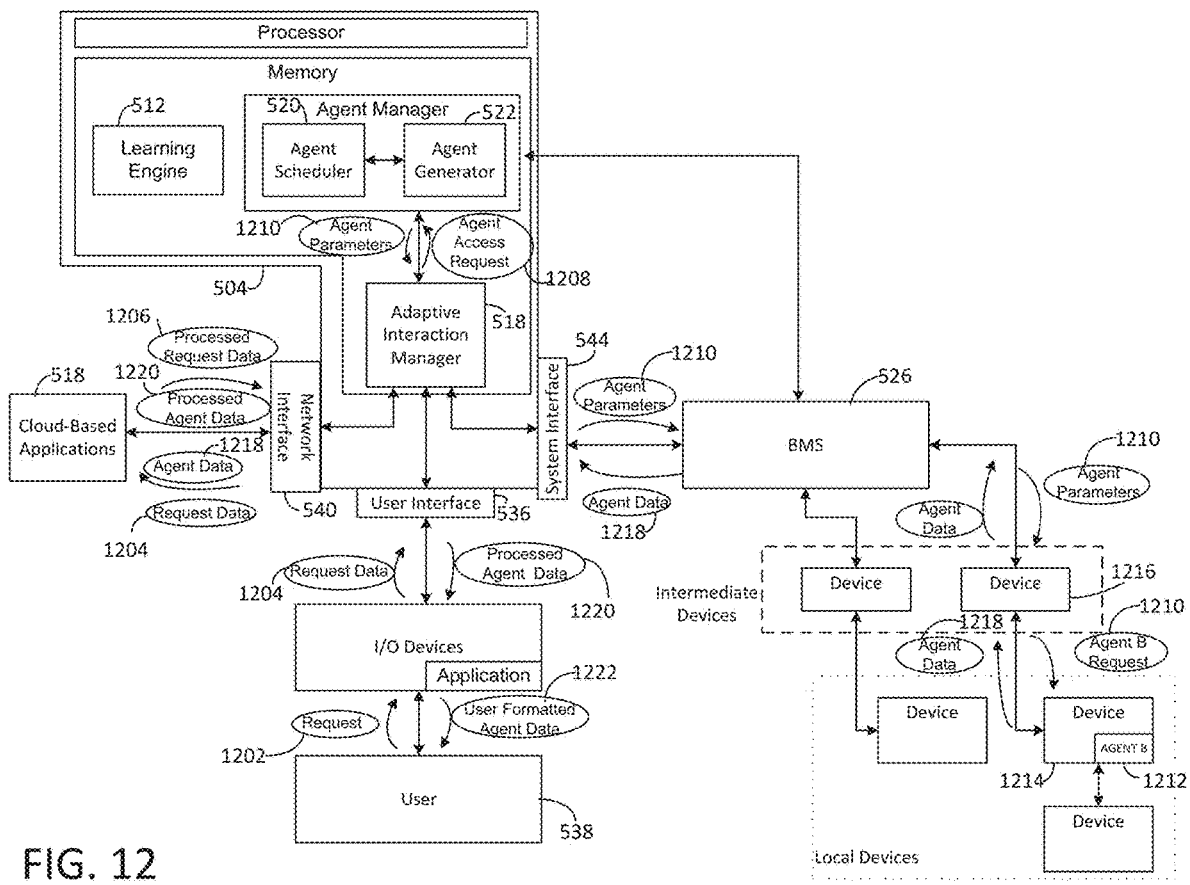
FIG. 12 is a block diagram illustrating a data flow associated with using an existing agent within the system of FIG. 5, according to some embodiments.

Turning now to FIG. 12, a block diagram illustrating utilizing an existing agent and the associated data flow within system 500 is shown, according to some embodiments. Similar to above, the user 538 may provide a request 1202 to one or more of the I/O devices 534. The request may be input into the system 500 via the I/O devices 534. The request 1202 may be any of the requests described above, particularly in regards to FIG. 11. The I/O device 534 may then receive or capture the request 1202, and output request data 1204 to the adaptive interaction manager 506. In some embodiments, the I/O device 534 may receive or capture the request 1202 1202 using one of the methods described in regards to FIG. 11, above. For example, the I/O device 534 may use one or more applications 1106 to capture the data, as described above. Further, the I/O device 534 may output the request data 1204 to the adaptive interaction manager 506 using one of the formats described above in FIG. 11.

The adaptive interaction manager 506 may receive the request data 1204 and process the request data 1204 accordingly. In some embodiments, the contextual data processing engine 706 of the adaptive interaction manager 506 may process the request data 1204. In some embodiments, the adaptive interaction manager 506, via the contextual data processing engine 706 may attempt to interpret the received request data 1204, as described in FIG. 11, above. As further described above, in some examples the adaptive interaction manager 506 may not be able to interpret the request 1202, such as where the request 1202 is a voice request, or a gesture request. The adaptive interaction manager 506 may then transmit the request data 1204 to the one or more cloud-based applications 518. The one or more cloud-based applications 518 may then interpret the request data 1204, and transmit the processed request data 1206 back to the adaptive interaction manager 506, as described above.

Having interpreted the request data 1204, the adaptive interaction manager 506 may then determine if an agent is required to fulfill the request, as described in regards to at least process block 814 of FIG. 8, above. For example, the adaptive interaction manager 506 may determine what is required by the request data 1204 and subsequently query the capability matrix 710 to determine if an existing agent can process the request 1202. The adaptive interaction manager 506 may further query the agent scheduler 520 to determine if one or more agents with the required capabilities are available to process the request 1202. If the adaptive interaction manager 506 determines that an agent does exist that can process the request 1202, and the agent scheduler 520 indicates that the agent is available (e.g. either has bandwidth to perform additional actions, or is not currently performing any actions), the adaptive interaction manager 506 may transmit an agent access request 1208 to the processing circuit 504 to be processed by the agent manager 514. The access request 1208 may be a request to access an active agent within the system 500 that is capable of completing the request 1202. The agent manager 514, determining that the request agent access 1208 is appropriate (i.e. the request can be performed by the agent without interfering with existing task completion), can send agent parameters 1210 back to the adaptive interaction manager 506. The agent parameters 1210 may include instructions to the existing agent, for example agent B 1212, located in local device 1214. The instructions can provide the agent B 1212 with the required information needed to complete the request 1202. The agent parameters 1210 may further include a permission to be provided to the adaptive interaction manager 506, allowing the adaptive interaction manager 506 to instruct the agent B 1212 to perform the tasks required to complete the request 1202.

As shown in FIG. 12, there is no direct connection between the adaptive interaction manager 506 and the local device 1214. Accordingly, the adaptive interaction manager 506 may transmit the agent parameters 1210 to the local device 1214 via the BMS controller 526 and an intermediate device 1216. In some embodiments, the agent parameters 1210 may include instructions to the BMS controller 526 and the intermediate device 1216 to pass the agent parameters 1210 to the local device 1214 for communication to the agent B 1212. In other embodiments, the adaptive interaction manager 506 may instruct the BMS controller 526 to pass the agent parameters 1210 to the local device 1214 via the intermediate device 1216.

Once the agent parameters 1210 have been received at the local device 1214, agent B 1212 can process the received agent parameters 1210 and begin operations to complete the request 1202. The agent B 1212 may then generate agent data 1218. The agent data 1218 may include information required to complete the request 1202. The agent data 1218 may be transmitted to the adaptive interaction manager 506 via the intermediate device 1216 and the BMS controller 526. It is contemplated that in some embodiments, the BMS architecture may allow the agent data 1218 to be transmitted directly to the adaptive interaction manager 506.

The adaptive interaction manager 506, receiving the agent data 1218 may process the agent data 1218 for transmission to the user 538 via the I/O devices 534. In one embodiment, the adaptive interaction manager 506 may convert the data into a readable text format for viewing by the user 538. In other embodiments, the adaptive interaction manager 506 may convert the data into an audio file for providing audio playback of the agent data 1218 to the user 538. In further embodiments, the adaptive interaction manager 506 may transmit the agent data 1218 to the one or more cloud-based applications 518 for processing. For example, the cloud-based applications 518 may be able to convert the agent data 1218 into natural language, audio files, and/or graphical data (e.g. charts, graphs, formatted tables, etc.). The cloud-based applications 518 may process the agent data 1218 and return processed agent data 1220 to the adaptive interaction manager 506. The adaptive interaction manager 506 may then provide the processed agent data 1220 to the I/O device 534. The I/O device 534 may then format the processed agent data 1220 into user formatted agent data 1222, and present the user formatted agent data 1222 to the user 538. Example user formatted agent data 1222 may include audibly presenting the processed agent data 1220 to the user 538. Other example user formatted agent data 1222 may include presenting a textual or graphical representation of the agent data 1218 to the user 538.

Figure 13:
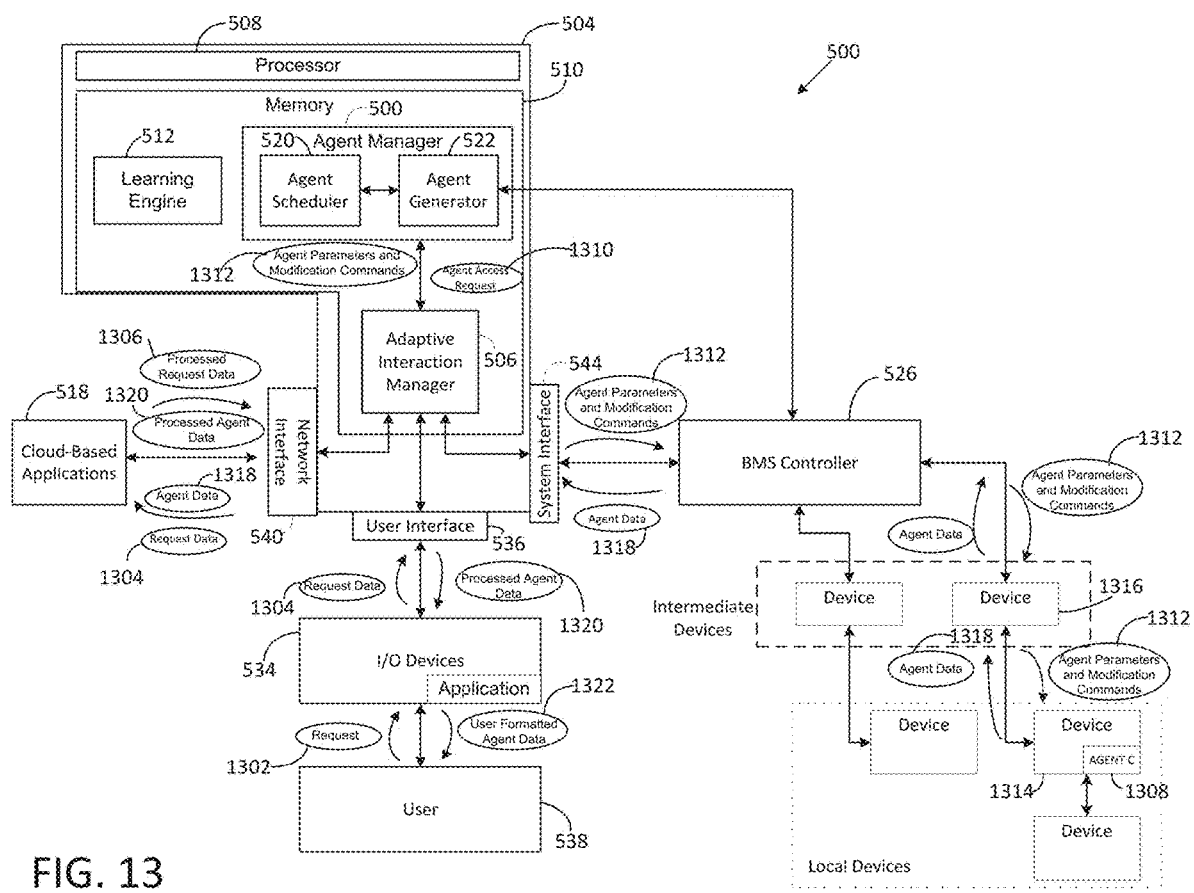
FIG. 13 is a block diagram illustrating a data flow associated with the modification of an existing agent within the system of FIG. 5, according to some embodiments.

Turning now to FIG. 13, a block diagram illustrating modifying an existing agent and the associated data flow within the system 500 is shown, according to some embodiments. Similar to above, the user 538 may provide a request 1302 to one or more of the I/O devices 534. The request may be input into the system 500 via the I/O devices 534. The request 1302 may be any of the requests described above, particularly in regards to FIG. 11. The I/O device 534 may then receive or capture the request 1302, and output request data 1304 to the adaptive interaction manager 506. In some embodiments, the I/O device 534 may receive or capture the request 1302 using one of the methods described in regards to FIG. 11, above. Further, the I/O device 534 may output the request data 1304 to the adaptive interaction manager 506 using one of the formats described above in FIG. 11.

The adaptive interaction manager 506 may receive the request data 1304 and process the request data 1304 accordingly. In some embodiments, the contextual data processing engine 706 of the adaptive interaction manager 506 may process the request data 1304. In some embodiments, the adaptive interaction manager 506, via the contextual data processing engine 706, may attempt to interpret the received request data 1304, as described in FIG. 11, above. As further described above, in some examples the adaptive interaction manager 506 may not be able to interpret the request 1302, such as where the request 1302 is a voice request, or a gesture request. The adaptive interaction manager 506 may then transmit the request data 1304 to the one or more cloud-based applications 518. The one or more cloud-based applications 518 may then interpret the request data 1304, and transmit the processed request data 1306 back to the adaptive interaction manager 506, as described above.

Having interpreted the request data 1304, the adaptive interaction manager 506 may then determine if an agent is required to fulfill the request, as described above in regards to at least process block 814 of FIG. 8, above. For example, the adaptive interaction manager 506 may determine what is required by the request data 1304 and subsequently query the capability matrix 710 to determine if an existing agent can process the request 1302. The adaptive interaction manager 506 may further query the agent scheduler 520 to determine if one or more agents with the required capabilities are available to process the request 1302. In the example of FIG. 13, the adaptive interaction manager 506 may determine that an existing agent, here agent C 1308, possess similar capabilities and may be able to be modified to process the request 1302, if available. The adaptive interaction manager 506 may send a permission request 1310 to the agent manager 514 to have agent C 1308 modified. The agent manager 514 may then provide agent parameters and modification commands 1312 to the adaptive interaction manager 506. In one embodiment the agent manager 514 may only provide the agent parameters and modification commands 1312 once it is determined that the agent C is capable of completing the request 1302, and that the permission request 1310 is appropriate (i.e. the modification to the agent C 1308 can be performed without interfering with existing requirements of the agent C 1308 in the system.) The agent parameters and modification commands 1312 may include parameters for processing the request, as described in FIG. 12 above, as well as commands to be provided to the agent C 1308 to reconfigure itself to process the request 1302. This information may be provided to the capability matrix 710, which may update the functionality of the agent C 1308 for future reference.

As shown in FIG. 13, there is no direct connection between the adaptive interaction manager 506 and the local device 1314. Accordingly, the adaptive interaction manager 506 may transmit the agent parameters and modification commands 1312 to the local device 1314 via the BMS controller 526 and an intermediate device 1316. In some embodiments, the agent parameters and modification commands 1312 may include instructions to the BMS controller 526 and the intermediate device 1316 to pass the agent parameters and modification commands 1312 to the local device 1314 for communication to the agent C 1308. In other embodiments, the adaptive interaction manager 506 may instruct the BMS controller 526 to pass the agent parameters and modification commands 1312 to the local device 1214 via the intermediate device 1316.

Once the agent parameters and modification commands 1312 have been received at the local device 1314, agent C 1308 can process the received agent parameters and modification commands 1312 and begin operations to complete the request 1302. The agent C 1308 may then generate agent data 1318. The agent data 1318 may include information required to complete the request 1302. The agent data 1318 may be transmitted to the adaptive interaction manager 506 via the intermediate device 1316 and the BMS controller 526. It is contemplated that in some embodiments, the BMS architecture may allow the agent data 1318 to be transmitted directly to the adaptive interaction manager 506.

The adaptive interaction manager 506, receiving the agent data 1318 may process the agent data 1318 for transmission to the user 538 via the I/O devices 534. In one embodiment, the adaptive interaction manager 506 may convert the data into a readable text format for viewing by the user 538. In other embodiments, the adaptive interaction manager 506 may convert the data into an audio file for providing audio playback of the agent data 1318 to the user 538. In further embodiments, the adaptive interaction manager 506 may transmit the agent data 1318 to the one or more cloud-based applications 518 for processing. For example, the cloud-based applications 518 may be able to convert the agent data 1318 into natural language, audio files, and/or graphical data (e.g. charts, graphs, formatted tables, etc.). The cloud-based applications 518 may process the agent data 1318 and return processed agent data 1320 to the adaptive interaction manager 506. The adaptive interaction manager 506 may then provide the processed agent data 1320 to the I/O device 534. The I/O device 534 may then format the processed agent data 1320 into user formatted agent data 1322, and present the user formatted agent data 1322 to the user 538. Example user formatted agent data 1322 may include audibly presenting the processed agent data 1320 to the user 538. Other example user formatted agent data 1322 may include presenting a textual or graphical representation of the agent data 1318 to the user 538.

While the above FIGS. 11-13 show the adaptive interaction manager 506 interfacing with the BMS controller 526 to access or modify one or more agents, it is considered that in some examples, the processing circuit 504 may communicate with the BMS controller 526 and/or the BMS 525 in general to communicate to one or more agents in the BMS system 525.

Figure 14:
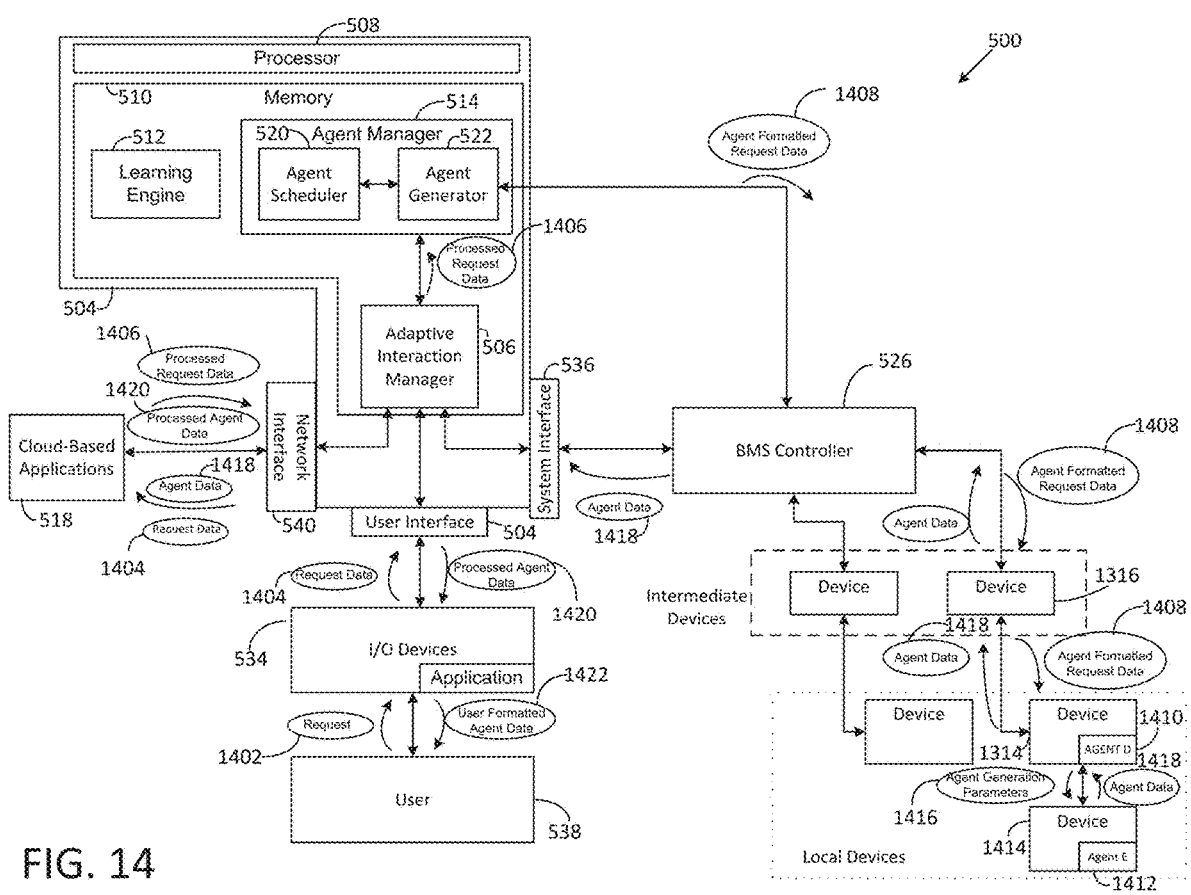
FIG. 14 is a block diagram illustrating a data flow associated with the dynamic generation of a new agent from an agent within the system of FIG. 5, according to some embodiments.

Turning now to FIG. 14, a block diagram illustrating dynamic generation of an existing agent and the associated data flow within the system 500 is shown, according to some embodiments. As described above in FIGS. 11-13, a request 1402 is presented by the user 538, processed into request data 1404 by the one or more I/O devices 534, and then processed by the adaptive interaction manager 506, and potentially further processed by one or more cloud-based applications 518 into processed request data 1406. The adaptive interaction module may determine if an existing agent can handle the request 1402 or whether a new agent is required, as described above.

In the embodiment of FIG. 14, the adaptive interaction module may send the processed request data 1406 directly to the processing circuit 504. The agent manager 514 may then analyze the processed data 1406 and determine which, if any, existing agents may be able to best process the request 1402. As shown in FIG. 14, the agent manager 514 may determine that agent D 1410, located in local device 1314 contains similar functionality and/or access to the required data. The agent manager 514 may then transmit the agent formatted request data 1408 to the agent D 1410. The agent formatted request data may include the request formatted to allow for the agent D 1410 to understand the request, but also basic parameters, constraints, access, permissions, etc., associated with the request. This can be similar to the agent generation parameters 1112 of FIG. 11.

As shown in FIG. 14, there is no direct connection between the processing circuit 504 and the and the local device 1314. Accordingly, the processing circuit may transmit the agent formatted request data 1408 to the local device 1314 via the BMS controller 526 and an intermediate device 1316. In some embodiments, the agent formatted request data 1408 may include instructions to the BMS controller 526 and the intermediate device 1316 to pass the agent formatted request data 1408 to the local device 1314 for communication to the agent D 1410. In other embodiments, the adaptive interaction manager 506 may instruct the BMS controller 526 to pass agent formatted request data 1408 to the local device 1314 via the intermediate device 1316.

Once the agent formatted data request data 1408 is received by the local device 1314, the agent D 1410 may interpret the request. In one embodiment, the agent D 1410 may determine that it can process the request 1402. In other embodiments, the agent D 1410 may determine that an additional agent is required to process the request 1402. The agent D 1410 can then determine if it has the required permissions to generate an agent capable of processing the request 1402. If the agent D 1410 does not have sufficient permissions, the agent manager 514 may be informed, and a new agent may be created by the agent generator 522 as described in FIG. 11. If the agent D 1410 does have sufficient permission to generate an agent to process the request 1402, the agent D 1410 determines which device(s) the agent should be generated in. The agent D 1410 may evaluate the required actions, constraints, device functions, BMS architecture, etc. to determine which device(s) the agent is to be generated in. As shown in FIG. 14, the agent may be generated as agent E 1412 in local device 1414. The agent D 1410 may transmit agent generation parameters 1416. The agent generation parameters 1416 may include the agent formatted request data 1408 along with additional agent generation data provided by the agent D 1410. Further, in some embodiments, the agent E 1412 may be created by the agent D 1410 to process the entire request 1402. Alternatively, agent E 1412 may be created to process only a portion of the request 1402, and agent D 1410 will process the remainder. Once the agent generation parameters 1416 have been provided to the local device 1414, the agent E may be generated.

Once agent E 1412 has been generated, the agent E 1412 can begin to process the request 1402, either independently or in conjunction with the agent D 1410. The agent E 1412 may provide agent data 1418 to the local device 1314, where it can be passed to the intermediate device 1316, or first processed by the agent D 1410. The agent data 1418 may then be transmitted to the adaptive interaction manager 506 via the intermediate device 1316 and the BMS controller 526. It is contemplated that in some embodiments, the BMS architecture may allow the agent data 1418 to be transmitted directly to the adaptive interaction manager 506.

The adaptive interaction manager 506, receiving the agent data 1418 may process the agent data 1418 for transmission to the user 538 via the I/O devices 534. In one embodiment, the adaptive interaction manager 506 may convert the data into a readable text format for viewing by the user 538. In other embodiments, the adaptive interaction manager 506 may convert the data into an audio file for providing audio playback of the agent data 1418 to the user 538. In further embodiments, the adaptive interaction manager 506 may transmit the agent data 1418 to the one or more cloud-based applications 518 for processing. For example, the cloud-based applications 518 may be able to convert the agent data 1418 into natural language, audio files, and/or graphical data (e.g. charts, graphs, formatted tables, etc.). The cloud-based applications 518 may process the agent data 1418 and return processed agent data 1420 to the adaptive interaction manager 506. The adaptive interaction manager 506 may then provide the processed agent data 1320 to the I/O device 534. The I/O device 534 may then format the processed agent data 1420 into user formatted agent data 1422, and present the user formatted agent data 1322 to the user 538. Example user formatted agent data 1422 may include audibly presenting the processed agent data 1420 to the user 538. Other example user formatted agent data 1322 may include presenting a textual or graphical representation of the agent data 1418 to the user 538.

Figure 15A:
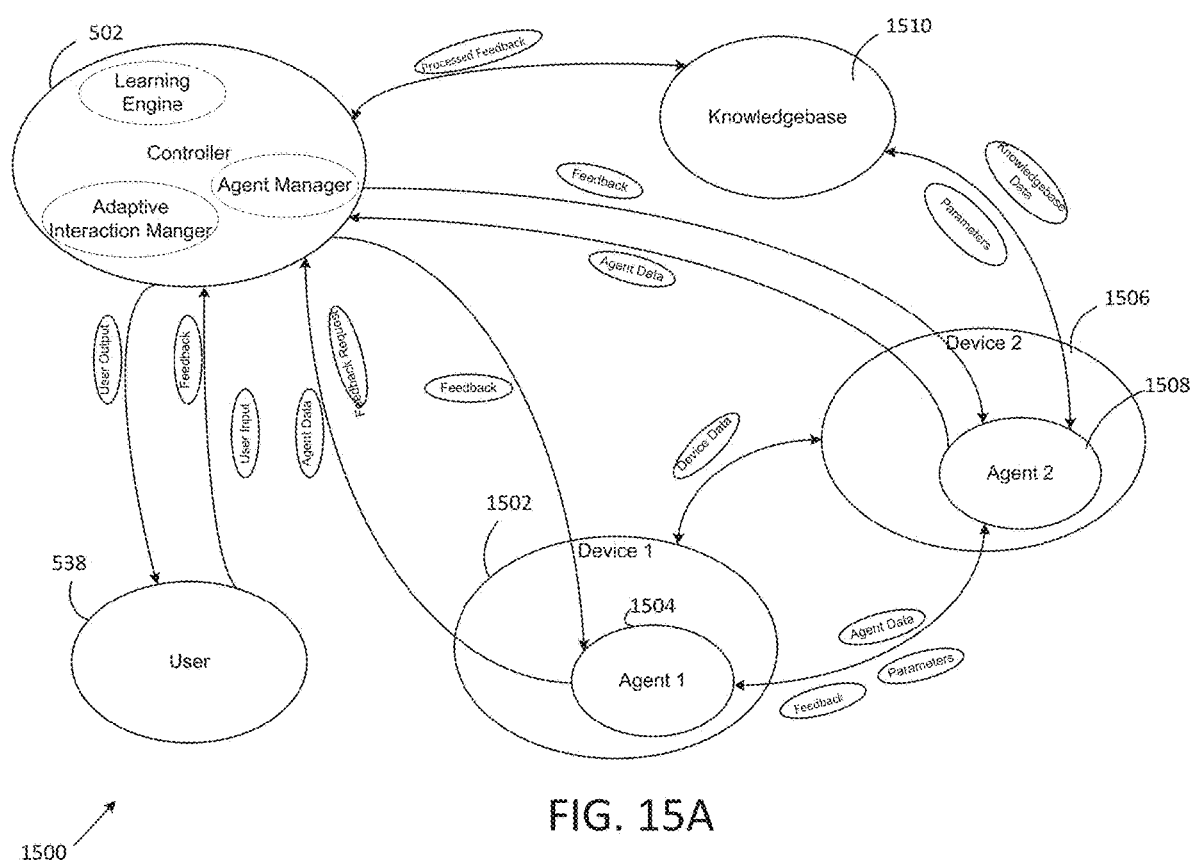
FIG. 15A is a flow chart illustrating an agent learning process, according to some embodiments.

Turning now to FIG. 15, a flow diagram showing an agent learning process 1500 can be seen, according to some embodiments. The flow diagram includes a controller 502, a user 538, a first device 1502 with a first agent 1504, a second device 1506 with a second agent 1508 and a knowledgebase 1510. In one embodiment, the controller 502 includes the components described above in FIG. 5. The first device 1502 and the second device 1508 may be any device within a BMS, such as BMS 525, or any of the BMS' described in FIGS. 1-4, above. The knowledgebase 1510 may be any of the knowledgebases described above, and may be stored in a database, such as database 516.

As described above in FIGS. 11-14, a user may provide user input to the controller 502 to request data, perform actions, etc., related to the BMS 525. This user data can be processed by the controller 502 and provided to agents such as the agents 1504, 1508. The agents then provide agent data back to the controller, which can be provided to the user via one or more I/O devices 534. As shown in FIG. 15, in some instances the user 538 may provide feedback to the controller 502. The controller 502 may receive the feedback from the user via one or more I/O devices 534. In some embodiments, the feedback is solicited. For example, the agents 1504, 1508 may request feedback. The feedback requests may request feedback regarding user satisfaction with the provided agent data, further clarification on what is desired, etc. In other embodiments, the feedback may be solicited by the controller 502. For example, the learning engine 512 within the controller 502 may request feedback from the user to further build the knowledgebase 1510.

In still further embodiments, the feedback may be unsolicited by the user 538. For example, the user may provide additional user inputs that indicate that the data provided to the user 538 (i.e. user output) by the agents 1504, 1508 was not desired. Unsolicited feedback could be as simple as a user providing feedback in the form of changing the way a system or portion of a system is operating. For example, the user may shift prioritization of certain actions in the system away from how the agents 1504, 1508 had prioritized them. For example, the user may state that the "$40^{th}$ floor should be prioritized." This feedback can be provided to the agents to instruct them to prioritize the $40^{th}$ floor. This feedback may be stored in the agents 1504, 1508 such that in any future prioritizations of system, the $40^{th}$ floor is always prioritized the highest. In some embodiments, this may be stored as a constraint 1034 of the agent 1504, 1508. Further, the prioritization of the $40^{th}$ floor could be stored in the knowledgebase 1510 as well. This can allow future generated agents to further understand that the $40^{th}$ floor is given priority. In some examples, the learning engine 512 may access this information in the knowledgebase 1510 to provide to new and or existing agents within a system.

In some embodiments, the agents 1504, 1508 may provide feedback to one another to allow for learning on the fly. For example, the agent 1504 may receive feedback from a user 538 indicating that a particular output was incorrect, or not preferred. The agent 1504 may then provide that feedback to similar agents in the system. For example, agent 1504 may provide feedback to agent 1508, and vice versa. In some embodiments, the agents within a system may be able to "sense" or "see" each other throughout the system. In other embodiments, a central manager, such as the agent manager 514 may track all existing agents and coordinate with the learning engine to provide feedback, as required, to agents throughout the system. For example, the device 1502 may be a chiller controller, and the device 1506 may be boiler controller. The agent 1504 receiving feedback that the temperature in the executive suite should always be prioritized may provide that information to the agent 1508, where the boiler controller 1506 is responsible for the executive suite.

In some embodiments, the agents 1504, 1508 may learn from monitoring device data. For example the device 1502 and the device 1506 may be in communication with each other. The agent 1504 may monitor how changing various parameters on the device 1502 affects device 1506. For example, running an optimization program on the device 1502 may substantially decrease the optimization of the device 1506. The agent 1504 may receive device data from the device 1506 indicating that it is experiencing decreased optimization. Accordingly, the agent 1504 may modify its optimization routine in order to maximize optimization of the system in general. In some example, the agent 1504 may receive agent data from the agent 1508 indicating that the optimization of the device 1506 has been reduced, allowing the device 1504 to modify its operation accordingly. Further, the agent 1504 may be able to monitor overall effects and efficiencies of the system by receiving device data from multiple devices within a system. As described above, the agent 1504 may receive device data from the device 1506. The agent 1504 may modify parameters of the device 1502 and look for correlations in the device 1506. This can further aid the agent 1504 in performing optimizations across the system.

As described above, in some instances the agents 1504, 1508 may learn from each other. This can allow for dynamic optimizations and control of large system using the agents 1504, 1508. For example, the agent 1508 may be running an energy optimization program in relation to the device 1506. The agent 1508 may communicate with the agent 1504, informing the agent 1504 that it is attempting to optimize the energy usage of the device 1506. The agent 1504 may then respond to the agent 1508 with data relating to the effects of the energy optimization on the device 1502. In some embodiments the agent 1504 may record the data relating to the energy usage of the device 1502 and pass that data to the agent 1508 to show the effect on the device 1502. In other embodiments, the agent 1504 provides the feedback to the controller 502, which may collect data from multiple agents in a system to determine the effects of the energy optimization program being performed by the agent 1508. In some examples, the controller may then analyze this data to determine an overall effect. In other examples, the controller 502 may generate graphical data (graphs, charts, formatted table, etc.) for display to a user, illustrating the effect of optimizing the energy usage for the device 1506.

In other embodiments, the agents 1504, 1508 may learn from each other by having one agent monitor a series of parameters for a given operation. Using the example above, if the agent 1508 is running an energy optimization program on the device 1506, the agent 1508 may instruct the agent 1504 to monitor certain parameters within the device 1502, as well as the device 1506 for the duration of the energy optimization program. Thus, while the agent 1508 is performing various energy optimization functions, the agent 1504 may be able to record multiple parameters relating to energy usage of the device 1506, the device 1502, etc. In some examples, this data can be provided to the agent 1508 at the end of the optimization program. In other examples, the agent 1504 may analyze the data and provide real time results to the agent 1508 during the execution of the energy optimization program, thereby allowing the agent 1508 to make modify the energy optimization program during execution. While the example of FIG. 15 describes the agent 1504 being utilized to monitor the energy optimization program being run by the agent 1508, in some examples other agents within the system may be used in lieu of, or in conjunction with, the agent 1504. For example, multiple agents within a system may be used to monitor the program being run by one or more other agents in the system. In one embodiment, the agent 1508 may coordinate with the agent scheduler 520 of the controller 502 to determine which agents in the system may be available. Further, in some embodiments, the agent 1508 may be able to generate one or more new agents to monitor the results of the energy optimization program. As described above, the ability to generate additional agents may depend on the permissions given to the agent 1508.

In further embodiments, the agents may work in parallel to achieve a common goal. For example, the agent 1504 and the agent 1508 may work to optimize a process controlled by the device 1502 and the device 1506. The agents 1504, 1508 may divide the task required and execute their respective optimization programs simultaneously, while providing agent data between themselves in real-time. Example agent data may include parameters, actions taken by the respective agents 1504, 1508, device data during the execution of the respective optimization. This can allow the agents 1504, 1506 to "divide and conquer" a large task. In some embodiments, multiple agents across a system may be utilized to achieve a common goal.

Figure 15B:
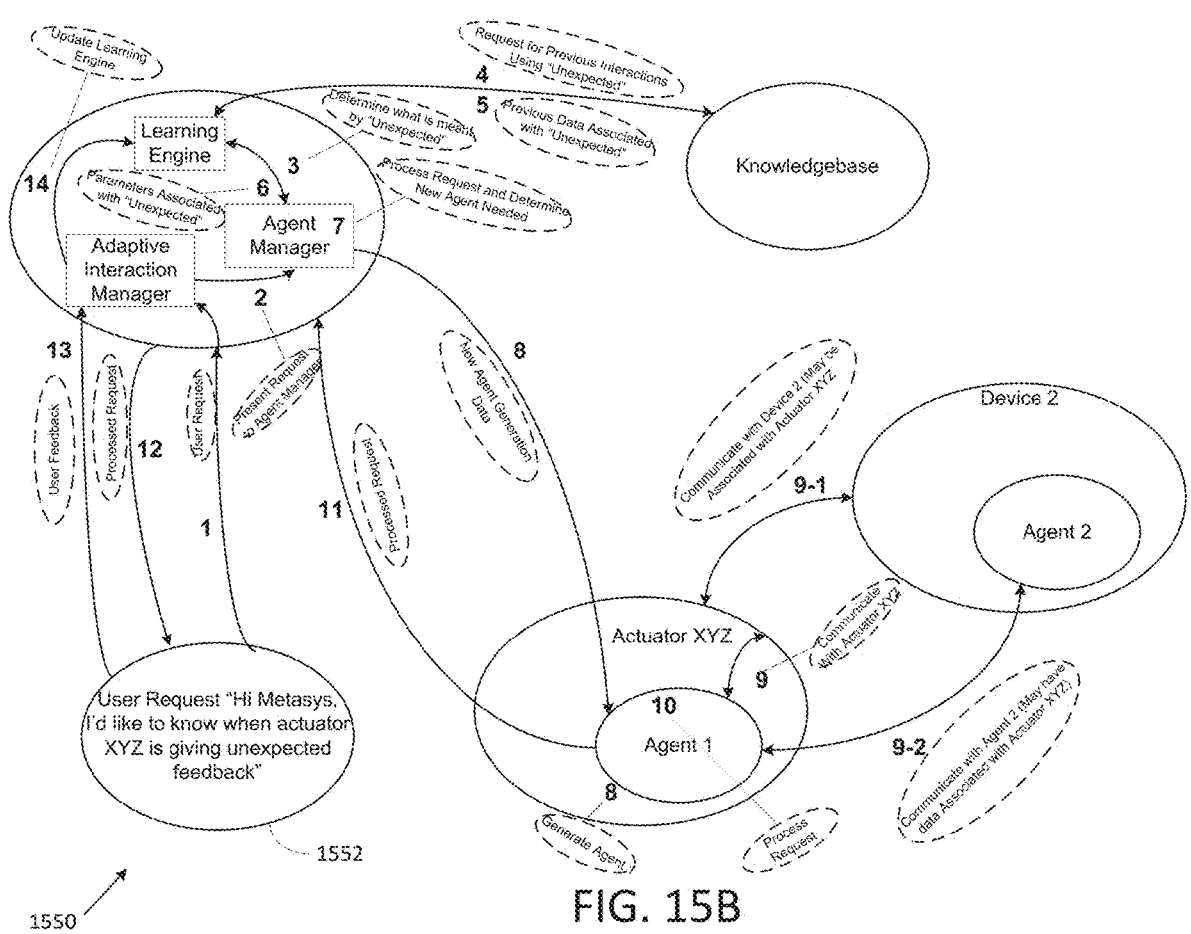
FIG. 15B is a flow chart illustrating an agent generation process in response to a specific user interface, according to some embodiments.

Turning now to FIG. 15B a flow chart illustrating an exemplary agent generation process 1550 based on a specific user request is shown, according to some embodiments. A user may present a request at process block 1552. In one embodiment, the request may be a voice request, such as "Hi Metasys, I'd like to know when actuator XYZ is giving unexpected feedback." The input may then be provided to the controller 502 and received by the adaptive interaction manager 506, which may translate the request into a format readable by the controller 502. For example, the adaptive interaction manager 506 may use one or more cloud based applications 518 to translate the request. The adaptive interaction manager may then present the request to the agent manager 514. The agent manager 514 may then communicate the request to the learning engine 512 to determine what one or more phrases in the request mean. For example, the agent manager 514 may access the learning engine to determine what the term "unexpected" is contemplated to mean in the request. The learning engine 512 may process the request, and may request data from the knowledgebase 516 for prior request containing the term unexpected. The knowledgebase 516 may then provide any historical data back to the learning engine 512.

The learning engine 514 may then provide information regarding the term "unexpected," as well as parameters that have previously, or are believed to be, associated with the term unexpected. The agent manager 514 may then generate a new software agent and transmit the new agent generation data to actuator XYZ where the agent is generated and installed. The agent may then communicate with actuator XYZ to gather information required to process the request. In some embodiments, the agent may optionally connect with other devices such as Device 2, or other agents such as Agent 2 to gather additional information required to process the request. The agent may then process the request and send the processed request to the controller 502. The controller may then send the processed request to the user via the adaptive interaction manager 506. The user may then provide feedback based on the processed request, such as other parameters that they would like seen, different ranges, etc. This feedback can be provided to the controller via the adaptive interaction manager 506. The adaptive interaction manager may then update the learning engine 512 with the provided feedback.

Figure 15C:
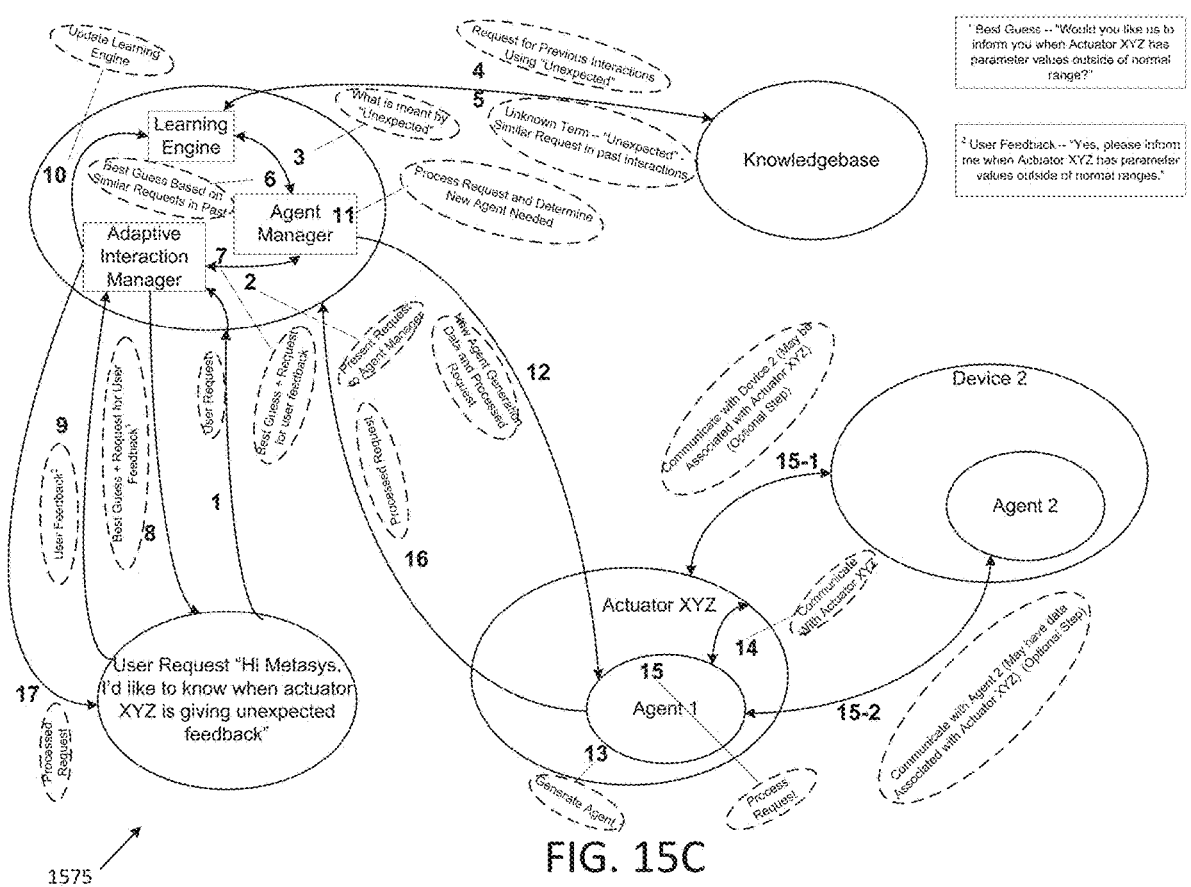
FIG. 15C is a flow chart illustrating an agent generation process in response to a specific user interface where additional user input is needed, according to some embodiments.

Turning now to FIG. 15C, a flow chart illustrating a process 1575 for generating an agent based on a specific user request which requires additional user feedback is shown, according to some embodiments. Similar to that described in FIG. 15B above, the user may provide a specific request. For example, the request may be a voice request stating, "Hi Metasys, I'd like to know when actuator XYZ is giving unexpected feedback." The input may then be provided to the controller 502 and received by the adaptive interaction manager 506, which may translate the request into a format readable by the controller 502. For example, the adaptive interaction manager 506 may use one or more cloud based applications 518 to translate the request. The adaptive interaction manager may then present the request to the agent manager 514. The agent manager 514 may then communicate the request to the learning engine 512 to determine what one or more phrases in the request mean. For example, the agent manager 514 may access the learning engine to determine what the term "unexpected" is contemplated to mean in the request. The learning engine 512 may process the request, and may request data from the knowledgebase 516 for prior request containing the term unexpected. As shown in FIG. 15C, the knowledgebase 516 may not have sufficient (or any) data related to the term "unexpected," and may report the same back to the learning engine 512. The learning engine 514 may then provide a best guess based on similar requests in the past. For example, the learning engine 514 may evaluate what types of request and/or data this particular user has requested in the past.

The agent manager 514 may then provide the best guess along with a request for additional user feedback to the adaptive interaction manager 506. The adaptive interaction manager may then provide the best guess and the request for user feedback to the user. For example, the adaptive interaction manager 506 may present a message to the user such as, "Would you like us to inform you when Actuator XYZ has parameter values outside of normal range?" The user may then provide feedback to the controller. Example feedback may be "Yes, please inform me when Actuator XYZ has parameter values outside of normal range." However, other feedback messages are also contemplated, such as those indicating that the best guess was not what the user requested. The user feedback can be received by the adaptive interaction manager 506 and provided to the learning engine 512 for future use.

Upon receiving the feedback from the user, the agent manager 514 may then process the request and may determine that a new agent is needed. The agent manager 514 may then generate a new software agent and transmit the new agent generation data to actuator XYZ where the agent is generated and installed. The agent may then communicate with actuator XYZ to gather information required to process the request. In some embodiments, the agent may optionally connect with other devices such as Device 2, or other agents such as Agent 2 to gather additional information required to process the request. The agent may then process the request and send the processed request to the controller 502. The controller may then send the processed request to the user via the adaptive interaction manager 506.

Figure 16:
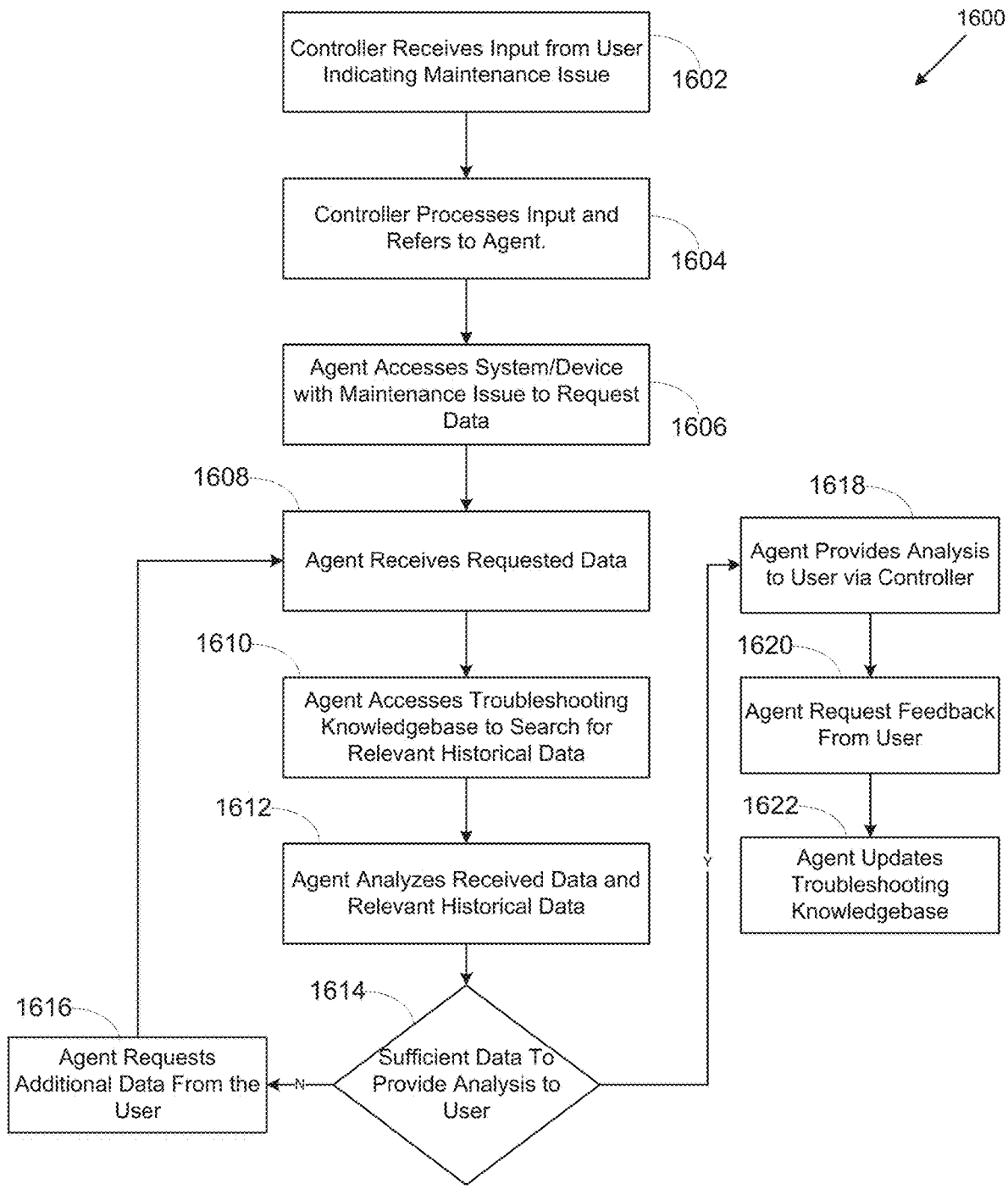
FIG. 16 is a flow chart illustrating an exemplary learning process by an agent, according to some embodiments.

Turning now to FIG. 16 a flow chart is shown illustrating an exemplary learning process 1600 by an agent. The example of FIG. 16 describes a maintenance issue, however it should be understood that this is exemplary only, and that the learning process may be similar for other actions performed by the agents described above. At process block 1602, a controller receives an input from a user. For example, the controller may receive an input from the user indicating a maintenance issue. The controller may be the same as controller 502 described above. Further, the process of providing user input to the controller is described above in FIGS. 5 and 11-14.

At process block 1604 the controller processes the input and provides the input to an agent. At process block 1606, the agent receives the processed input and accesses one or more systems or devices relating to the indicated maintenance issue to request device data. For example, if the user input was "what is the issue with chiller XYZ," the agent may access chiller XYZ, as well as other devices associated with the chiller XYZ to obtain device data associated with chiller XYZ. At process block 1608 the agent receives the request data for processing. At process block 1610, the agent accesses a troubleshooting knowledgebase to search for relevant historical data associated with maintenance issues associated with chiller XYZ. At process block 1612, the agent may analyze both the received device data and the historical maintenance data received from the knowledgebase. At process block 1614, the agent determines if there is sufficient data to provide an analysis of the issue to the user. If not, the process may request additional information from the user at process block 1616. For example, the agent may be unable to determine which issue relating to chiller XYZ the user is referring to. The agent may send the request for more information to the controller, which may request feedback from the user as described above.

The agent may then receive the additional data from the user at process block 1608 and process the newly received data in process blocks 1610, 1612 and 1614, as described above. If the agent does have sufficient information to provide an analysis to the user at process block 1614, the agent may then provide the analysis to the user at process block 1618. Similar to above, the agent may provide the analysis to the controller which can relay the information to the user, as described above. At process block 1620, the agent can request feedback from the user. The request for feedback can include, whether the analysis is correct, if more information is needed, if additional actions need to be taken, etc. The agent then, at process block 1622, can receive the input and update the troubleshooting knowledgebase accordingly.

Use Case—Setting Up New Building in BMS User Interface System

Figures 1, 17:
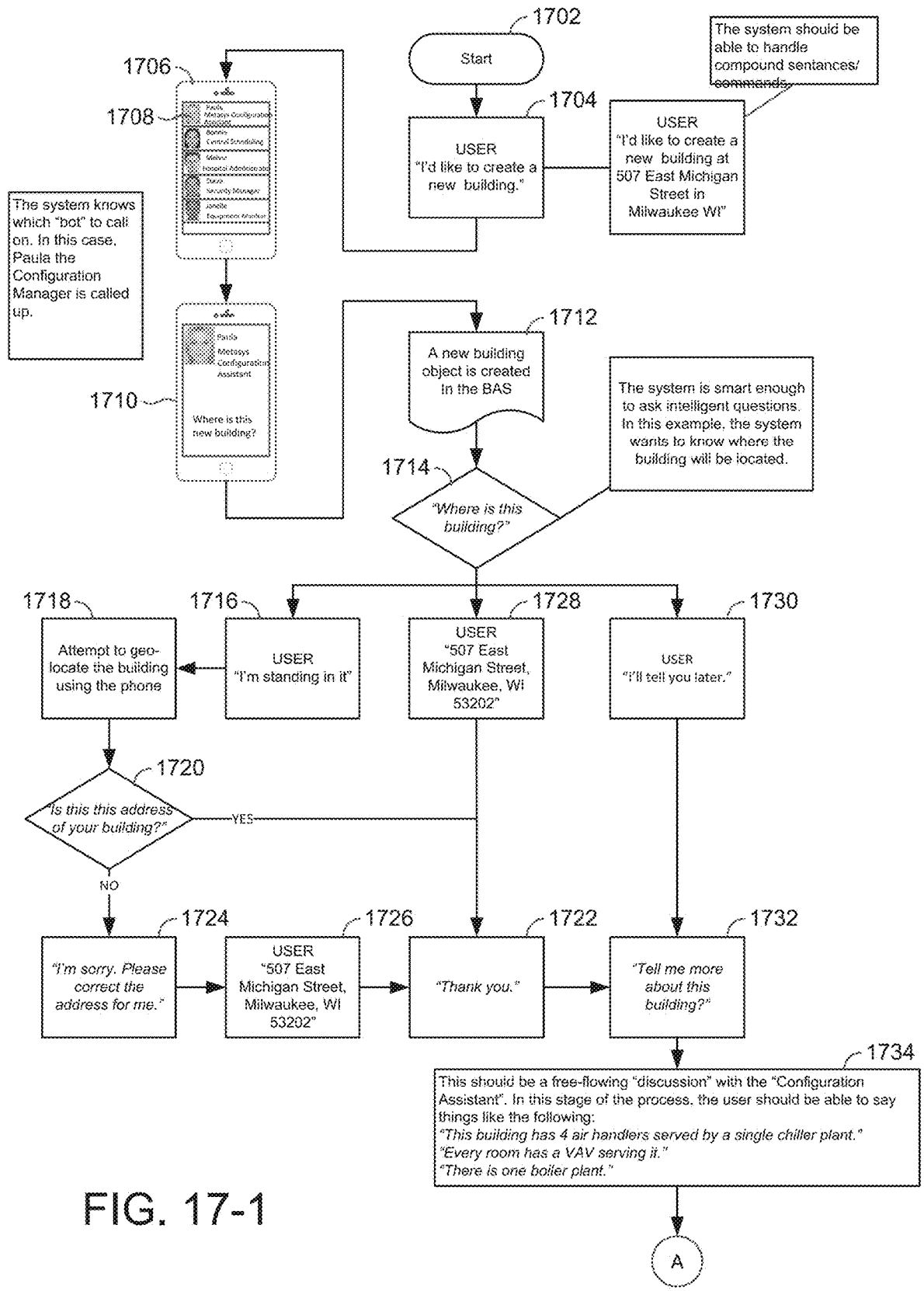
Figures 2, 17:
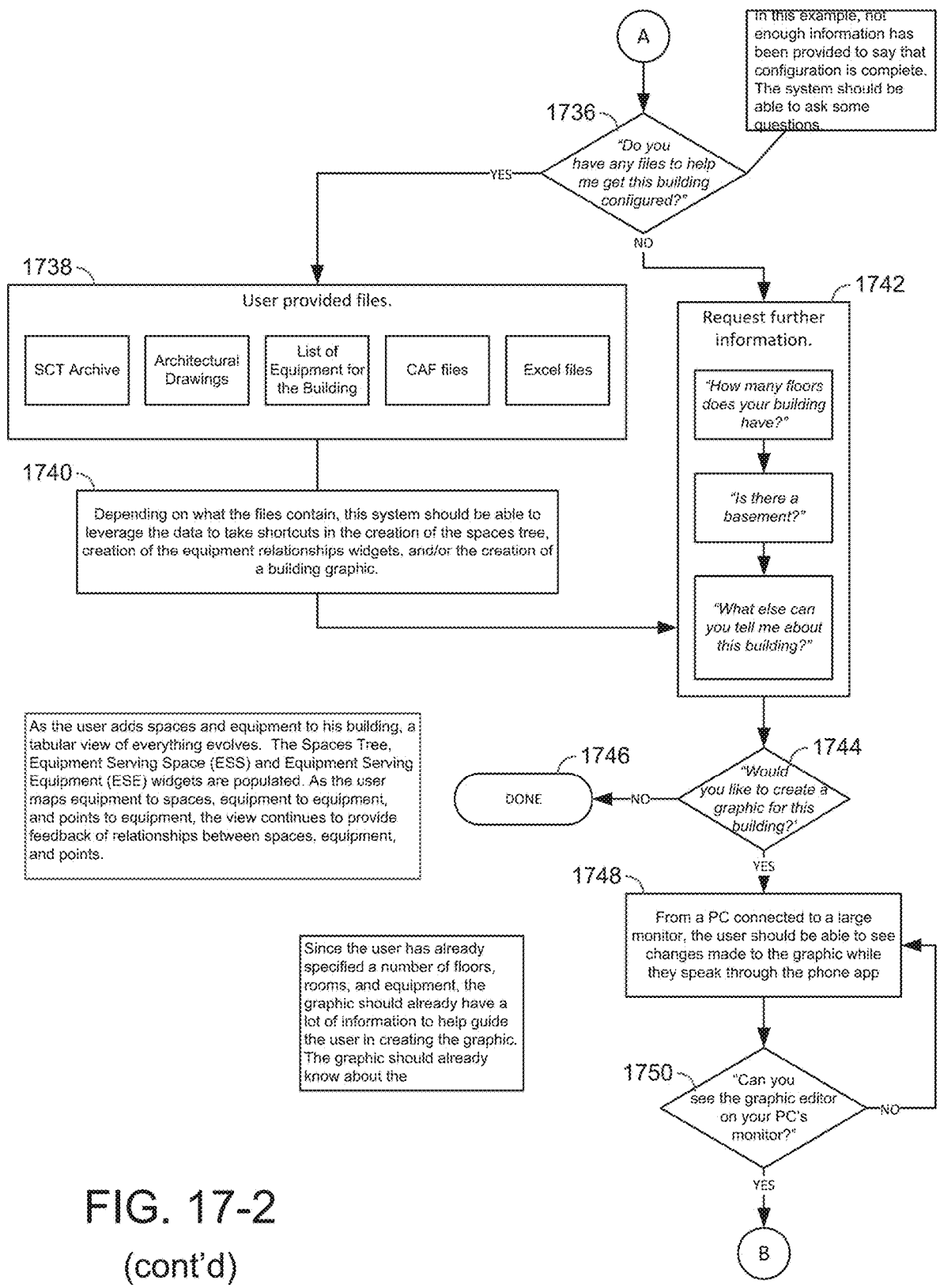
Figures 3, 17:
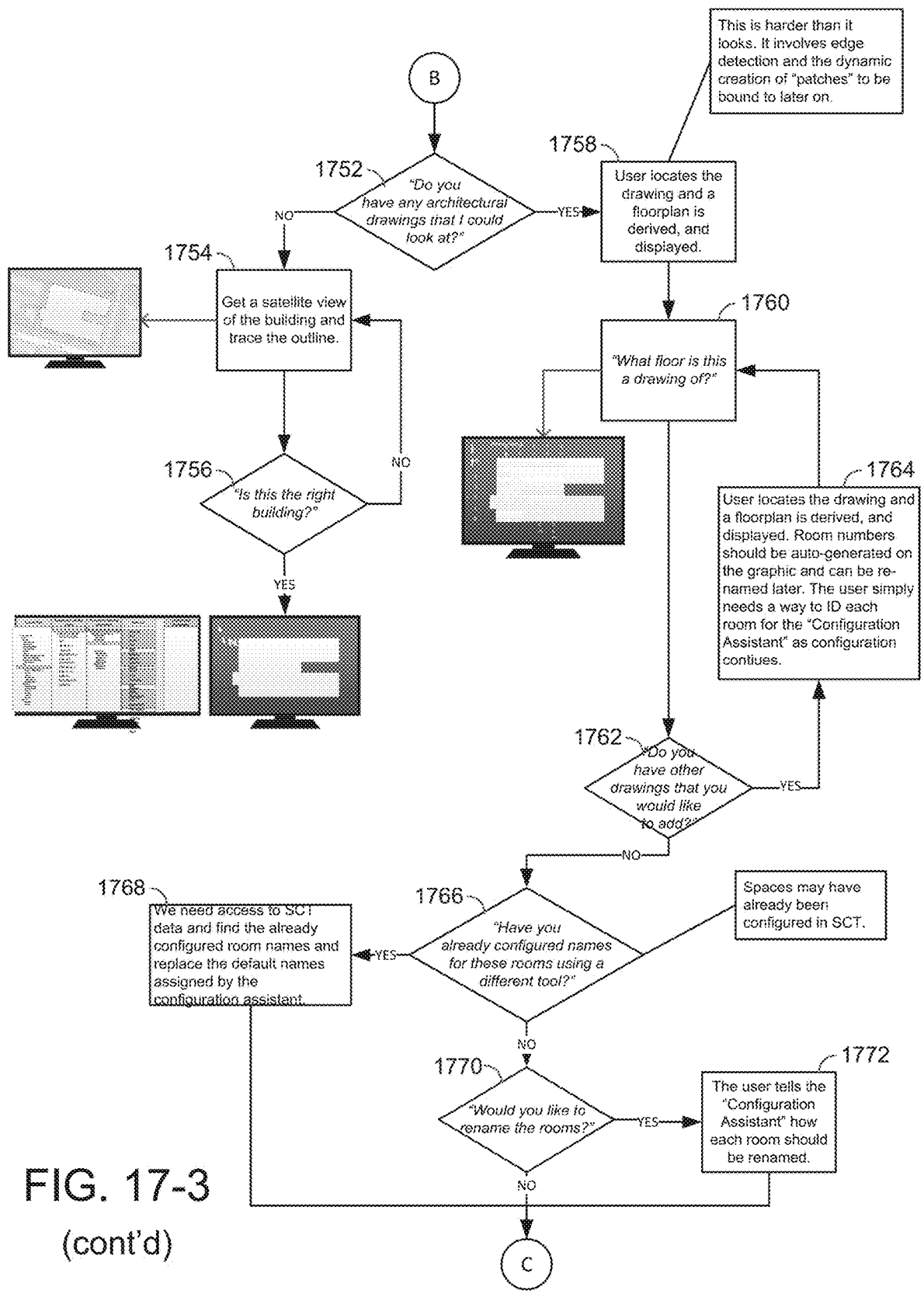
Figures 4, 17:
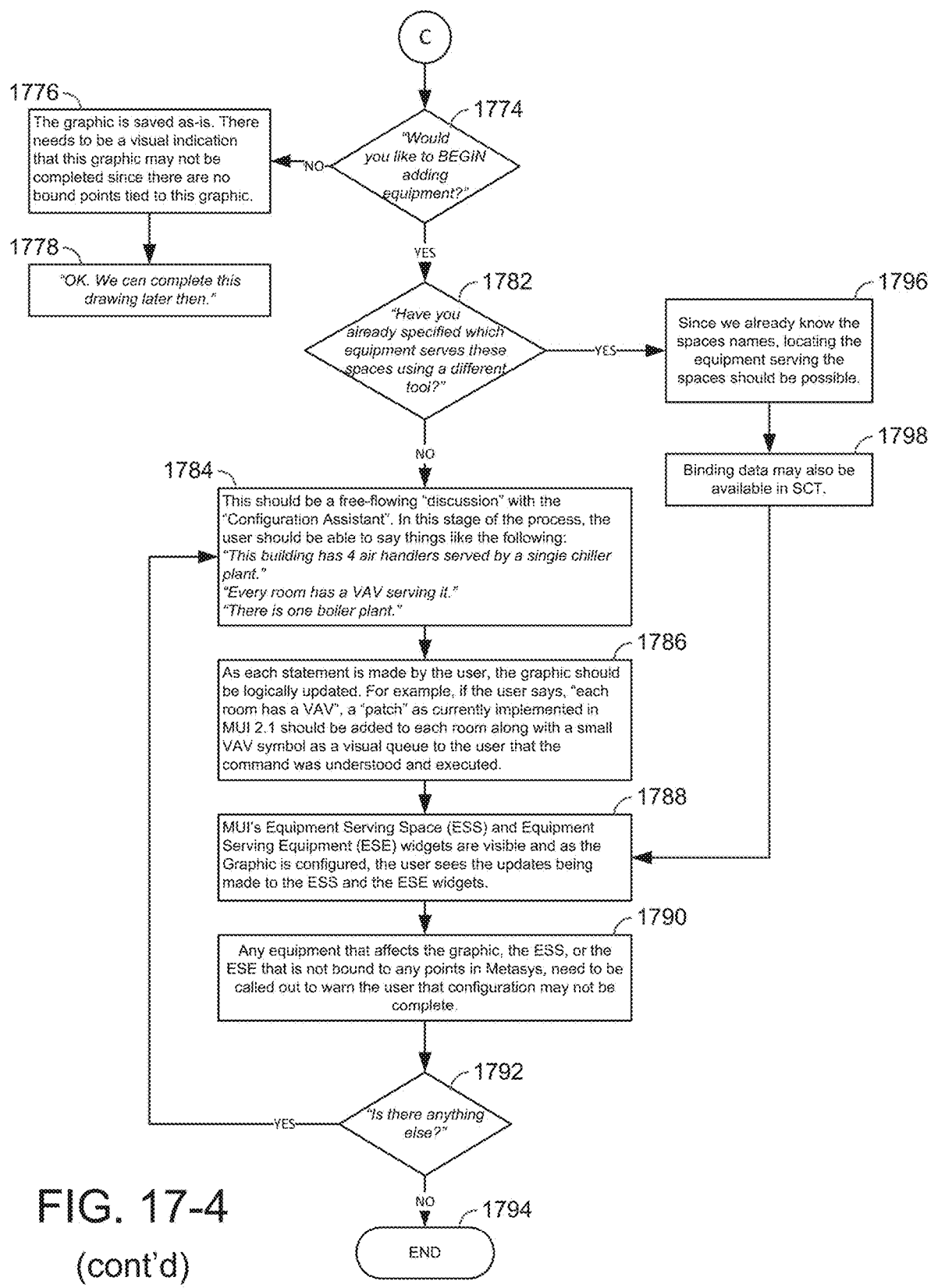

Turning now to FIG. 17, an example process 1700 for creating a new building for use in a BMS user interface system. In one embodiment, the BMS user interface is Metasys UI from Johnson Controls. The process 1700 may be used to map spaces and equipment serving the spaces in a building. In the following example, the building may be a new hospital located at 507 E. Michigan St., in Milwaukee Wis. The process 1700 may be initiated by the user at process block 1702. For example, the user may provide a vocal prompt, such as "Hey Metasys." In other embodiments, the user may activate an application on a mobile device that can provide communication to the controller 502. The user may then provide a request at process block 1704. For example, the request may be "I'd like to create a new building," or "I'd like to create a new building at 507 East Michigan street in Milwaukee Wis." In one embodiment, the user provides the request via a user device, such as a mobile device. For the purposes of this example, a smart phone is the device used by the user to interface with the controller 502. Furthermore, the user may access the controller via an application on the smart phone.

The request may then be processed at process block 1706. The controller 502 may evaluate the request as described above, and determine what agent may be able to best handle the request. For example, a configuration agent 1708 may be the proper agent for this application. In one embodiment, the agent 1708 should have sufficient knowledge related to the BMS or BAS to recognize and differentiate terminal units from equipment that is upstream from them. So, for example, if the user were to add VAVs, the agent 1708 would be smart enough to ask, "what kind of VAVs?" The agent 1708 may further have enough knowledge to know that VAVs generally have AHUs that supply them with regulated air. The agent 1708 may also have sufficient knowledge to understand that if the VAVs have water coils, that the cold/hot water is likely being supplied by an upstream source, and be able to ask the user questions about it. The agent 1708 may request additional information from the user via the users smart phone 1710. Further, once the agent 1708 is determined, the agent 1708 may create a new building object in the building automation system (BAS) at process block 1712. The agent 1708 may then request additional information from the user at process block 1714. For example, the agent 1708 may ask the user where the new building is located. As shown in FIG. 17, the user may provide multiple responses. For example, the user may state that they are "standing in it," in reference to the new building, at process block 1716. The agent 1708 may then attempt to geo-locate the building using the location services on the users phone 1710, such as GPS or Wi-Fi location determination. The agent 1708 may then determine a location and ask the user if the location is correct, at process block 1720. If the user indicates that the address generated by the agent is correct, the agent 1708 may acknowledge the user at process block 1722. If the user responds that the address provided by the agent 1708 is incorrect, the agent 1708 may respond to the user with a request to correct the address at process block 1724. The user may then provide the correct address at process block 1726, and the agent 1708 can acknowledge the correct address at process block 1722.

In other embodiments, the user may directly input the address at process block 1728, which the agent 1708 may acknowledge at process block 1722. In a still further embodiment, the user may inform the agent 1708 that they will provide the location later at process block 1730. At process block 1732, the agent 1708 may ask the user to provide more information about the building. At process block 1734, the user may provide additional information to the agent 1708. In one embodiment, the user and the agent 1708 may have a free-flowing discussion regarding details about the building. For example, the user may say things like, "this building has four air handlers served by a single chiller plant," "every room has a VAV serving it," or "there is one boiler plant." The agent 1708 may then process this data accordingly.

In some examples, the agent 1708 may ask for further information at process block 1736. For example, the agent 1708 may ask the user if there are any files that the user can provide to help get the building configured. The user may provide files to the agent 1708 at process block 1738. Example files may include SCT archive files, architectural drawings, equipment lists, CAF files, Excel files, etc. The agent 1708 may then process the files to create building objects at process block 1740. Building objects may include spaces trees, equipment relationship widgets, building graphics, etc. If the user does not provide any files to the agent 1708, the agent 1708 may request further information at process block 1742. The additional information requests may ask how many floors the building has, if the building has a basement, or other general questions. At process block 1744, the agent 1708 may ask the user if they would like a graphic created for the building. If not, the process can end at process block 1746. If the user responds that they would like the agent to generate a graphic, the agent 1708 may start generating the graphic at process block 1748. For example, the agent may instruct the user to go to a connected device with a large display, such as a connected PC, to provide a showing of the generated graphic.

At process block 1750 the agent 1708 may ask the user if they can see the graphics editor on the display device, such as the PC monitor. The agent 1708 may then ask the user if they have any architectural drawings at process block 1752. If the user does not have architectural drawings, the agent 1708 may attempt to locate a satellite view of the building site and trace the outline of the building, at process block 1754. The agent 1708 may then ask the user if they have located and traced the proper building at process block 1756. If not, the agent 1708 may return to process block 1754 until the proper building is located. If the user indicates that the agent 1708 has found the correct building, the user may then be permitted to begin editing the outline of the building generated at process block 1754. In some embodiments, the user may be able to edit the outline via interactions with the agent 1708. In other embodiments, the user may use a standard editing tool to edit the outline.

Returning now to process block 1752, if the user does have architectural drawings, they may be provided to the agent 1708, which may then analyze the architectural drawings and generate a floorplan at process block 1758. Based on the drawings provided, the agent 1708 may ask which floor the drawing is of at process block 1760. The agent 1708 may then ask the user if there are any other drawings that the user would like to add at process block 1762. If the user does have other drawings, they may be added at process block 1764, at which point the agent may repeat process steps 1760 and 1764. If the user has no other drawings to add, the agent 1708 may ask the user if they have configured the names for each room or floor in the building using a different tool, at process block 1766. For example, the names may have been configured using an SCT tool. If the user indicates that other names were provided using other tools, the agent

1708 may instruct the user to provide the data from the tool, in order to allow the agent 1708 to reassign the default names with the previously configured names at process block 1768. If the user has not previously configured the names, the agent 1708 may ask the user if they would like to rename rooms, floor, or other portions of the building at process block 1770. If the user indicates they would like to rename portions of the building, the user may tell the agent 1708 how each portion of the building should be renamed at process block 1772.

If the user would not like to rename portions of the building, the agent 1708 may ask the user if they would like to begin adding equipment at process block 1774. If the user does not wish to add additional equipment, the graphic of the building can be saved as is, at process block 1776. In some embodiments the agent 1708 may provide a visual indication that the graphic may not be completed where there are no bound points tied to a graphic. The agent 1708 may then inform the user that the drawing may be completed later at process block 1778, at which point the process may end at process block 1780. If the user would like to begin adding equipment at process block 1774, the agent 1708 may ask the user whether they have already specified what equipment serves the mapped spaces using a different tool, at process block 1782. If the user has not specified what equipment services the spaces, the agent 1708 can begin an interrogatory conversation with the user at process block 1784. For example, the user may begin saying phrases such as, "this building has four air handlers served by a single chiller plant." The user may further provide comments such as "every room as a VAV serving it," or "there is one boiler plant." As the user provides statements to the agent 1708, the agent 1708 may logically update the graphic at process block 1786. For example, if the user says, "each room has a VAV," a graphic should be added to each room along with a small VAV symbol as a visual queue to the user that the command was understood and executed.

At process block 1788, various portions of the user interface may be updated. For example, an equipment serving space (ESS) and/or an equipment servicing equipment (ESE) widget may be updated and presented to the user. At process block 1790, the agent 1708 may call out any equipment that affects the graphics, the ESS or the ESE, and that is bound to any points to the user interface (e.g. Metasys). The called out equipment is used to warn the user that the configuration may not be complete. The agent 1708 may then inquire if there is anything else that the user needs at process block 1792. If so, the agent 1708 may return the process to process block 1784. If not, the process can end at process block 1794.

Returning to process block 1782, if the user has specified what equipment serves the mapped spaces, the agent 1708 can work to locate the equipment serving the mapped spaces at process block 1796. At process block 1798, the agent 1708 can then determine if binding data is available in the third part tool, such as SCT. The process may then proceed to process block 1788, and proceed as described above.

Use Case—Scheduling

Figure 18:
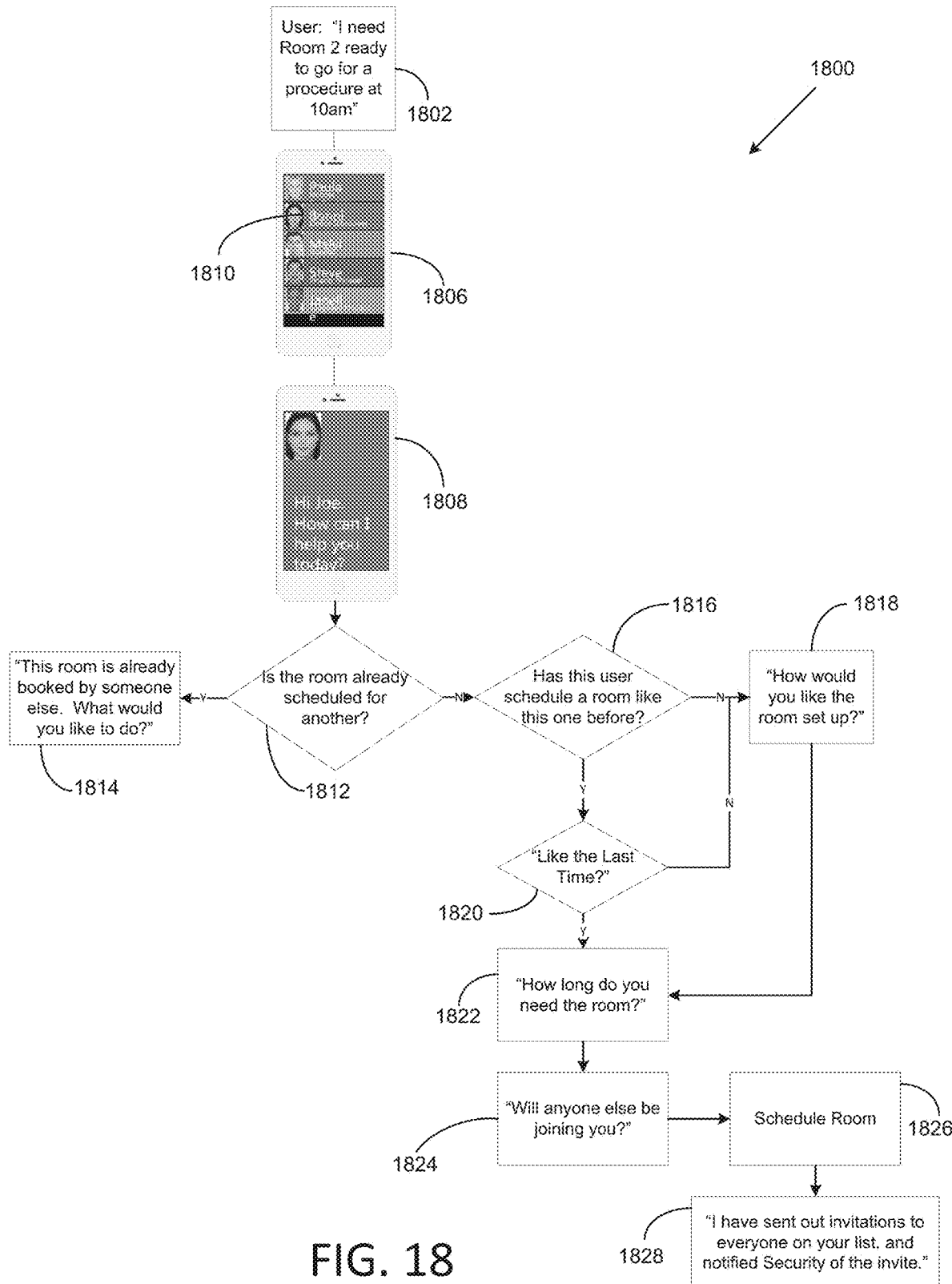
FIG. 18 is a flow chart illustrating a process for scheduling a resource using an agent-based system.

Turning now to FIG. 18, an example process 1800 for scheduling a resource using an agent based system is shown, according to some embodiments. In this example, the resource may be a catheterization lab within a hospital. A catheterization lab may be used to visualize the arteries and chambers of the heart and treat any stenosis or abnormality found. Catheterization labs are basically specialized operating rooms which may generate a lot of income for hospitals. Accordingly, there may be pressure to turn over the rooms as quickly as possible. Ideally, each room in a catheterization lab can be used several times a day. As they are sterile environments, the catheterization lab likely has specialized AHUs and VAVs to keep the rooms clean and in the best possible conditions for catheterization procedures.

At process block 1802, a user may provide a request to reserve a room. In one embodiment, the request is provided to a controller, such as controller 502 described above. In this example, the request is a verbal request of "I need Room 2 ready to go for a procedure at 10 am." In one embodiment, the user can provide the request using a mobile device 1804. At process block 1806, an application on the mobile device 1804 may communicate with the controller 500 to process the. At process block 1808, the controller may determine the agent that can handle the request. In some embodiments, the agent may be an existing agent. In other embodiments, the agent may be generated as described above. In this example, the controller 502 selects the "central scheduling agent" 1810 to process the request. At process block 1812 the agent 1810 determines if the room is already scheduled at that time by someone else. In one embodiment, the agent 1810 accesses one or more scheduling databases, such as via the cloud based applications 518. For example, the agent 1810 may need to interface with a Microsoft Outlook calendar database associated with the hospital. If the agent 1810 determines that the requested room is already booked at the requested time, the agent may provide the user with feedback at process block 1814, such as: "this room is already booked by someone else. What would you like to do?" Where the desired room is not available, the user may take alternative actions. Example alternative actions may include asking the agent 1810 for alternate rooms. In some examples, the user may cancel the other persons booking and inform them of the cancellation, if the user has higher priority than the person having booked the requested room. Similarly, if the user has a higher priority than the person currently booked in the requested room, the user may cancel the other person's booking, book them into an alternate room, and inform them. When booking them into another room, the user can use the agent 1810 to ensure that the new room is set up the way they requested the original room set up. Further, the user may cancel booking any room at all.

If the room is determined to be available at process block 1812, the agent 1810 can determine if the user has scheduled a room like the requested room before, at process block 1816. If the agent 1810 determines that the user has not set up a room like the requested room previously, the agent 1810 may ask the user how they would like the room set up at process block 1818. Alternatively, if the agent 1810 determines that the user has scheduled a room like the requested room before, the agent can inquire if the user would like it set up based on previous setups at process block 1820. If the user does not want the room set up based on a previous use, the agent 1810 may ask the user how they would like the room setup at process block 1818.

Once the agent 1810 determines how the user would like the room set up, the agent 1810 may ask the user how long they need the room for at process block 1822. The agent 1810 may further ask the user if any other people will be using the room as well at process block 1824. Once the agent has the required information, the agent 1810 may schedule the room at process block 1826. Once the agent 1810 has scheduled the room, the agent 1810 may tell the user the current status. For example, the agent 1810 may state: "I have sent out invitations to everyone on your list, and notified security of the invite." In one embodiment, the agent 1810 may contact a security agent, which may ensure that all of the invitees will have access to the room at the appropriate time.

Figure 19:
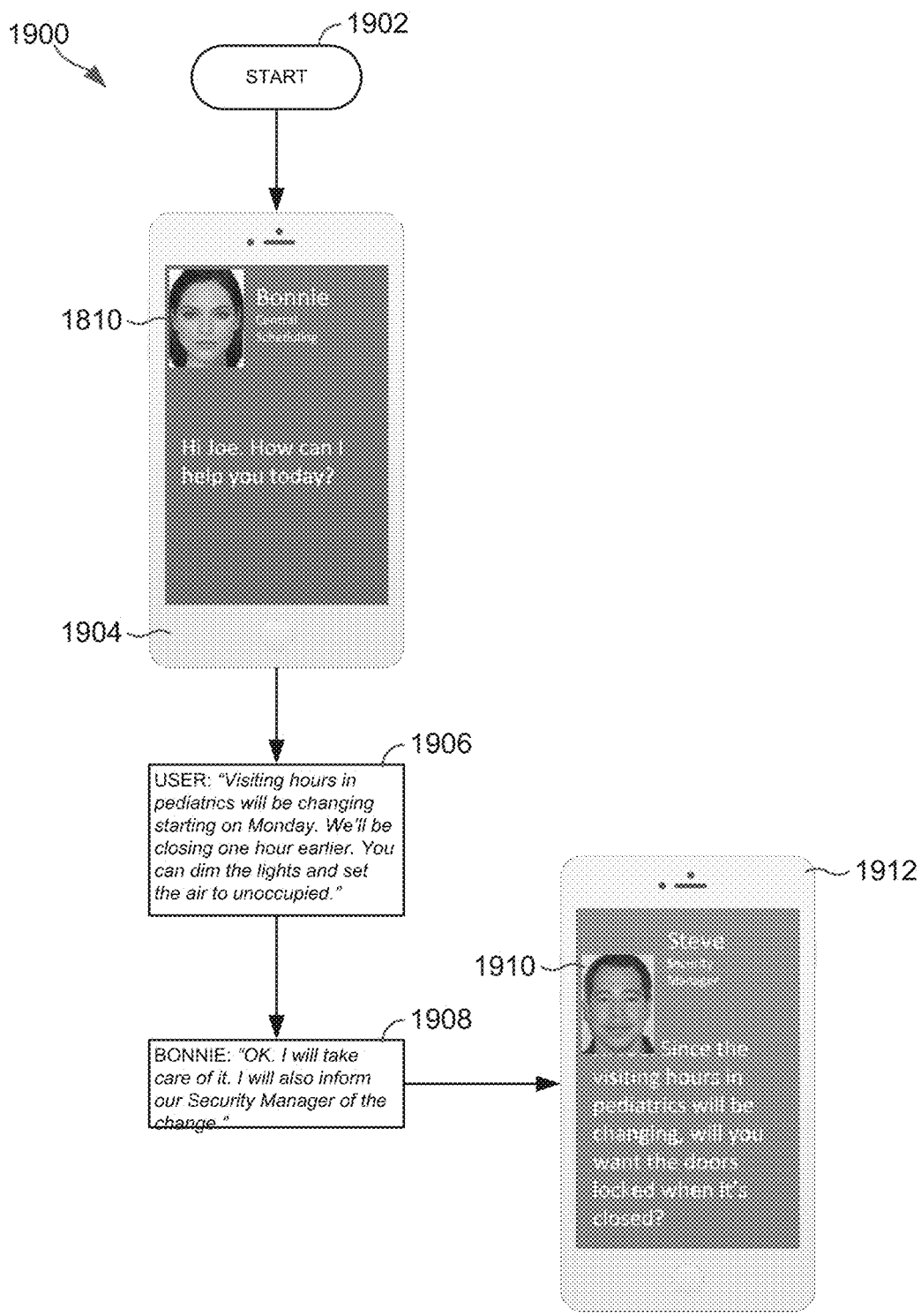
FIG. 19 is a flow chart illustrating a process for changing an event time.

Turning now to FIG. 19, a process 1900 for changing an event time is shown, according to some embodiments. At process block 1902, the process 1900 may be initiated by the user. For example, the user may provide a vocal prompt, such as "Hey Metasys." In other embodiments, the user may activate an application on a mobile device that can provide communication to the controller 502. At process block 1904, an agent, such as agent 1810 described above, may ask the user how they can help. In some embodiments, the agent may be selected based on an input from the user. In other embodiments, the user may select the agent that they wish to communicate with. At process block 1906, the user may provide data to the agent 1810. For example, the user may state: "Visiting hours in pediatrics will be changing starting on Monday. We'll be closing one hour earlier. You can dim the lights and set the air to unoccupied." At process block 1908 the agent 1810 may process the request, and inform the user that they will do what was requested. The agent 1810 may further communicate with other agents such as a security agent 1910. The security agent 1910 may further ask the user if they would like additional actions taken, such as locking the doors earlier to coincide with the early closing of pediatrics, at process block 1912.

Figure 20:
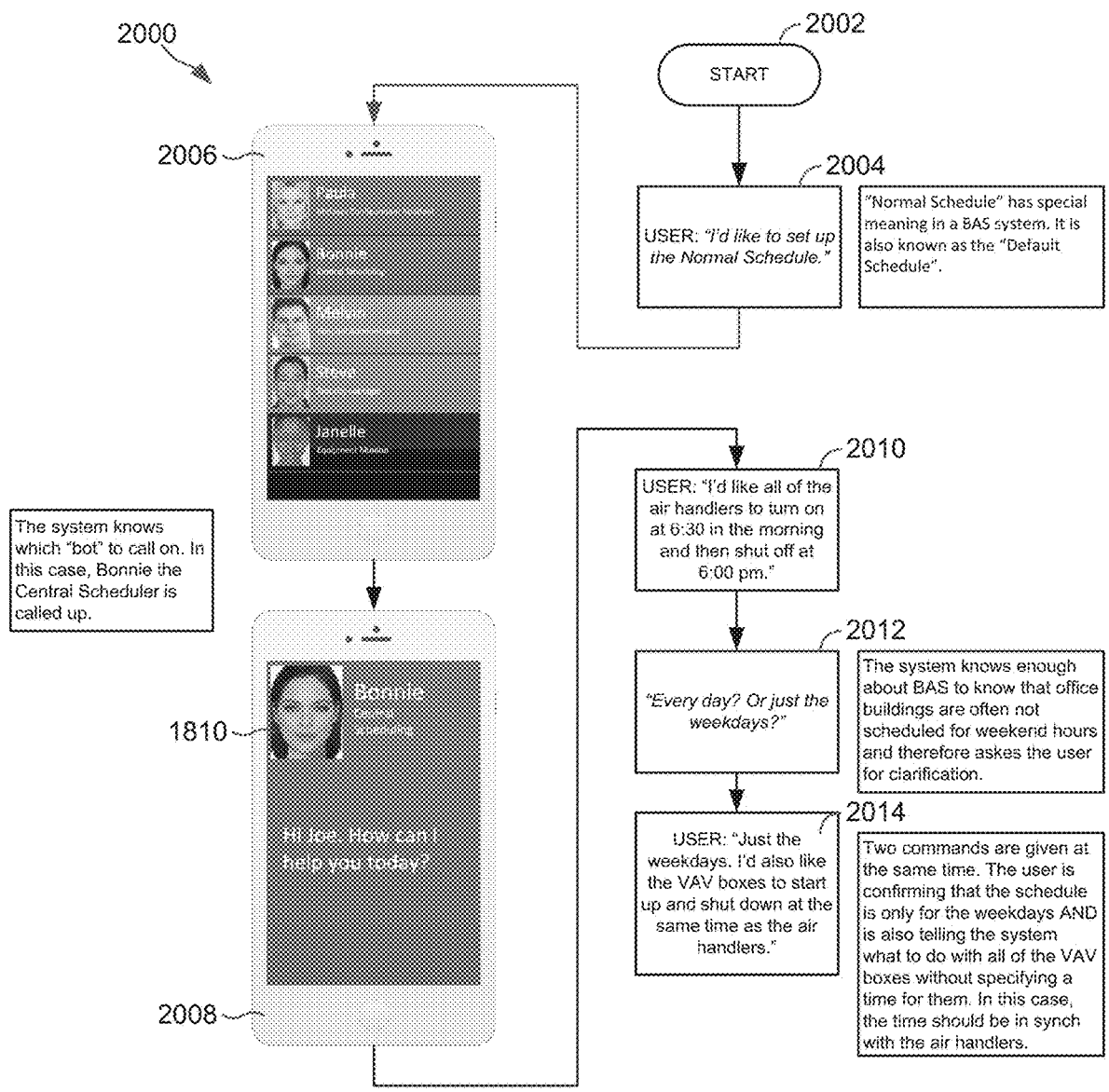
FIG. 20 is a flow chart illustrating a process for setting up a normal or default schedule for a building or facility.

Turning now to FIG. 20, a process 2000 for setting up a normal schedule for a building or facility is shown, according to some embodiments. In building management or automation systems, the term "normal schedule" may have a specialized meaning. For example, a normal schedule may be the default schedule. The normal schedule is the schedule that turns on or off certain pieces of equipment at the beginning and at the end of the day. The "normal schedule" may include every AHU and VAV in a building. In a BMS management systems, such as Metasys from Johnson Controls, each piece of equipment has to be scheduled one at a time, which may be a time consuming process. At process block 2002, the process 2000 may be initiated by the user. For example, the user may provide a vocal prompt, such as "Hey Metasys." In other embodiments, the user may activate an application on a mobile device that can provide communication to the controller 502. After the user has initiated the process, the user may provide a request, such as "I'd like to set up the normal schedule," at process block 2004

The process 2000 may determine the proper agent to handle the task at process block 2006. For example, the process 2000 may determine that the proper agent is the scheduling agent 1810. At process block 2008, the agent 1810 can ask the user how they can help. At process block 2010, the user may respond with a detailed request. For example, the detailed request may be "I'd like all of the air handlers to turn on at 6:30 in the morning and then shut off at 6:00 pm." The agent 1810 may then process the request. In some embodiments, the agent 1810 may understand that the building in the facility are generally not scheduled for weekend hours. Thus, the agent 1810 may request more information from the user at process block 2012. For example, the agent may ask: "Every day? Or just the weekdays?" The user can then provide additional information at process block 2014. For example, the user may state: "Just the weekdays. I'd also like the VAV boxes to start up and shut down at the same time as the air handlers." The agent 1810 may then process this additional information in performing the required tasks. As shown in FIG. 20, the agent based system is capable of interpreting multiple requests provided at the same time.

Use Case—Security

Figure 21:
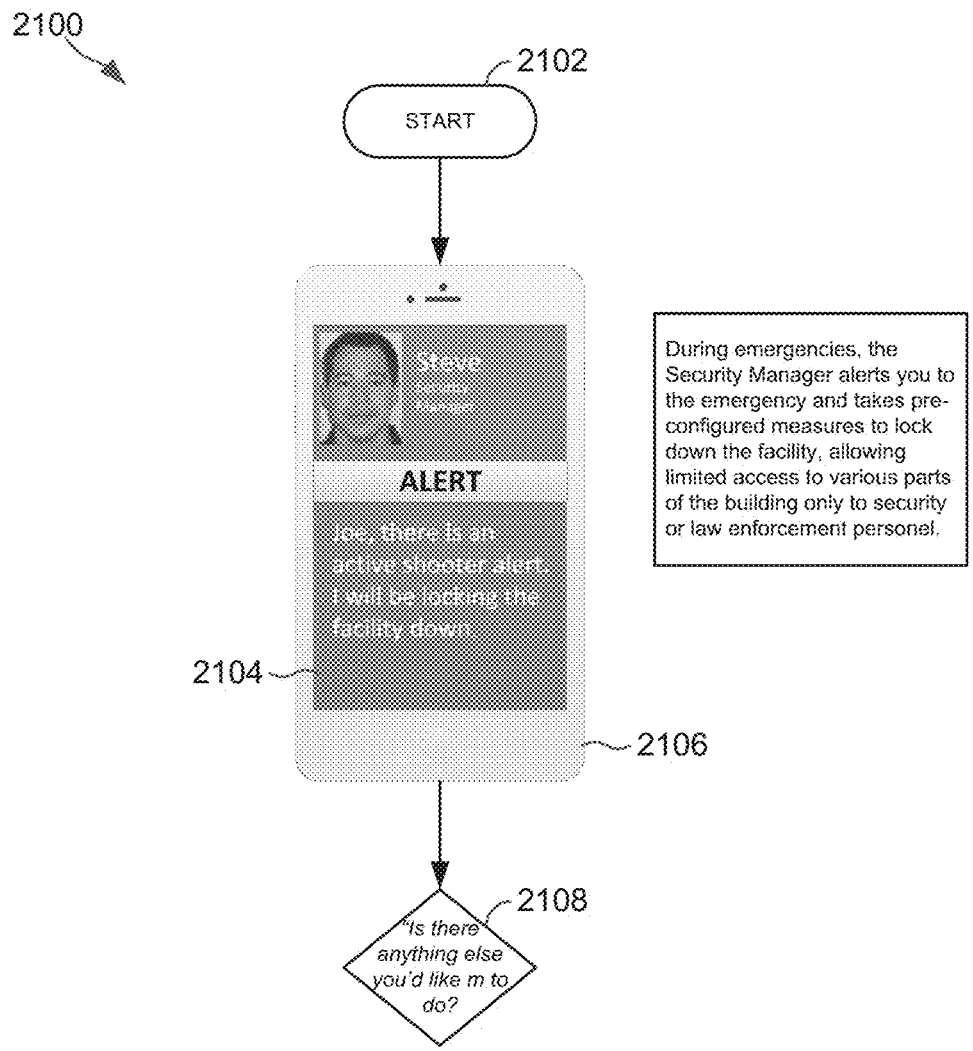
FIG. 21 is a flow chart illustrating a basic alert process for providing an alert to a user using an agent-based system.

FIG. 21 illustrates a basic alert process 2100 for providing an alert to a user using an agent. At process block 2102, the process may start where an alert is issued for a building or facility. For example, the alert may be an active shooter alert, a fire alert, a severe weather alert, or any other alert applicable to a given building or facility. An agent, such as security agent 2104, may provide the alert to the user at process block 2106. In some embodiments the security agent 2104 may also take actions in addition to alerting the user. For example, where the alert is related to an active shooter in the facility, the security agent 2104 may perform pre-configured measures to lock down the facility. The agent 2104 may lockdown the facility to restrict access to various parts of the building to security or law enforcement personnel only. After the agent 2104 has alerted the user and performed any pre-configured actions, the agent 2104 can ask the user if there are any other functions they would like performed at process block 2108.

Figure 22:
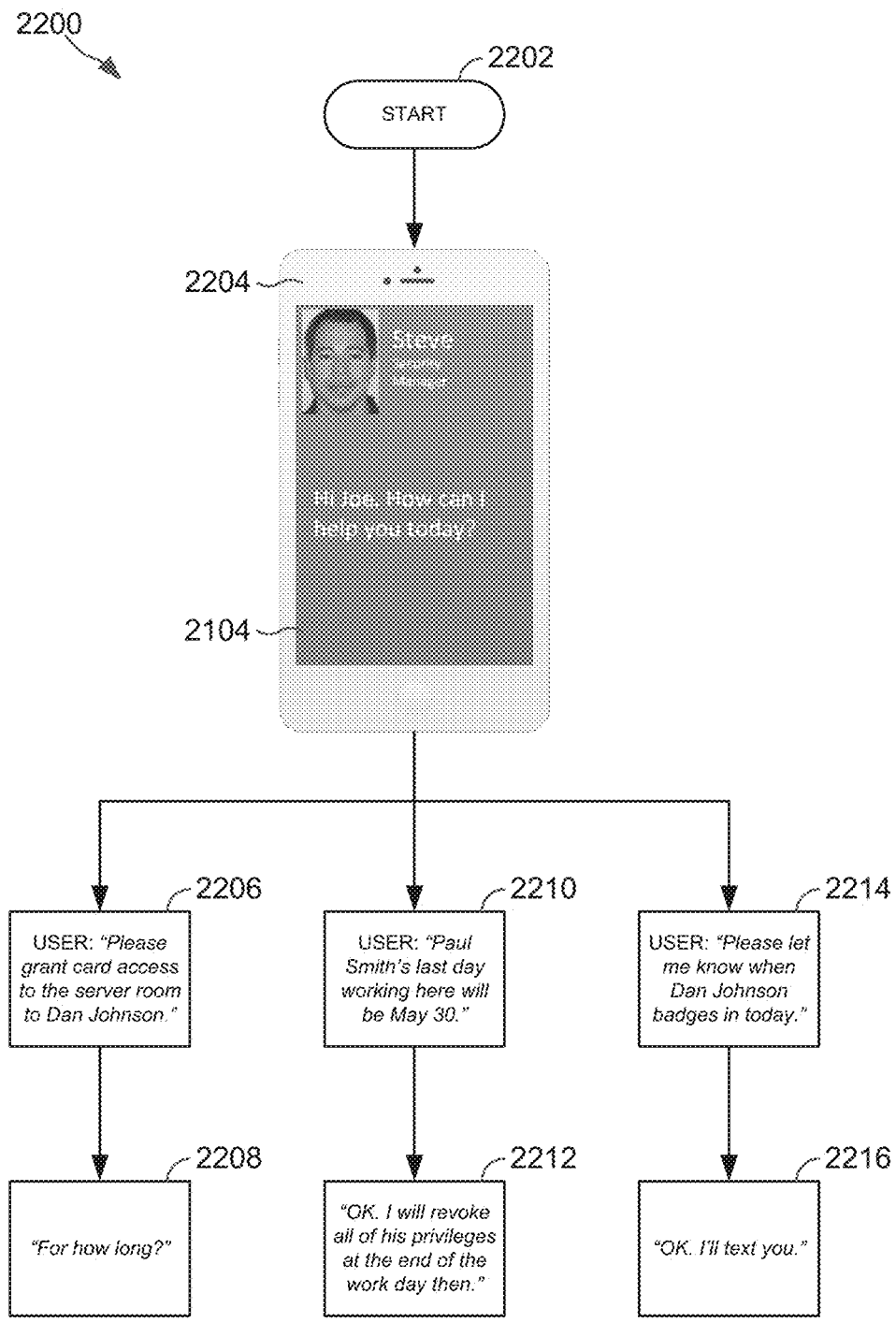
FIG. 22 is a flow chart illustrating a basic security agent interface process.

FIG. 22 illustrates a basic security agent interface process 2200. The user may initiate the process 2200 at process block 2202. For example, the user may provide a vocal prompt, such as "Hey Metasys." In other embodiments, the user may activate an application on a mobile device that can provide communication to the controller 502. At process block 2204 a security agent, such as security agent 2104 described above, may provide a prompt asking how the agent 2104 may help the user. The user may then provide multiple requests that may be performed by the agent 2104. For example, at process block 2206, the user may request card access to a specific location in the building, for a specific user. In a further example, the user may state, "please grant card access to the server room to Dan Curtis." The agent 2104 may then respond to the user to request more information at process block 2208. For example, the agent 2104 may ask for how long the access should be provided.

In other examples, the user may inform the agent 2104 that an employee is leaving the company on a certain date, at process block 2210. For example, the user may state, "Paul Crivello's last day working here will be May 30." The agent 2104 may then respond that it will perform certain actions based on the information provided by the user at process block 2212. For example, the agent 2104 may revoke all of the permissions and privileges associated with "Paul Crivello" at the end of the work day on May 30. In another example, the user may ask to be notified when an employee arrives at a building or facility at process block 2214. For example, the user may state, "please let me know when Dan Curtis badges in today." The agent 2104 may then acknowledge the request and indicate that they will notify the user at process block 2216. In one embodiment, the agent 2104 may inform the user that it will provide a text message to the user when the employee arrives. However, other forms of notification are also possible, such as push notification, e-mail notification, voice mail notification, etc.

User Interaction with Intelligent Agents

In some embodiments, the use of intelligent software agents can facilitate a user's interaction with a building management system (BMS). As one example, a user can input (e.g., verbally, typographically) a natural language request to an intelligent agent-based control system via an input device. The control system can utilize intelligent software agents to produce the desired output that corresponds to the user input. In some embodiments, the desired output can be in a natural language format, which can produce a conversational interaction between the user and the building management system.

Personalized agents can provide voice and visual interactions with a user. The agents can be spoken language apps, textual agents, and/or reaction/actuation agents (e.g., agents that control operational parameters within the BMS). While software agents are generally autonomous, communicative, and perspective, they can also have different levels of competence (e.g., intelligence) as determined by their programs—i.e., their behavioral specifications.

Figure 23:
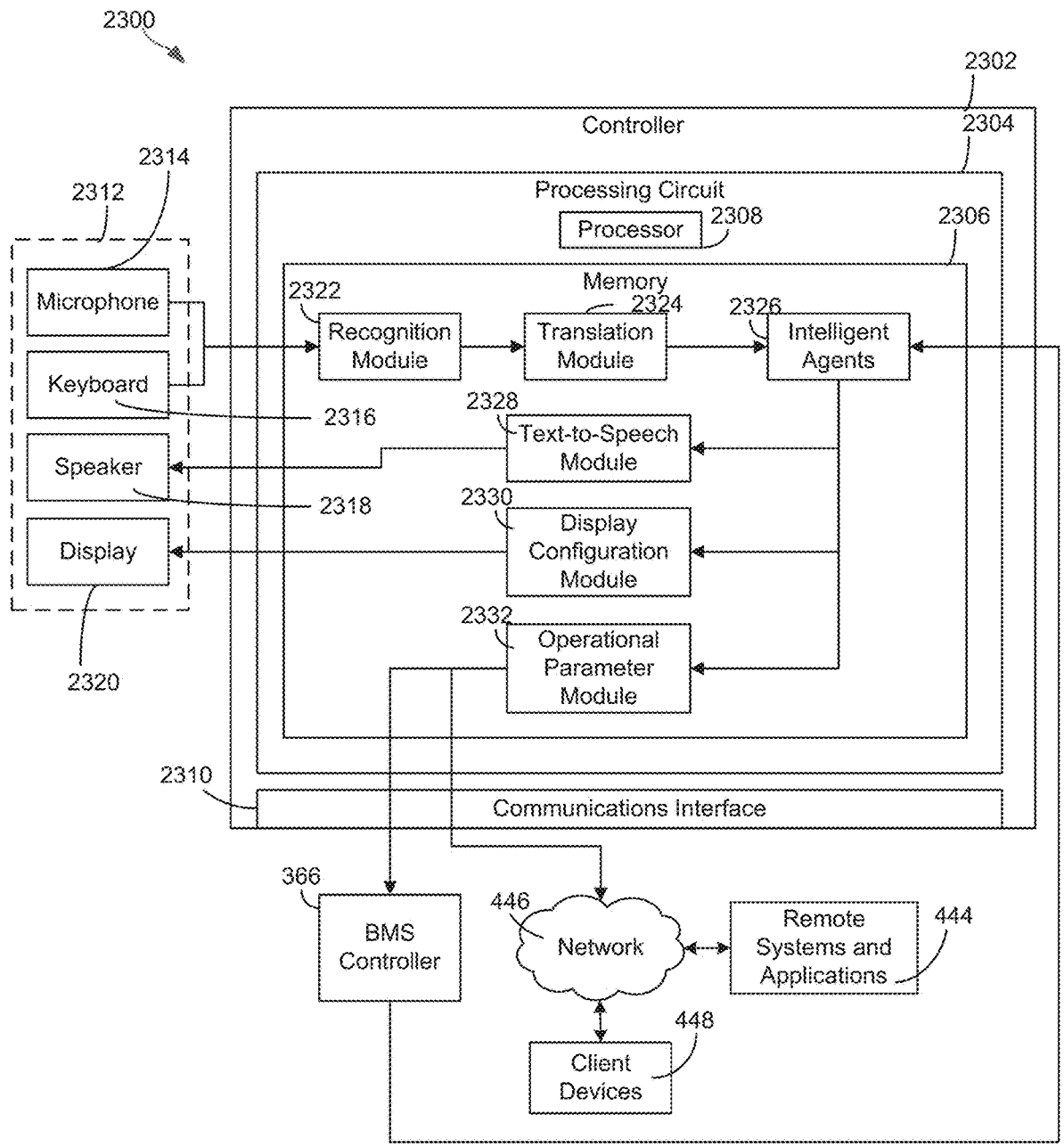
FIG. 23 is a block diagram illustrating an intelligent agent-based control system, according to some embodiments.
Figure 24:
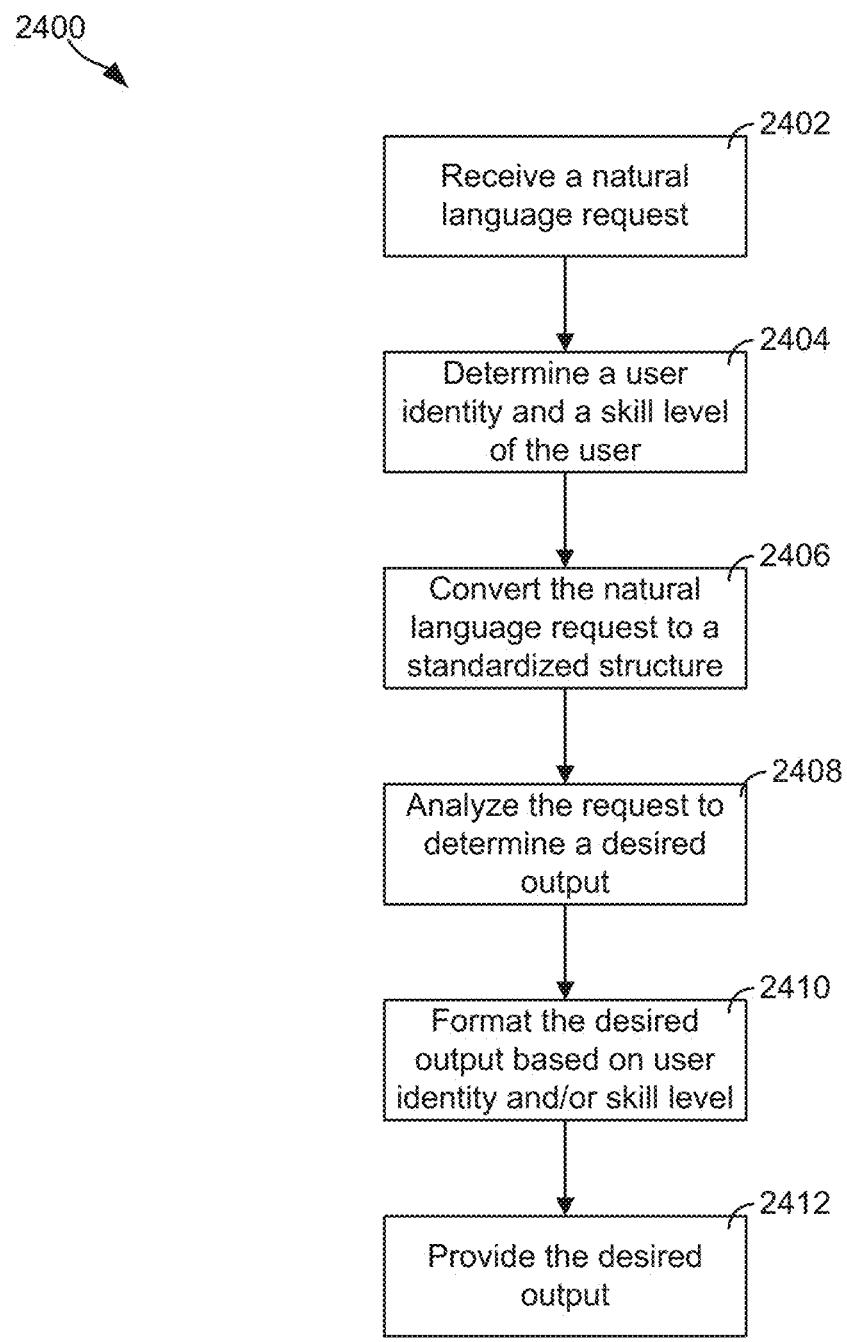
FIG. 24 is a flow chart illustrating a process of intelligent agent-based control, according to some embodiments.

Referring now to FIGS. 23 and 24, systems and methods for intelligent agent-based control are illustrated, according to some embodiments. FIG. 23 is a control system 2300 implementing intelligent agent-based control for a BMS, according to some embodiments. In some embodiments, controller 2302 can be the same or similar to controller 502, as shown and described with respect to FIG. 5.

Controller 2302 is shown to include a communications interface 2310. Interface 2310 can facilitate communications between controller 2302 and external applications (e.g., remote systems and applications 444, applications residing on client devices 448, etc.) for allowing user control, monitoring, and adjustment to BMS controller 366 (and subsystems 428), and user device 2312. Interface 2310 can also facilitate communications between controller 2302 and client devices 448. Further, in some embodiments, interface 2310 can facilitate communications between controller 2301 and BMS controller 366.

Interface 2310 can be or include wired or wireless communications interfaces (e.g., jacks, antennas, transmitters, receivers, transceivers, wire terminals, etc.) for conducting data communications with BMS controller 366 or other external systems or devices. In various embodiments, communications via interface 2310 can be direct (e.g., local wired or wireless communications) or via a network 446 (e.g., a WAN, the Internet, a cellular network, etc.). For example, interface 2310 can include an Ethernet card and port for sending and receiving data via an Ethernet-based communications link or network. In another example, interface 2310 can include a Wi-Fi transceiver for communicating via a wireless communications network. In another example, interface 2310 can include cellular or mobile phone communications transceivers. In some embodiments, communications interface 2310 can be a power line communications interface or an Ethernet interface.

Still referring to FIG. 23, controller 2302 is shown to include a processing circuit 2304 including a processor 2308 and memory 2306. Processing circuit 2304 can be communicably connected to communications interface 2310 such that processing circuit 2304 and the various components thereof can send and receive data via interface 2310. Processor 2308 can be implemented as a general purpose processor, an application specific integrated circuit (ASIC), one or more field programmable gate arrays (FPGAs), a group of processing components, or other suitable electronic processing components.

Memory 2306 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 2306 can be or include volatile memory or non-volatile memory. Memory 2306 can include database components, object code components, script components, or any other type of information structure for supporting the various activities and information structures described in the present application. According to an exemplary embodiment, memory 2306 is communicably connected to processor 2308 via processing circuit 2304 and includes computer code for executing (e.g., by processing circuit 2304 and/or processor 2308) one or more processes described herein.

In some embodiments, controller 2302 can be implemented within a single computer (e.g., one server, one housing, etc.). In various other embodiments controller 2302 can be distributed across multiple servers or computers (e.g., that can exist in distributed locations).

As shown, memory 2306 can include a number of modules, which are described in detail herein. In some embodiments, memory 2306 can include additional modules, or fewer modules. User device 2312 can communicate with controller 2302. In some embodiments, communication between user device 2312 and controller 2302 occurs via communications interface 2310. User device 2312 can include several elements, as shown. In some embodiments, however, microphone 2314, keyboard 2316, speaker 2318, and/or display 2320 can be housed separately, or in different combinations (e.g., microphone 2314 can be enclosed with speaker 2318). In some embodiments, user device 2312 can be the same or similar to I/O devices 534, as shown and described with respect to FIG. 5.

In some embodiments, user device 2312 can include a microphone 2314. Microphone 2314 can be configured to receive a vocal input from a user (e.g., a natural language request), and transmit the vocal input or corresponding data to recognition module 2322. Further, in some embodiments, user device 2312 can include a keyboard 2316. Keyboard 2316 can be configured to receive a physical input from a user (e.g., a typographical natural language request), and transmit the corresponding data to recognition module 2322. Keyboard 2316 can be included in devices such as cell phones, laptops, tablets, etc., according to some embodiments.

Recognition module 2322 can be configured to receive user inputs. In some embodiments, recognition module 2322 can be configured to determine a user's identity and/or skill level. In some situations, recognition module 2322 can determine user information (i.e., identity, skill level, authorization, etc.), using voice-recognition. In some embodiments, recognition module 2322 can communicate with BMS controller 366 and/or an external database to determine user identity based on login information (e.g., if a user is logged on to a device associated with BMS controller 366, the identity of the user can be determined).

As shown, recognition module 2322 can communicate with translation module 2324. In some embodiments, translation module 2322 can be configured to analyze the natural language request provided by the user input. Translation module 2322 can determine a desired output corresponding to the building management system. In some embodiments, determining a desired output can include analyzing the natural language request to determine intent and entity parameters. Further, in some embodiments, translation module 2322 can be configured to convert the natural language request into a standardized format (e.g., JSON, CSV, SQL, etc.), the standardized format configured to indicate the desired output to other applications and/or agents.

In some embodiments, translation module 2324 can communicate with intelligent agents 2326. In some embodiments, the intelligent agents 2326 can include a single agent. In other embodiments, the intelligent agents 2326 can include a number of agents which can be configured to communicate with one another and/or external applications. Intelligent agents 2326 can be configured to process the standardized format of the natural language request. In some embodiments, intelligent agents 2326 can be configured to output text, semi-structured text, and/or a graphical response. Intelligent agents 2326 can receive the user request and produce a contextually relevant response. In some embodiments, intelligent agents 2326 can use the user identity, authorization level, and/or skill level to tailor the response to the current user. This can be especially beneficial in building settings, where users can range from general office workers to HVAC specialists.

In some embodiments, the intelligent agents 2326 can communicate with a building optimization engine. Accordingly, the intelligent agents 2326 can account for any specific optimization program that the building is currently subject to. Intelligent agents 2326 can use the user input request, current operating parameters (e.g., from BMS controller 366), and the relevant optimization program to determine an optimized output. In some embodiments, the optimized output may not align with the desired output. Accordingly, intelligent agents 2326 can be configured to respond to a user with an indication of an adjusted output. This may occur in situations where, for example, a user requests that the room temperature be decreased, but this would go against the energy optimization program.

As shown, intelligent agents 2326 can communicate with text-to-speech module 2328, display configuration module 2330, and operational parameter module 2332. In some embodiments, the natural language input can include an indication of desired output format. Accordingly, intelligent agents 2326 can communicate as-needed with any one of modules 2328, 2330, 2332.

In some embodiments, text-to-speech module 2328 can be configured to convert the output of the intelligent agents 2326 (e.g., text, semi-structure text, graphical response) to an audio format. In some embodiments, the audio format can be a natural language format. Further, text-to-speech module 2328 can communicate the converted output (i.e., audio output) to speaker 2318. Accordingly, a user can hear the response from control system 2300.

In some embodiments, display configuration module 2330 can be configured to convert the output of the intelligent agents 2326 to a visual format. This can include written text, pictures, and graphs, among other things. Display configuration module 2330 can format the output based on user preferences, when the user identity is known. As shown, display configuration module 2330 can communicate with display 2320. Display 2320 can be configured to visually present the output of the intelligent agents 2326 to a user. Display 2320 can be included in a device such as a cell phone, laptop, tablet, smartwatch, etc.

In some embodiments, operational parameter module 2332 can be configured to convert the output of the intelligent agents 2326 to an operational output. Operational parameter module 2332 can communicate operational parameters with BMS controller 366. Accordingly, BMS controller 366 can control building subsystems 428. Operational parameter module 2332 can be configured to determine device-specific actions that correspond to the output of the intelligent agents. As shown, operational parameter module 2332 can also communicate with network 446. Accordingly, operational parameter module 2332 can provide device-specific actions and/or operational parameters to client devices 448 as well as remote systems and applications 444.

In some embodiments, translation module 2324, text-to-speech module 2328, display configuration module 2330, and/or operational parameter module 2332 can be included as a "cognitive service." The cognitive service can be stored remotely (e.g., cloud-based), or within memory 2306. The cognitive service can be configured to interpret user inputs and intelligent agent outputs. In some embodiments, the cognitive service can include machine learning processes, that verify and update the responses provided by intelligent agents 2326.

Referring now to FIG. 24, a method 2400 for interacting with intelligent agent-based software is shown, according to some embodiments. Method 2400 is shown to include receiving a natural language request (step 2402). This can be via user input, such as by keyboard, microphone, etc. Method 2400 is further shown to include determining a user identity and a skill level of the user (step 2404). In some embodiments, this occurs via voice-recognition. Alternatively, a user identity can be determined if the user is logged on to the BMS system. Method 2400 can further include converting the natural language request to a standardized structure (step 2406). As described above, this can include formats such as JSON, SQL, and others. Method 2400 can include analyzing the request to determine a desired output (step 2408). This analysis can be performed by intelligent agents, according to some embodiments. Further, method 2400 can include formatting the desired output based on user identity and/or skill level (step 2410). In some embodiments, this can include formatting text and/or audio as natural language. In some embodiments, this can include providing technical terms, or alternatively, plain language terms. As shown, method 2400 can include providing the desired output (step 2412). In some embodiments, this can include providing an output to a display, speaker, and/or external device. In some embodiments, method 2400 can include additional or alternative steps.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for interacting with a building management system (BMS) using intelligent software agents, the method comprising:
receiving a user request including a desired outcome from a multi-input device configured to accept vocal and textual inputs;
generating one or more agents to manage the user request responsive to determining one or more existing agents are not capable of fulfilling the desired outcome associated with the user request;
contextualizing, by the one or more agents, the user request by identifying a space and/or place and a corresponding user associated with the user request;
constructing, by the one or more agents, a user skill level from the user request;
activating a customized BMS optimization process, determined by the one or more agents, to perform an action based on the user request, wherein the customized BMS optimization process is determined by the one or more agents based on the user skill level, one or more operating parameters of the BMS associated with the space and/or place, and the space and/or place, and wherein performing the action includes launching, by the one or more agents, one or more scripts without user intervention.

2. The method of claim 1, further comprising determining, based on the user request, at least one BMS device corresponding to the customized BMS optimization process.

3. The method of claim 1, further comprising providing feedback to the corresponding user through a preferred interaction method, the feedback indicative of an output of the customized BMS optimization process.

4. The method of claim 3, wherein the preferred interaction method comprises at least one of a visual output via the multi-input device, a text message, an email, and an audio output.

5. The method of claim 3, wherein the preferred interaction method comprises a natural language response, customized based on the user skill level.

6. The method of claim 1, wherein the user request comprises a natural language input.

7. The method of claim 1, further comprising providing, via the one or more agents, at least one of a text string and a graphical response corresponding to the customized BMS optimization process.

8. A system for interacting with a building management system (BMS) using intelligent software agents, the system comprising:
a multi-input device configured to accept vocal and textual user requests including a desired outcome;
a cognitive service configured to generate a plurality of intelligent software agents to manage the user requests responsive to determining one or more existing agents are not capable of fulfilling the desired outcome associated with the user request, contextualize each user request by identifying a space and/or place and a corresponding user associated with each user request, and construct a user skill level from each user request;
the plurality of intelligent software agents configured to receive each contextualized user request and the user skill level, and determine a corresponding customized BMS optimization process based on the user skill level, one or more operating parameters of the BMS associated with the space and/or place, and the space and/or place; and
a BMS controller configured to activate the customized BMS optimization process via a plurality of corresponding BMS devices to perform an action, wherein performing the action includes launching, by the plurality of intelligent software agents, one or more scripts without user intervention.

9. The system of claim 8, wherein the cognitive service is further configured to determine, based on each user request, the plurality of corresponding BMS devices.

10. The system of claim 8, wherein the plurality of intelligent software agents are further configured to communicate an outcome of the customized BMS optimization process to the corresponding user via a preferred interaction method.

11. The system of claim 10, wherein the preferred interaction method comprises at least one of a visual output via the multi-input device, a text message, an email, and an audio output.

12. The system of claim 10, wherein the preferred interaction method comprises a natural language response, customized by the plurality of intelligent software agents based on the user skill level.

13. The system of claim 8, wherein the cognitive service is configured to contextualize each user request, each user request comprising a natural language input via the multi-input device.

14. The system of claim 8, wherein the cognitive service is configured to wirelessly communicate with the multi-input device and the BMS controller.

15. The system of claim 8, wherein the multi-input device comprises a microphone, a display, and at least one of a touchscreen and keyboard.

16. The system of claim 15, wherein the display is configured to provide a graphical response indicative of an output of the customized BMS optimization process, the plurality of intelligent software agents configured to communicate the graphical response to the multi-input device.

17. A system for interacting with a building management system (BMS) using intelligent software agents, the system comprising:
a multi-input device configured to accept vocal and textual user requests;
a processor in communication with the multi-input device and configured to:
receive a user request including a desired outcome;
generate one or more agents to manage the user request responsive to determining one or more existing agents are not capable of fulfilling the desired outcome associated with the user request;

contextualize, by the one or more agents, the user request for a space by identifying a space and/or place and a corresponding user associated with the user request;

construct, by the one or more agents, a user skill level from the user request;

determine, by the one or more agents, a customized BMS optimization process for the space based on one or more operating parameters of the BMS associated with the space and/or place; and output, by the one or more agents, the customized BMS optimization process; and a BMS controller configured to receive the customized BMS optimization process from the one or more agents and activate the customized BMS optimization process via corresponding BMS devices to launch one or more scripts without user intervention.

18. The system of claim 17, wherein the processor is further configured to determine the corresponding BMS devices based on the user request.

19. The system of claim 17, wherein the processor is further configured to communicate a result of the customized BMS optimization process to a user via a preferred interaction method.

20. The system of claim 19, wherein the preferred interaction method comprises a preferred user device and a preferred result format.

* * * * *